:::: {.columns}
::: {.column}
(12) United States Patent
Cha et al.
:::
::: {.column}
(10) Patent No.: US 11,144,814 B2
(45) Date of Patent: Oct. 12, 2021
:::
::::

(54) STRUCTURE DEFECT DETECTION USING MACHINE LEARNING ALGORITHMS

(71) Applicant: University of Manitoba, Winnipeg (CA)

(72) Inventors: Young Jin Cha, Winnipeg (CA); Wooram Choi, Winnipeg (CA)

(*) Notice: Subject to any disclaimer, the term of this patent is extended or adjusted under 35 U.S.C. 154(b) by 9 days.

(21) Appl. No.: 16/570,414

(22) Filed: Sep. 13, 2019

(65) Prior Publication Data

US 2020/0175352 A1  Jun. 4, 2020

Related U.S. Application Data

(63) Continuation of application No. PCT/CA2018/050304, filed on Mar. 14, 2018.
(Continued)

(51) Int. Cl.
*G06N 3/04* (2006.01)
*G06N 3/08* (2006.01)
*G06T 7/00* (2017.01)

(52) U.S. Cl.
CPC .............. *G06N 3/04* (2013.01); *G06N 3/08* (2013.01); *G06T 7/001* (2013.01);
(Continued)

(58) Field of Classification Search
CPC .. G06N 3/04–088; G06N 3/10; G06N 3/0454; G06T 7/0002–0012; G06T 7/10; G06T 7/20; G06T 2207/10032; G06T 2207/20081–20084; G06T 2207/30132; G06T 2207/20021; G06T 2207/10024;

G06K 9/00624; G06K 9/4604; G06K 9/4628; G06K 9/6256; G06K 9/6262; G06K 9/6271; G06K 9/6273; G06K 9/00496;
(Continued)

(56) References Cited

U.S. PATENT DOCUMENTS 8,509,478 B2 * 8/2013 Haas ..................... G06K 9/6257
  382/100
8,818,746 B1 * 8/2014 Johnson ............... G01N 29/045
  702/77

(Continued)

OTHER PUBLICATIONS

Sorncharean S et al.: "Crack Detection on Asphalt Surface Image Using Enhanced Grid Cell Analysis", Jan. 2008, Hong Kong, SAR, China, IEEE Computer Society, Los Alamitos, California, Jan. 23, 2008, pp. 49-54.

*Primary Examiner* — Michael S Osinski
(74) *Attorney, Agent, or Firm* — Christopher J. Dynowski; Ryan W. Dupuis; Ade & Company Inc.

(57) ABSTRACT

Structure defect detection is performed using computer-implemented arrangements employing machine learning algorithms in the form of neural networks. In one arrangement, a convolutional neural network is trained using a database of images formed to optimize accuracy of the convolutional neural network to detect, for example, a crack in a concrete surface. A two-stage scanning process each performing a plurality of scans of a test image is incorporated in the foregoing arrangement of convolutional neural network, with the two-stages forming overlapping capture areas to reduce likelihood of a crack lying on a boundary of
(Continued)

the individual scans going undetected. Also, region-based convolutional neural networks are trained to detect various types of defects.

12 Claims, 29 Drawing Sheets

Related U.S. Application Data

(60) Provisional application No. 62/471,090, filed on Mar. 14, 2017, provisional application No. 62/551,510, filed on Aug. 29, 2017.

(52) U.S. Cl.
CPC .............. *G06T 2207/10032* (2013.01); *G06T 2207/20081* (2013.01); *G06T 2207/20084* (2013.01); *G06T 2207/30132* (2013.01)

(58) Field of Classification Search
CPC .......... G06K 9/00744; G06K 9/00791; G06K 9/00818; G06K 9/036; G06K 9/3233; G06K 9/3241; G06K 9/46; G06K 9/6202; G06K 9/6254; G06K 9/6257; G06K 9/6259; G06K 9/6278; G06K 9/628

See application file for complete search history.

(56) References Cited

U.S. PATENT DOCUMENTS

| | | | | |
|---|---|---|---|---|
| 8,948,454 | B2* | 2/2015 | Datta | G06K 9/6256 |
| | | | | 382/103 |
| 10,803,573 | B2* | 10/2020 | Huang | G06K 9/628 |
| 2006/0276985 | A1* | 12/2006 | Xu | G01C 11/025 |
| | | | | 702/81 |
| 2013/0034305 | A1* | 2/2013 | Jahanshahi | G06T 7/0004 |
| | | | | 382/201 |
| 2017/0343481 | A1* | 11/2017 | Jahanshahi | G06T 7/44 |
| 2018/0268257 | A1* | 9/2018 | Ren | G06T 7/001 |
| 2018/0322623 | A1* | 11/2018 | Memo | G06N 3/084 |
| 2018/0330193 | A1* | 11/2018 | Ikeda | G06K 9/00624 |
| 2019/0147283 | A1* | 5/2019 | Giering | G06K 9/4604 |
| | | | | 382/103 |
| 2019/0155164 | A1* | 5/2019 | Chen | G03F 7/7065 |
| 2019/0227049 | A1* | 7/2019 | Narasimhan | G06K 9/6202 |
| 2019/0362490 | A1* | 11/2019 | Wen | G06T 7/0004 |
| 2020/0065606 | A1* | 2/2020 | Feng | G06T 7/0002 |
| 2020/0118263 | A1* | 4/2020 | Nogami | G06T 7/11 |
| 2020/0134384 | A1* | 4/2020 | Hino | G06K 9/6271 |
| 2020/0134809 | A1* | 4/2020 | Moioli | G06T 7/0004 |
| 2020/0145661 | A1* | 5/2020 | Jeon | H04N 19/136 |
| 2020/0162751 | A1* | 5/2020 | Kim | H04N 19/33 |
| 2020/0389658 | A1* | 12/2020 | Kim | H04N 19/154 |

* cited by examiner

Output size = (I − R) / S + 1, I = Input size, R = Receptive field size, S = Stride size; (6−3)/1+1=4

Output size = (I − P) / S + 1, I = Input size, P = Pooling size, S = Stride size; (7−3)/2+1=3

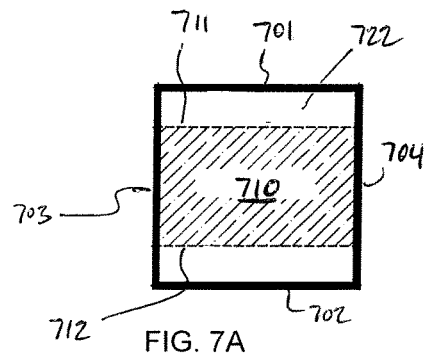
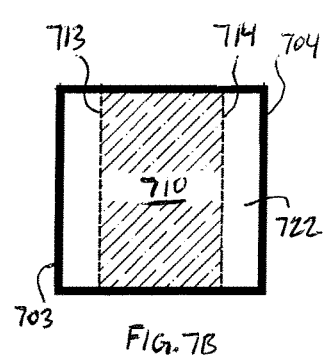
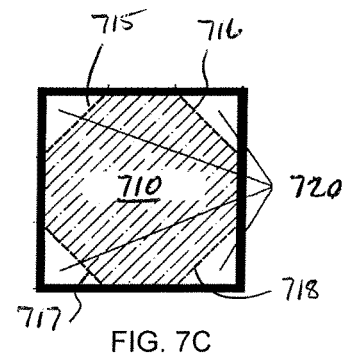
FIG. 7A　　　　FIG. 7B　　　　FIG. 7C
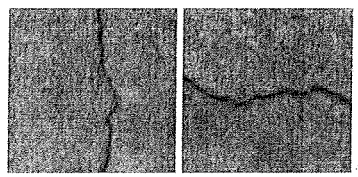
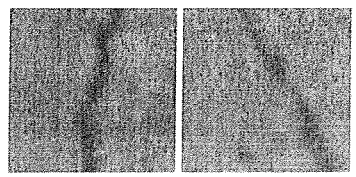
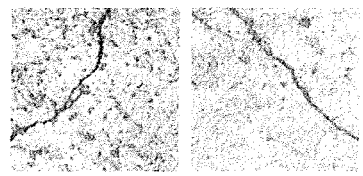
FIG. 8A　　　　FIG. 8B　　　　FIG. 8C
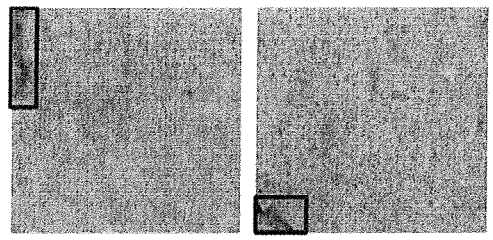
FIG. 9
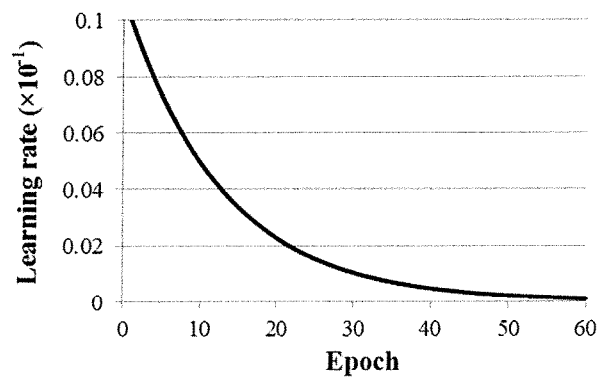
FIG. 10

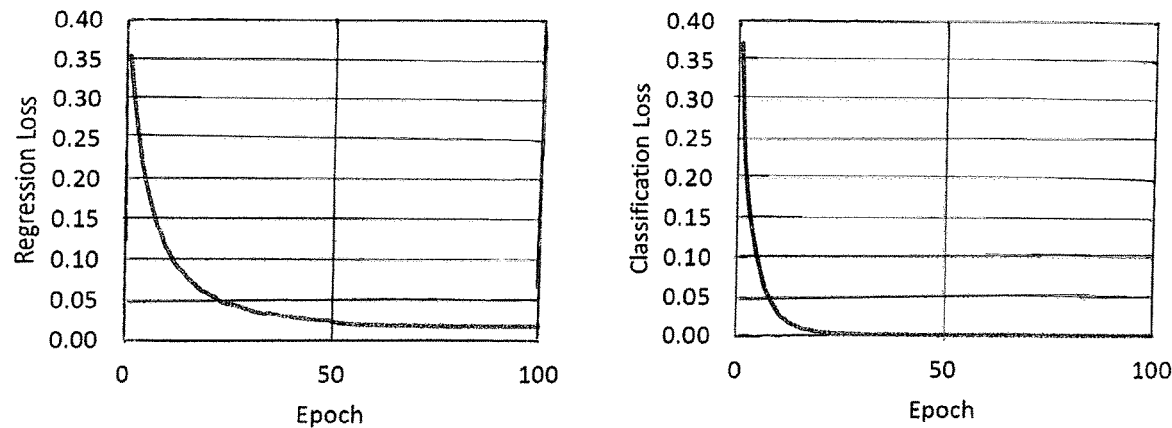
FIG. 27
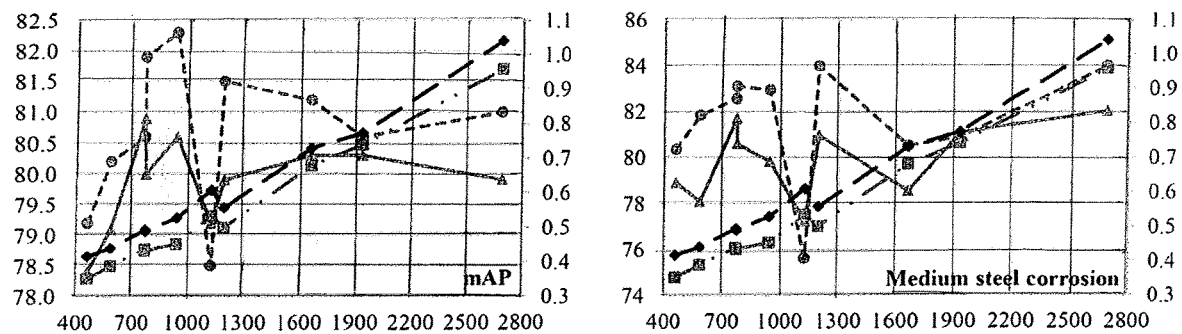
FIG. 28A
FIG. 28B
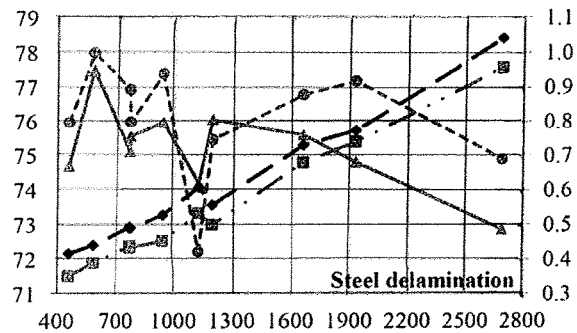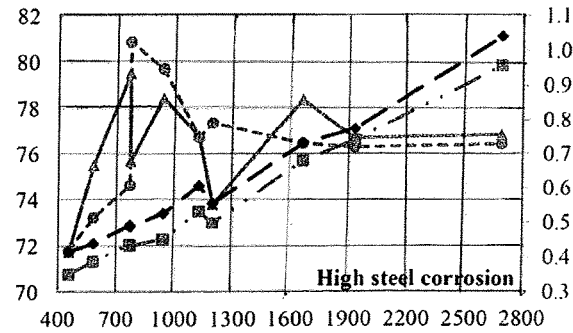
FIG. 28C
FIG. 28D

STRUCTURE DEFECT DETECTION USING MACHINE LEARNING ALGORITHMS

This is a continuation application which claims the benefit under 35 U.S.C. 365(c) of international application PCT/CA2018/050304 filed Mar. 14, 2018, which claims the benefit of U.S. Provisional application Ser. No. 62/471,090 filed Mar. 14, 2017 and U.S. Provisional application Ser. No. 62/551,510 filed Aug. 29, 2017.

FIELD OF THE INVENTION

The present invention relates generally to computer-implemented arrangements for detecting defects in structures using machine learning algorithms, and more specifically to such arrangements comprising a neural network such as a convolutional neural network and region-based convolutional neural network for analyzing images of surfaces of the structure to detect defects.

BACKGROUND

Civil infrastructures, such as bridges, dams and skyscrapers, require maintenance as they age. This is particularly important for infrastructures which remain in use past their designed lifespan. For example, a number of bridges built across the United States between the 1950s and 1960s were designed to last 50 years, but are still presently in use (Aaoshat, 2008). This has motivated regular periodic inspection of these structures (Federal Highway Administration) including on-site inspections which necessitate that access to the structure be closed. Consequently, structural health monitoring (SHM) techniques are been proposed to overcome this shortcoming.

An initial attempt at forming a SHM system comprises vibration-based structural system identifications via numerical method conjugations (Teidj et al., 2016; Chatzi et al., 2011; Rabinovich et al., 2007; Cha and Buyukorturk 2015). However, this approach has several challenges for monitoring large-scale civil infrastructures due to various uncertainties and non-uniformly distributed environmental effects, among other matters.

Although many works have had large-scale SHMs performed to cover large-scale structures (Kurata et al., 2012; Jang et al., 2010), they are typically quite complex and involve dense instrumentation, such as installing numerous sensors, integration of data from distributed sources, and compensation for environmental effects (Xia et al., 2012; Cornwell et al., 1999). Lastly, in these prior art systems it is not easy to confirm (i) whether the collected data actually indicates structural damage, (ii) the presence of sensory system malfunctions, and (iii) the presence of noisy signals, without performing an in-person follow-up check of the sensing systems and structures.

Thus, a number of vision-based methods for detecting damages, primarily using image processing techniques (IPTs), have been implemented for detecting civil infrastructure defects in order to partially replace human-conducted on-site inspections (Cha et al., 2017; Chen et al., 2015). These IPTs are primarily used to manipulate images in order to extract defect features, such as cracks in concrete and steel surfaces.

One significant advantage of IPTs is that almost all superficial defects (e.g., cracks, corrosion) are likely identifiable. An early comparative study on finding concrete cracks using four edge detection methods fast Haar transform (FHT), fast Fourier transform, Sobel edge detector, and Canny edge detector—was conducted by Abdel-Qader (2003), who defined FHT as the best solution for the task. This study was followed by an examination of modified edge detection problems (Nishikawa et al., 2012; Alaknanda et al., 2009; Yamaguchi et al., 2008; Sinha and Fieguth, 2006; Song and Civco, 2004). Yeum et al. (2015) proposed a study for detecting steel cracks using IPTs combined with a sliding window technique; this article shows the potential of IPTs very well. Despite their test example having many crack-like features due to the rusty surface of a steel beam, the unnecessary features were effectively removed, and strong crack-like features were extracted using the Frangi filter and the Hessian matrix-based edge detector (Frangi et al., 1999). However, edge detection is an ill-posed problem, as the results are substantially affected by the noises created, mainly from lighting and distortion, and no optimal solutions exist (Ziou and Tabbone, 1998). One effective method for overcoming these issues is implementing denoising techniques. Total variation denoising (Rudin et al., 1992) is a well-known technique that reduces noises from image data and enhances images' edge detectability. This technique was applied to a study (Cha et al., 2016) conducted to detect loosened bolts from images. However, the usage of such contextual (i.e., using prior knowledge) image processing is limited, since image data taken under real-world situations varies extensively. Additionally, the extensively varying real-world situations (e.g., lighting and shadow changes) can lead to challenges to the wide adoption of IPTs.

One possible solution that has improved real-world situation adaptability is using machine learning algorithms (MLAs) (LeCun et al., 1998), and several research groups have proposed techniques that can detect structural defects using this method (Butcher et al., 2014; Jiang and Adeli, 2007; Liu et al., 2002). These approaches first collect signals from non-destructive testing and evaluate whether or not the collected signals indicate defects. In recent years, many have implemented a combination of IPT-based image feature extractions and MLA-based classifications (O'Byrne et al., 2014; Wu et al., 2014; Jahanshahi et al., 2013; O'Byrne et al., 2013; Moon and Kim, 2011). Although they imported MLAs in their methods, the results of aforementioned approaches have inevitably inherited the complexities of sensor-implementations in addition to the false-feature extraction of IPTs. Many types of ANNs, including the probabilistic neural network (Ahmadlou and Adeli, 2010), have been developed and adapted to research and industrial fields, but convolutional neural networks (CNNs) have been highlighted in image recognition, which are inspired by the visual cortex of animals (Ciresan et al., 2011). CNNs can effectively capture the grid-like topology of images, unlike the standard neural networks (NNs), and they require fewer computations due to the sparsely connected neurons and the pooling process. Moreover, CNNs are capable of differentiating a large number of classes (Krizhevsky et al., 2012). These aspects make CNNs an efficient image recognition method (Simard et al., 2003; LeCun et al., 2015). The previous issue of CNNs was the need for a vast amount of labeled data, which came with a high computational cost, but this issue was overcome through the use of well-annotated databases (ImageNet; CIFIA-10 and CIFAR-100 dataset; MNIST DATABASE) and parallel computations using graphic processing units (Steinkrau et al., 2005). Owing to this excellent performance, a study for detecting railway defects using a CNN was later proposed (Soukup and Huber-Mork, 2014). However, rail surfaces are homogenous, and the images are collected under controlled conditions. This is different from detecting concrete surface defects which form non-homogenous surfaces.

Advanced image classification methods have been developed to recognize multiple objects using deep-learning algorithms, such as convolutional neural networks (CNNs), through well-known pattern analysis statistical modelling and computing learning (PASCAL) visual object classes (VOC) (Everingham et al. 2007), ImageNet (Deng et al. 2009, Krizhevsky et al. 2012), and imageNet large scale visual recognition challenge (ILSVRC2012). To overcome the drawbacks of detection methods based on traditional IPTs, Cha et al. (2017) developed a deep-learning-based concrete crack detection method using CNNs by integrating sliding window techniques and 256×256 pixel image samples containing cracked or intact concrete to train the CNN networks to identify the locations of cracks. The accuracy of the method is approximately 98% for various image quality, including blurred images, strong lighting, and close-up images that are 7 cm from objects. From extensive comparative studies using traditional IPTs, the proposed CNN-based method has significantly better performance for detection of cracks under various conditions. Engineers can use the method to determine if crack detection is correct with the naked eye because segmented images of the concrete cracks are provided rather than processed images. The method does not require pre- or post-processing of images except to train CNN architecture, which addresses most drawbacks of traditional IPTs. The CNN-based method can detect specific damage types with a single network and provide multi-classification using multiple network architecture; however, it is inefficient in terms of cost. Another issue is that test images for CNNs may contain other structural elements that may be detected as cracks, such as steel members connected to concrete members and edges of concrete.

To recognize multiple objects simultaneously, region-based CNN (R-CNN) was proposed by Girshick et al. (2014), which takes object proposals from selective searches (Uijlings et al. 2013) and the resulting extracted features from traditional CNNs to build classification and regression layers to localize objects. Support vector machines and simple novel regressors for bounding boxes are used to classify regression layers. The R-CNN improves the accuracy of object detection in VOC databases but requires three training processes for CNNs, the classifier, and the regressor, which results in significant computational costs. The classifier and regressor of the R-CNN provide forward propagation to extract features for object proposals without sharing computations, which makes it difficult to use, expensive, and computationally slow.

To address these problems, He et al. (2014) developed a spatial pyramid pooling network (SPP-net), which reduces both training and testing time but is difficult to use because of its multi-stage training process, similar to the R-CNN. In addition, the pre-trained CNNs that make up SPP-net are not updated during the training process. To resolve training complexity and share computations, Girshick (2015) developed the fast R-CNN to train a network end-to-end in one stage with better speed and accuracy in comparison to the R-CNN and SPP-Net for VOC databases.

Fast R-CNN is trained end-to-end in one stage and shows higher speed and accuracy than both the R-CNN and SPP-net. Despite the better performance of Fast R-CNN, it is dependent on taking pre-computed object proposals, as is the case with the R-CNN and SPP-net methods. Moreover, Fast R-CNN is slow and has limited accuracy because generating object proposals through an external method like Selective Search is time-consuming, and is not optimized during the training process. In order to unify the object proposals creator and Fast R-CNN, Ren et al. (2016) proposed a region proposal network (RPN) to generate object proposals and introduced the Faster R-CNN method by combining RPN and Fast R-CNN to detect 20 visual object classes. Faster R-CNN reduces computational costs by sharing features between RPN and Fast R-CNN, improves the accuracy by training the network end-to-end for both the object detector and proposal generator, and provides real-time object detection.

SUMMARY OF THE INVENTION

According to an aspect of the invention there is provided a computer-implemented method of analyzing an image of a surface to detect a defect in the surface, comprising:
  receiving the image of the surface;
  processing the image using a machine learning algorithm configured to detect the defect, the machine learning algorithm comprising a convolutional neural network including:
    at least one convolution layer; and
    at least one max pooling layer;
  and displaying the image with location of the defect being indicated if determined to be present by the convolutional neural network.

According to another aspect of the invention there is provided a computer-implemented method of analyzing an image of a surface to detect a defect in the surface, comprising:
  receiving the image of the surface;
  processing the image of the surface using a machine learning algorithm configured to detect the defect which includes a neural network;
  said processing including scanning a first set of non-overlapping areas of the image;
  said processing including scanning a second set of non-overlapping areas of the image each which overlap more than one of the first set of non-overlapping areas so as to capture information at edges of the first set of non-overlapping areas which is otherwise unavailable to the machine learning algorithm from the scanning of the first set of non-overlapping areas;
  and determining whether the image contains the defect.

In one arrangement, said processing includes:
  scanning a first set of non-overlapping areas of the image;
  scanning a second set of non-overlapping areas of the image each which overlap more than one of the first set of non-overlapping areas so as to capture information at edges of the first set of non-overlapping areas which is otherwise unavailable to the convolutional neural network from the scanning of the first set of non-overlapping areas.

According to yet another aspect of the invention there is provided a computer readable medium having stored thereon programming instructions for training a convolutional neural network to detect a crack in a surface from an image of the surface, comprising:
  a data structure including a set of training images each having a top edge, a bottom edge, and opposite sides edges;
  wherein a first portion of the set of training images includes a crack and a second portion of the set of training images lack a crack;
  the first portion of the set of training images comprising:
    a first category of crack-containing images having a crack extending substantially horizontally across the image in a direction from one side edge to the other and spaced from the top and bottom edges of the image;

a second category of crack-containing images having a crack extending substantially vertically across the image in a direction from the top edge to the bottom edge and spaced from the side edges of the image;

a third category of crack-containing images having a crack extending diagonally across the image such that terminal ends of the crack are spaced substantially vertically and substantially horizontally apart from one another that is located within a region of the respective image spanning vertically between the top and bottom edges and horizontally between the side edges but excluding triangular areas each at one corner of the image formed by a portion of each of two edges of the image and a diagonal line interconnecting said portions;

and training instructions stored on the medium and executable by a computer processor for training the convolutional neural network with said data structure so that the convolutional neural network is enabled to detect the crack in the image of the surface.

According to a further aspect of the invention there is provided a method of forming a set of training data for training a convolutional neural network to detect a crack in a surface from an image of the surface, comprising:

processing a plurality of images to determine which ones of the images include a crack, each one of the images having a top edge, a bottom edge, and opposite side edges;

if a respective one of the images does not have a crack, selecting said image as a non-crack training image;

if a respective one of the images includes a crack:

classifying a direction in which the crack extends as one of:

(i) extending substantially horizontally across the image from one side to the other such that terminal ends of the crack are spaced apart by a greater horizontal distance than a vertical distance and the vertical distance is smaller than a first threshold distance;

(ii) extending substantially vertically across the image from top to bottom such that terminal ends of the crack are spaced apart by a greater vertical distance than a horizontal distance and the horizontal distance is smaller than a second threshold distance;

(iii) extending diagonally across the image such that terminal ends of the crack are spaced apart by a vertical distance exceeding the first threshold distance and by a horizontal distance exceeding the second threshold distance;

selecting the respective one of the images as a crack-containing training image if the crack is located within a prescribed zone of the image depending on the direction which it has been classified as having, wherein:

(a) if the crack has the direction defined in (i), the prescribed zone is defined horizontally between the opposite side edges of the image and vertically between top and bottom limits each spaced from a respective one of the top and bottom edges of the image;

(b) if the crack has the direction defined in (ii), the prescribed zone is defined vertically between the top edge and the bottom edge of the image and horizontally between a pair of side limits each spaced from a respective one of the side edges of the image;

(c) if the crack has the direction defined in (iii), the prescribed zone is collectively defined by a portion of each of the top, the bottom, and the side edges and a plurality of diagonal limits each spanning between an intersecting pair of the edges of the image so as to define a triangular area of the image at a corner of the image which said prescribed zone excludes;

wherein a plurality of non-crack training images and a plurality of crack-containing training images form the set of training data for the convolutional neural network.

Preferably, the ratio of non-crack training images to crack-containing training images is 1:1.

Preferably, the method comprises processing a plurality of photographs so as to form therefrom the plurality of images with 1:1 aspect ratio that have reduced size relative to the photographs.

Preferably, the first threshold distance is equal to the second threshold distance.

Preferably, the top and bottom limits are spaced by a common distance from the respective one of the top and bottom edges of the image.

Preferably, the side limits each are spaced by a common distance from the respective one of the side edges of the image.

Preferably, the diagonal limits each form a 45 degree angle of the triangular area where it intersects a respective one of the edges of the image such that the prescribed zone is centered with respect to each of the edges of the image which define it.

In one arrangement, the convolutional neural network comprises:

an input layer having a height of n pixels, a width of n pixels, and a depth of d channels; said at least one convolution layer comprising a preliminary convolution layer, a secondary convolution layer, a tertiary convolution layer and a quaternary convolution layer;

said at least one pooling layer comprising a preliminary pooling layer and a secondary pooling layer;

the preliminary convolution layer having a height of $Hc_1$ pixels, a width of $Hc_1$ pixels, and a depth of $Dc_1$ channels formed by a first convolution operator having a height of $hc_1$ pixels, a width of $hc_1$ pixels, and a depth of $dc_1$ channels with a stride of $sc_1$ performed upon the input layer;

wherein $Hc_1 = [(n-hc_1)/sc_1]+1$;

wherein $Dc_1 = dc_1$;

the preliminary pooling layer having a height of $Hp_1$ pixels, a width of $Hp_1$ pixels, and a depth of $Dp_1$ channels formed by a first pooling operator having a height of $hp_1$ pixels and a width of $hp_1$ pixels with a stride of $sp_1$ performed on the preliminary convolution layer;

wherein $Hp_1 = [(Hc_1-hp_1)/sp_1]+1$;

wherein $Dp_1 = Dc_1$;

the secondary convolution layer having a height of $Hc_2$ pixels, a width of $Hc_2$ pixels, and a depth of $Dc_2$ channels formed by a second convolution operator having a height of $hc_2$ pixels, a width of $hc_2$ pixels, and a depth of $dc_2$ channels with a stride of $sc_2$ performed upon the preliminary pooling layer;

wherein $Hc_2 = [(Hp_1-hc_2)/sc_2]+1$;

wherein $Dc_2 = dc_2$ the secondary pooling layer having a height of $Hp_2$ pixels, a width of $Hp_2$ pixels, and a depth of $Dp_2$ channels formed by a second pooling operator having a height of $hp_2$ pixels and a width of $hp_2$ pixels with a stride of $sp_2$ performed upon the secondary convolution layer;

wherein $Hp_2=[(Hc_1-hp_2)/sp_2]+1$;

wherein $Dp_2=Dc_2$;

the tertiary convolution layer having a height of $Hc_3$ pixels, a width of $Hc_3$ pixels, and a depth of $Dc_3$ channels formed by a third convolution operator having a height of $hc_3$ pixels, a width of $hc_3$ pixels, and a depth of $dc_3$ channels with a stride of $sc_3$ that is performed upon the secondary pooling layer;

wherein $Hc_3=[(Hp_2-hc_3)/sc_3]+1$;

wherein $Dc_3=dc_3$;

an activation layer having a height of $Ha_1$ pixels, a width of $Ha_1$ pixel, and a depth of $Da_1$ channels formed by a nonlinear activation function operator performed upon the tertiary convolution layer;

wherein $Ha_1=Hc_3$;

wherein $Da_1=Dc_3$;

the quaternary convolution layer having a height of $Hc_4$ pixels, a width of $Hc_4$ pixels, and a depth of $Dc_4$ channels formed by a fourth convolution operator having a height of $hc_4$ pixel, a width of $hc_4$ pixel, and a depth of $dc_4$ channels with a stride of $sc_4$ performed upon the activation layer;

wherein $Hc_4=[(Ha_1-hc_4)/sc_4]+1$;

wherein $Dc_4=dc_4$;

and a softmax layer having a height of $Sm_1$ pixels, a width of $Sm_1$ pixels, and a depth of $Dsm_1$ channels formed by a softmax operator performed upon the quaternary convolution layer such that a continuously extending line in an image can be detected;

wherein $Sm_1=Hc_4$;

wherein $Dsm_1=Dc_4$.

In one arrangement, the first convolution operator has a height of 20 pixels, a width of 20 pixels, and a depth of 3 channels with a stride of 2.

In one arrangement, the first pooling operator has a height of 7 pixels and a width of 7 pixels with a stride of 2.

In one arrangement, the second convolution operator has a height of 15 pixels, a width of 15 pixels, and a depth of 24 channels with a stride of 2.

In one arrangement, the second pooling operator has a height of 4 pixels and a width of 4 pixels with a stride of 2.

In one arrangement, the third convolution operator has a height of 10 pixels, a width of 10 pixels, and a depth of 48 channels with a stride of 2.

In one arrangement, the fourth convolution operator has height of 1 pixel, a width of 1 pixel, and a depth of 96 channels with a stride of 1.

In one arrangement, the convolutional neural network comprises:

an input layer having a height of 256 pixels, a width of 256 pixels, and a depth of 3 channels;

said at least one convolution layer comprising a preliminary convolution layer, a secondary convolution layer, a tertiary convolution layer and a quaternary convolution layer;

said at least one pooling layer comprising a preliminary pooling layer and a secondary pooling layer;

the preliminary convolution layer having a height of 119 pixels, a width of 119 pixels, and a depth of 24 channels formed by a first convolution operator having a height of 20 pixels, a width of 20 pixels, and a depth of 3 channels with a stride of 2 performed upon the input layer;

the preliminary pooling layer having a height of 57 pixels, a width of 57 pixels, and a depth of 24 channels formed by a first pooling operator having a height of 7 pixels and a width of 7 pixels with a stride of 2 performed on the preliminary convolution layer;

the secondary convolution layer having a height of 22 pixels, a width of 22 pixels, and a depth of 48 channels formed by a second convolution operator having a height of 15 pixels, a width of 15 pixels, and a depth of 24 channels with a stride of 2 performed upon the preliminary pooling layer;

the secondary pooling layer having a height of 10 pixels, a width of 10 pixels, and a depth of 48 channels formed by a second pooling operator having a height of 4 pixels and a width of 4 pixels with a stride of 2 performed upon the secondary convolution layer;

the tertiary convolution layer having a height of 1 pixel, a width of 1 pixel, and a depth of 96 channels formed by a third convolution operator having a height of 10 pixels, a width of 10 pixels, and a depth of 48 channels with a stride of 2 performed upon the secondary pooling layer;

an activation layer having a height of 1 pixel, a width of 1 pixel, and a depth of 96 channels formed by a nonlinear activation function operator performed upon the tertiary convolution layer;

the quaternary convolution layer having a height of 1 pixel, a width of 1 pixel, and a depth of 2 channels formed by a fourth convolution operator having a height of 1 pixel, a width of 1 pixel, and a depth of 96 channels with a stride of 1 performed upon the activation layer;

and a softmax layer having a height of 1 pixel, a width of 1 pixel, and a depth of 2 channels formed by a softmax operator performed upon the quaternary convolution layer such that a continuously extending line in an image can be detected.

In one arrangement, the convolutional neural network further comprises a dropout layer intermediate the tertiary convolution layer and the activation layer.

In one arrangement, the nonlinear activation function operator comprises a rectified linear unit function.

Preferably, the first set of non-overlapping areas are arranged such that each one thereof is contiguous with at least one other of the first set at an edge of said each one of the first set.

Preferably, the second set of non-overlapping areas are arranged such that each one thereof is contiguous with at least one other of the second set at an edge of said each one of the second set.

Preferably, scanning the first set of non-overlapping areas captures an entirety of the image.

Preferably, the second set of non-overlapping areas may capture only a portion of the image.

Preferably, said portion of the image captured by the second set of non-overlapping areas has a periphery which substantially follows a periphery of the image, the periphery of the said portion of the image extending through each one of a series of the first set of non-overlapping areas arranged along the periphery of the image.

In one arrangement, when the defect to be detected includes a crack, the convolutional neural network is trained by programming instructions stored on a computer readable medium comprising:

a data structure including a set of training images each having a top edge, a bottom edge, and opposite sides edges;

wherein a first portion of the set of training images includes a crack and a second portion of the set of training images lack a crack;

the first portion of the set of training images comprising:
a first category of crack-containing images having a crack extending substantially horizontally across the image in a direction from one side edge to the other and spaced from the top and bottom edges of the image;
a second category of crack-containing images having a crack extending substantially vertically across the image in a direction from the top edge to the bottom edge and spaced from the side edges of the image;
a third category of crack-containing images having a crack extending diagonally across the image such that terminal ends of the crack are spaced substantially vertically and substantially horizontally apart from one another that is located within a region of the respective image spanning vertically between the top and bottom edges and horizontally between the side edges but excluding triangular areas each at one corner of the image formed by a portion of each of two edges of the image and a diagonal line interconnecting said portions;

and training instructions stored on the medium and executable by a computer processor for training the convolutional neural network with said data structure so that the convolutional neural network is enabled to detect the crack in the image of the surface.

In one arrangement, the ratio of a number of images forming each of the first portion of the set of training images including a crack and the second portion of the set of training images lacking a crack is 1:1.

In one arrangement, each of the set of training images has a 1:1 aspect ratio.

In one arrangement, the set of training images is formed from a plurality of photographs cropped to form smaller images each having a 1:1 aspect ratio.

In one arrangement, each photograph forms a plurality of smaller images with 1:1 aspect ratio. In one arrangement, the cracks in each of the first category of crack-containing images, the second category of crack-containing images and the third category of crack-containing images are located generally centrally with respect to a direction transverse to the direction in which a respective one of the cracks extends across a respective one of the training images.

In one arrangement, the machine learning algorithm comprises a region-based convolutional neural network which includes the convolutional neural network having the at least one convolutional layer and the at least one max pooling layer, the region-based convolutional neural network further including:

a region of interest pooling layer for receiving regions of interest of a feature map formed by an output of the convolutional neural network and by object proposals generated by a selective search performed on the image, the regions of interest being delimited by the object proposals, and for generating feature vectors;

a set of fully connected layers for receiving the feature vectors; and parallel softmax and regressor layers after the set of fully connected layers for classifying and identifying the defect which can be found in the image.

In one such arrangement, the convolutional neural network includes:
a first convolutional layer;
a second convolutional layer;
a first max pooling layer after the second convolutional layer;
a third convolutional layer after the first max pooling layer;
a fourth convolutional layer;
a second max pooling layer after the fourth convolutional layer;
a fifth convolutional layer after the second max pooling layer;
a sixth convolutional layer;
a seventh convolutional layer;
a third max pooling layer after the fourth convolutional layer;
an eighth convolutional layer after the third max pooling layer;
a ninth convolutional layer;
a tenth convolutional layer;
a fourth max pooling layer after the tenth convolutional layer;
an eleventh convolutional layer after the fourth max pooling layer;
a twelfth convolutional layer; and
a thirteenth convolutional layer;
the region of interest pooling layer of the convolutional network being after the thirteenth convolutional layer.

In another arrangement, the region-based convolutional neural network is a first region-based convolutional neural network of the machine learning algorithm, and the machine learning algorithm includes a second region-based convolutional neural network including the first region-based neural network and a region proposal network;

the first region-based neural network and the region proposal network sharing said at least one convolutional layer and said at least one max pooling layer which collectively define shared convolutional neural network layers;

the region proposal network including, in addition to the shared convolutional neural network layers:
a sliding convolutional layer after the shared convolutional neural network layers;
a fully connected layer; and In one such arrangement, the shared convolutional neural network layers include:
a first convolutional layer;
a first local response normalization layer after the first convolutional layer;
a first max pooling layer after the first local response normalization layer;
a second convolutional layer after the first max pooling layer;
a second local response normalization layer after the second convolutional layer;
a second max pooling layer after the second local response normalization layer;
a third convolutional layer after the second max pooling layer;
a fourth convolutional layer; and
a fifth convolutional layer.

In some arrangements having a region-based convolutional neural network, there is provided a dropout layer between each consecutive pair of the fully connected layers.

In some arrangements having a region-based convolutional neural network, each convolutional layer is followed by a rectified linear unit activation function.

In one arrangement, the image comprises a sequence of images forming a video, and displaying the image comprises displaying the video with the location of the defect, if determined to be present, being indicated in each one of the sequence of images.

In one arrangement, the computer-implemented method includes displaying only those areas of the image which contain the defect, in the event that the image is determined to have the defect.

In one arrangement, those areas of the image which are displayed are defined by respective ones of the first set of non-overlapping areas and the second set areas of non-overlapping areas which contain the defect.

BRIEF DESCRIPTION OF THE FIGURES OF THE DRAWINGS AND TABLES

The invention will now be described in conjunction with the accompanying drawings in which.

Figure 1:
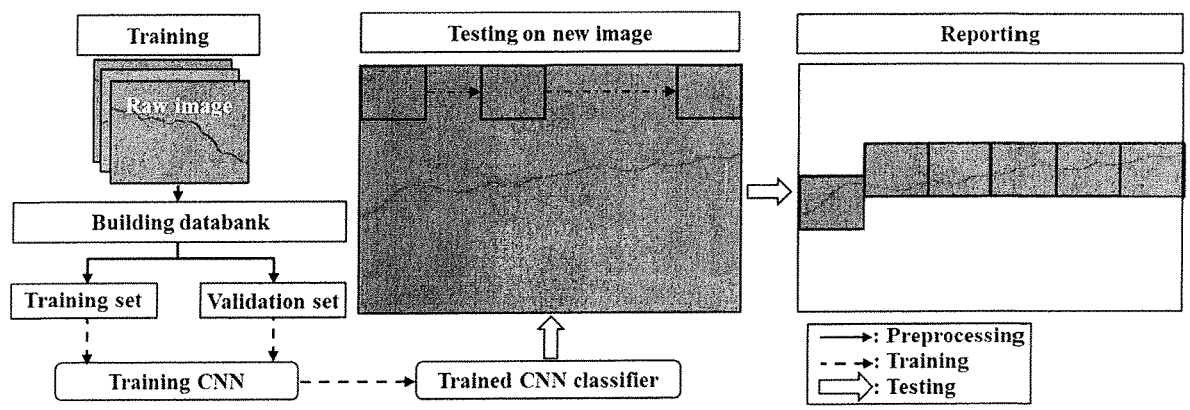
FIG. 1 is a flow chart of a first embodiment of system and method for detecting a defect in a surface according to the present invention, where the example defect is a crack in a concrete surface.
Figure 6A:
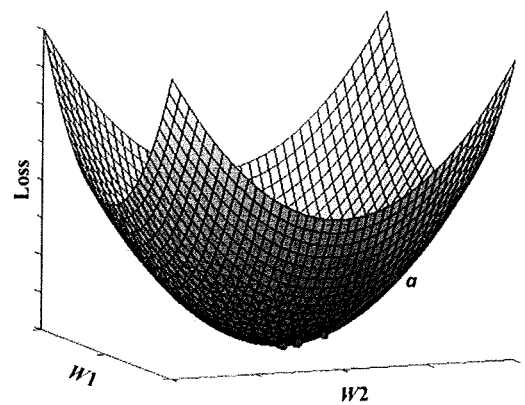
Figure 6B:
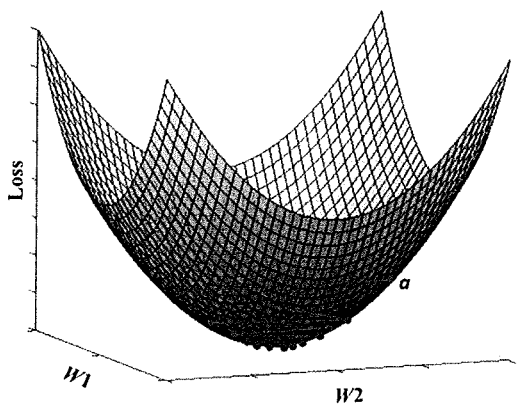
Figure 11:
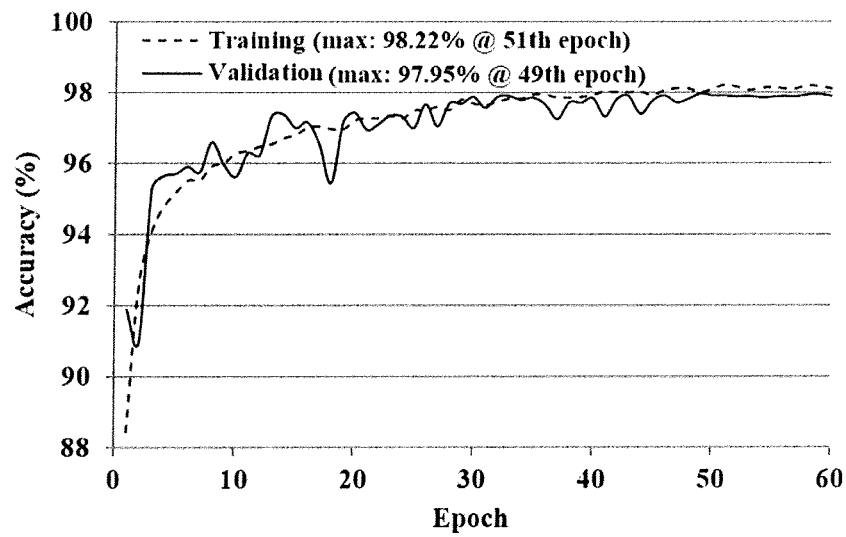
Figure 12A:
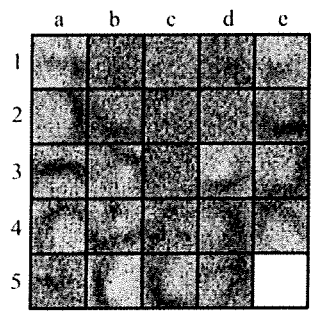
Figure 12B:
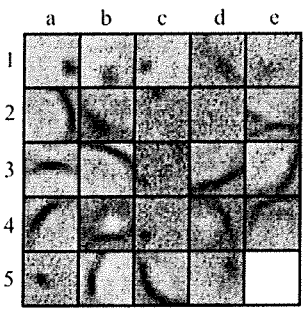
Figure 13:
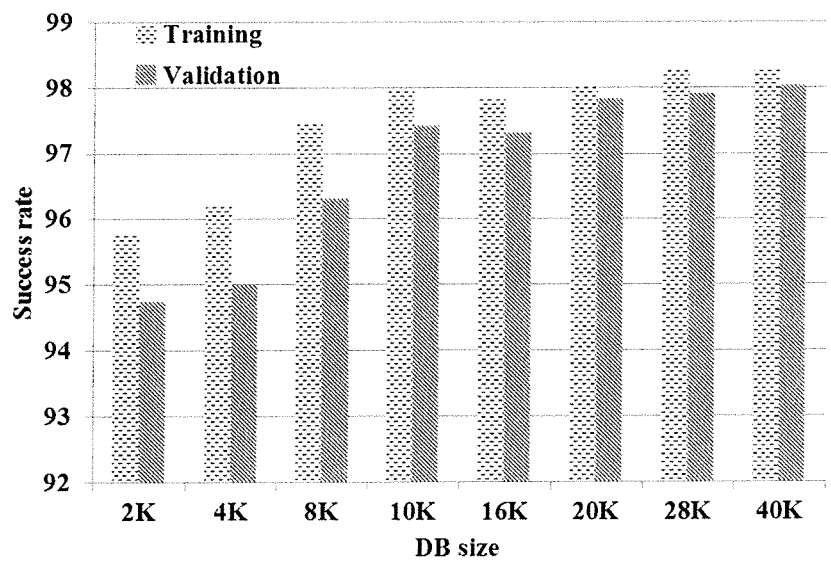
Figure 14A:
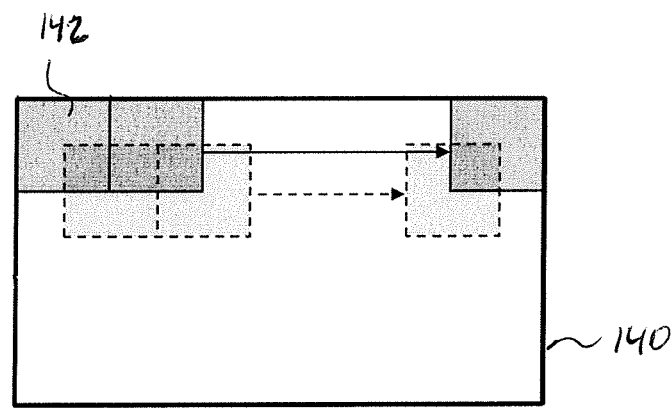
Figure 14B:
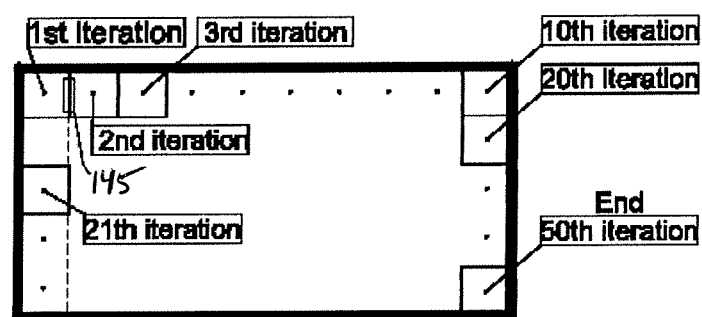
Figure 14C:
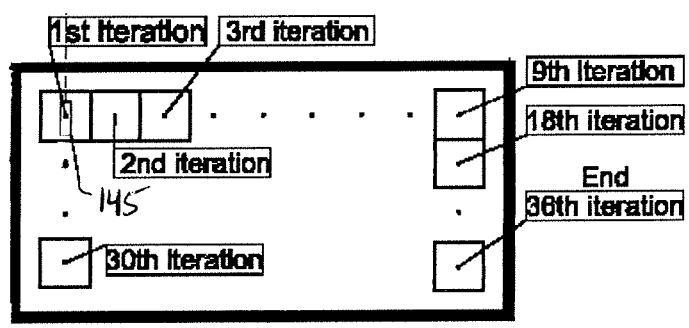
Figure 21:
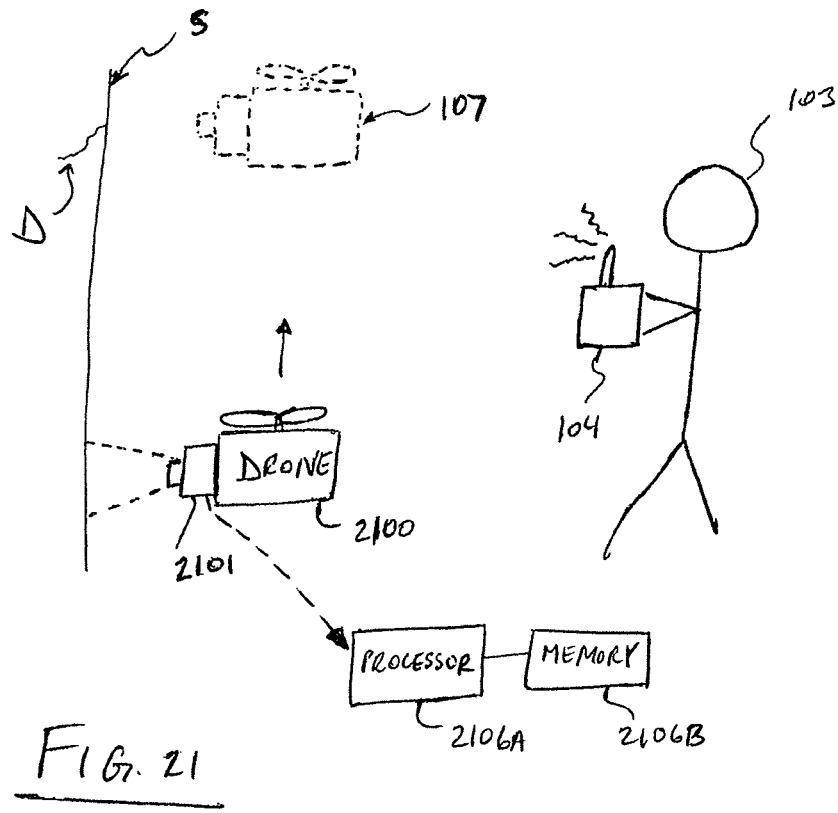
Figure 22:
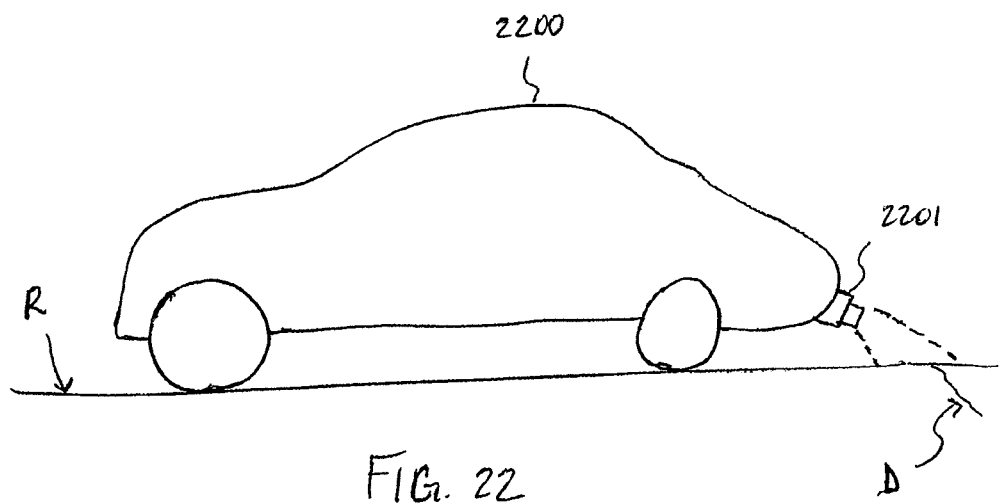
Figure 23:
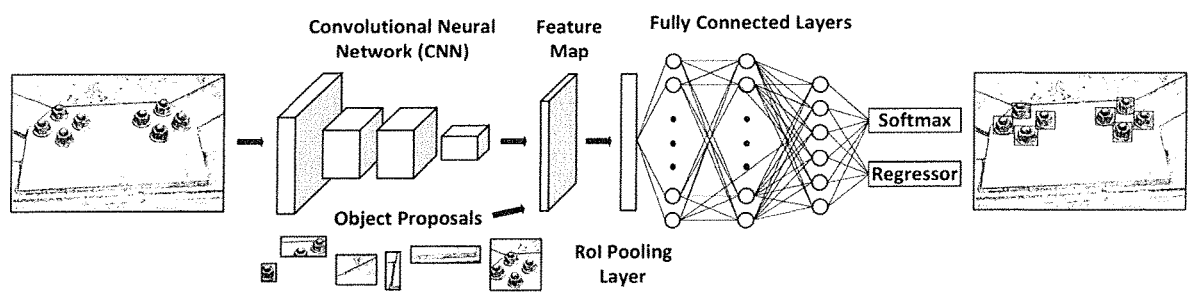
Figure 24:
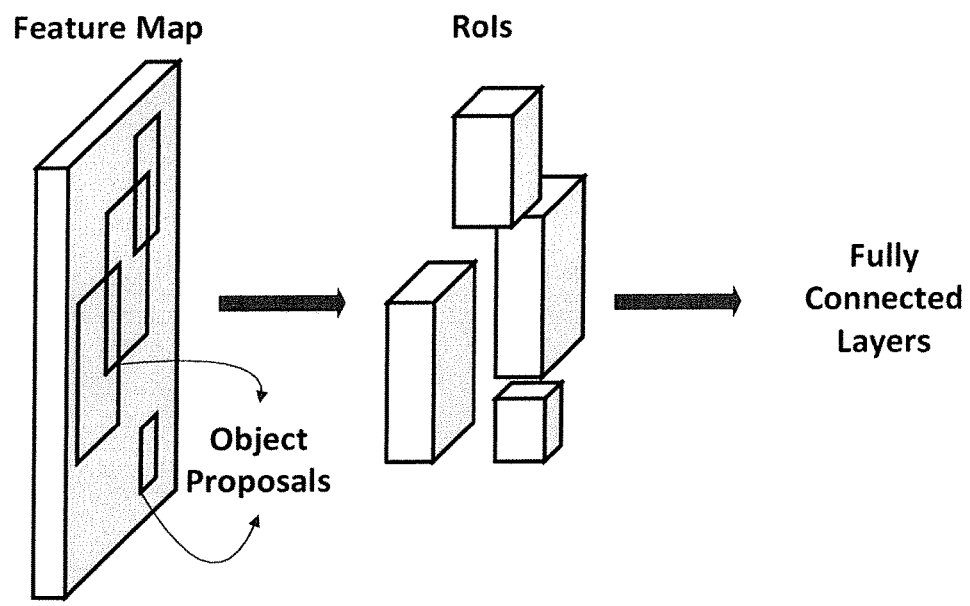
Figure 25:
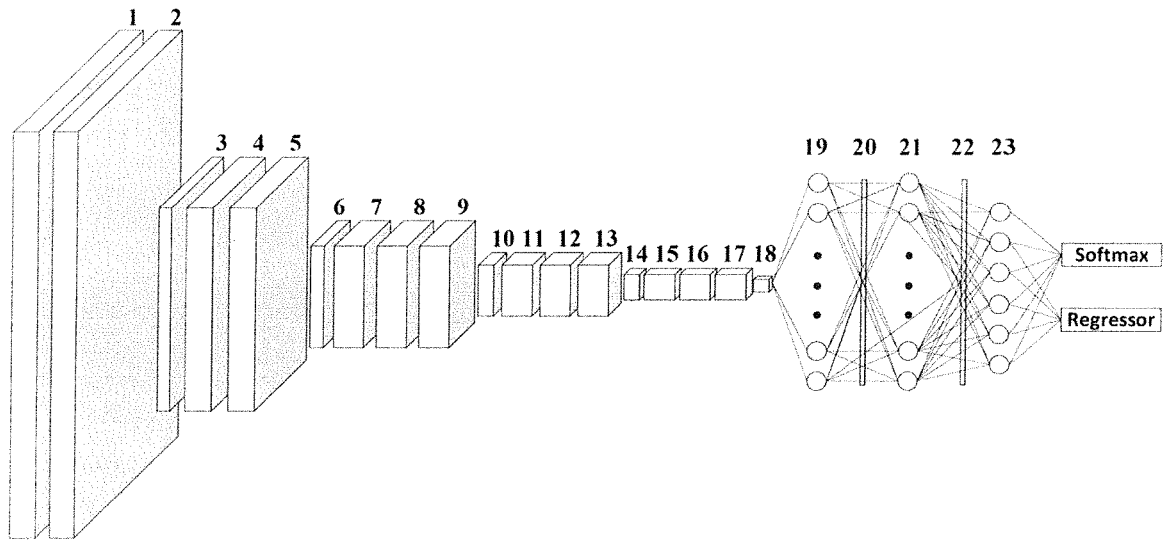
Figure 26:
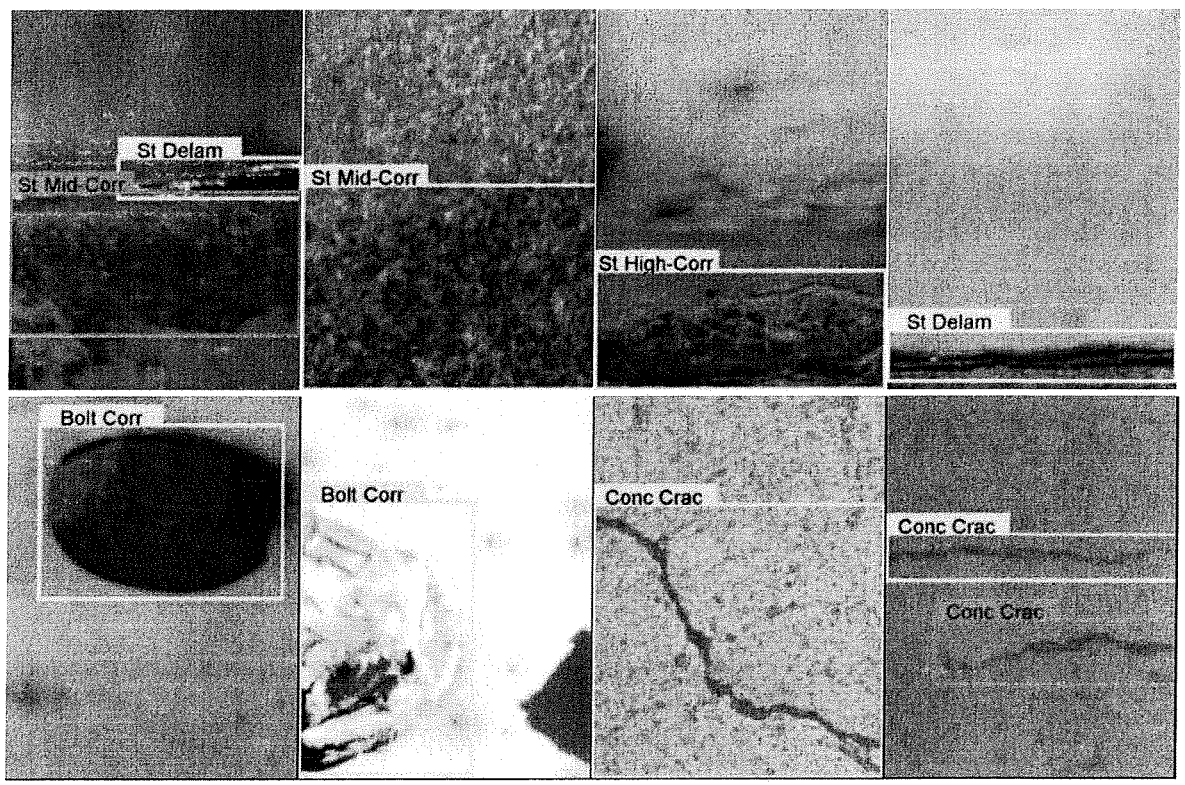
Figure 28E:
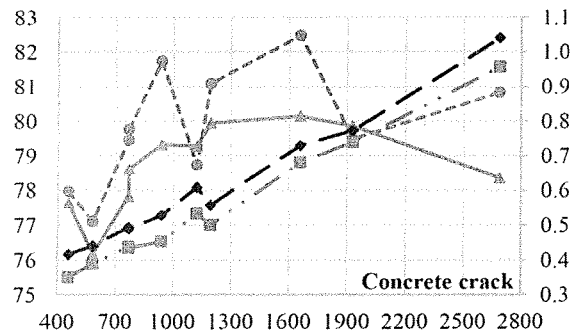
Figure 28F:
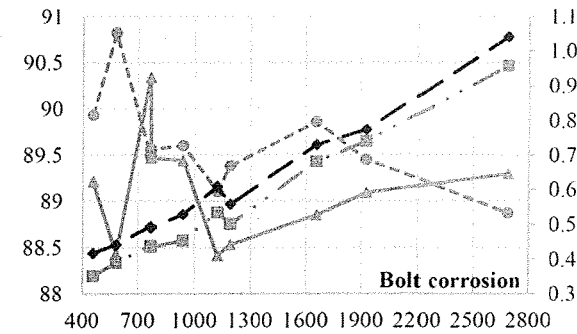
Figure 29A:
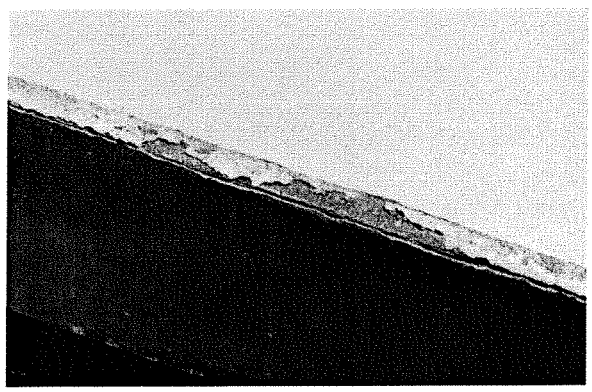
Figure 29A:
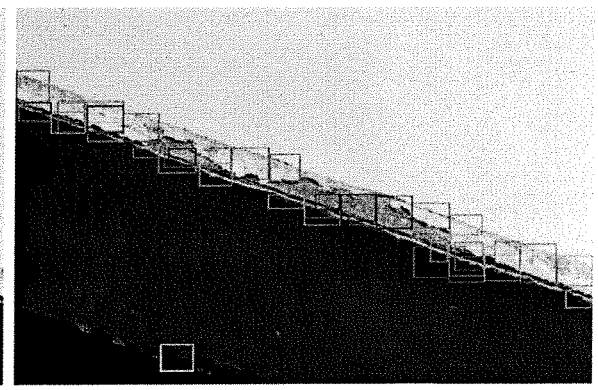
Figure 29B:
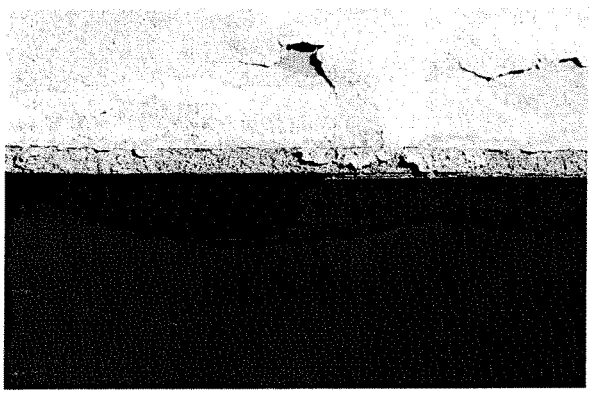
Figure 29B:
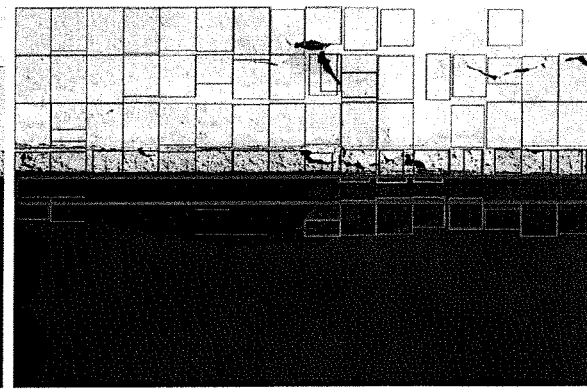
Figure 29C:
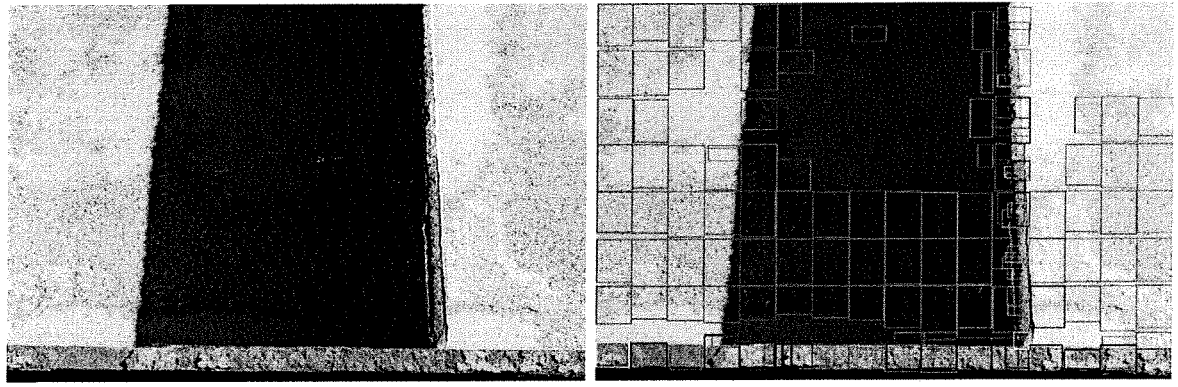
Figure 30A:
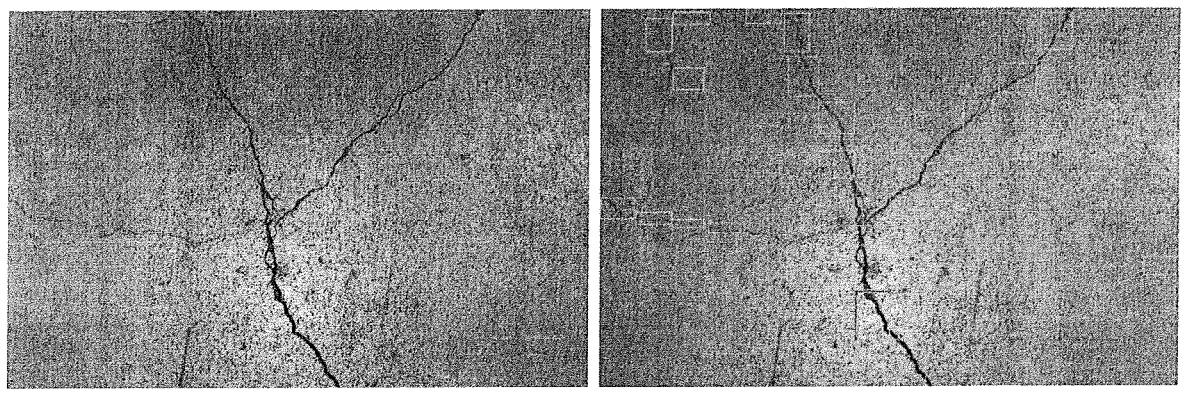
Figure 30B:
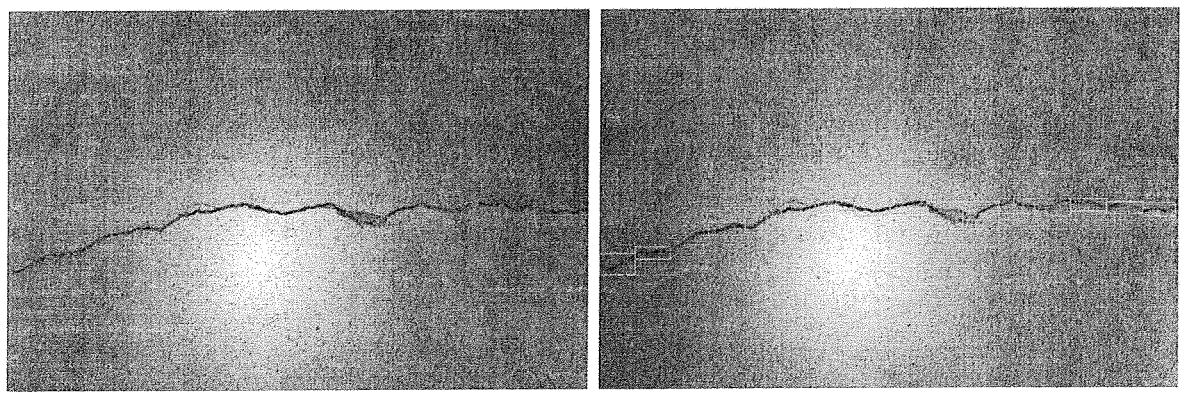
Figure 30C:
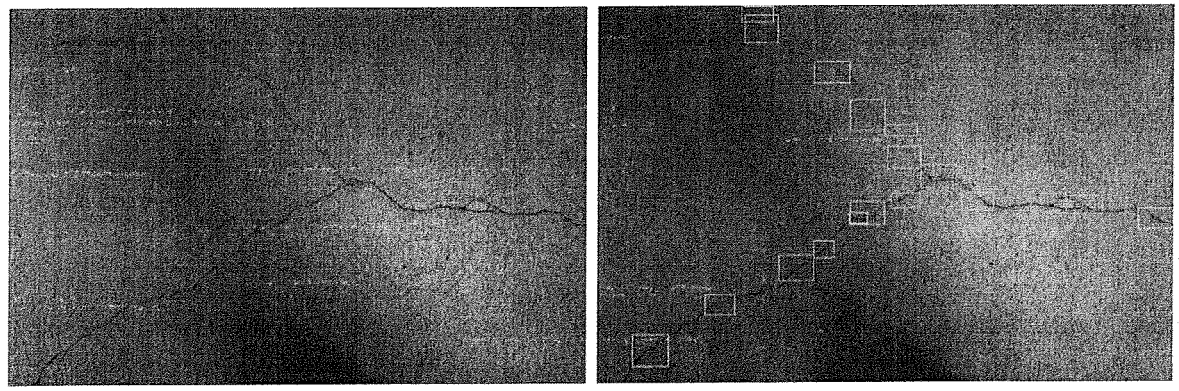
Figure 30D:
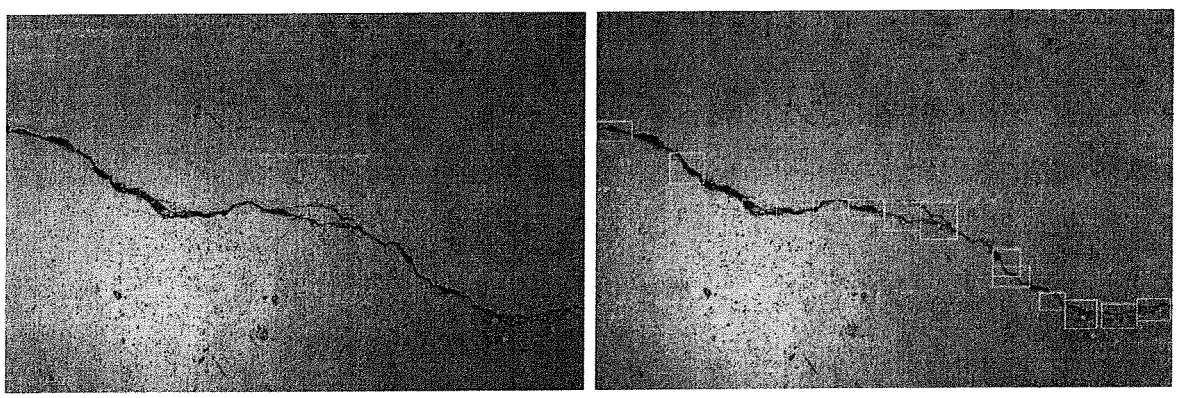
Figure 32A:
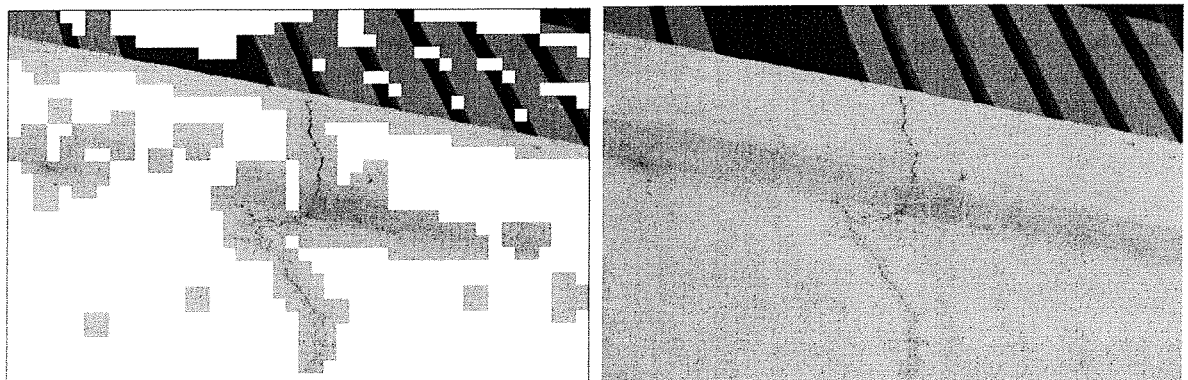
Figure 32B:
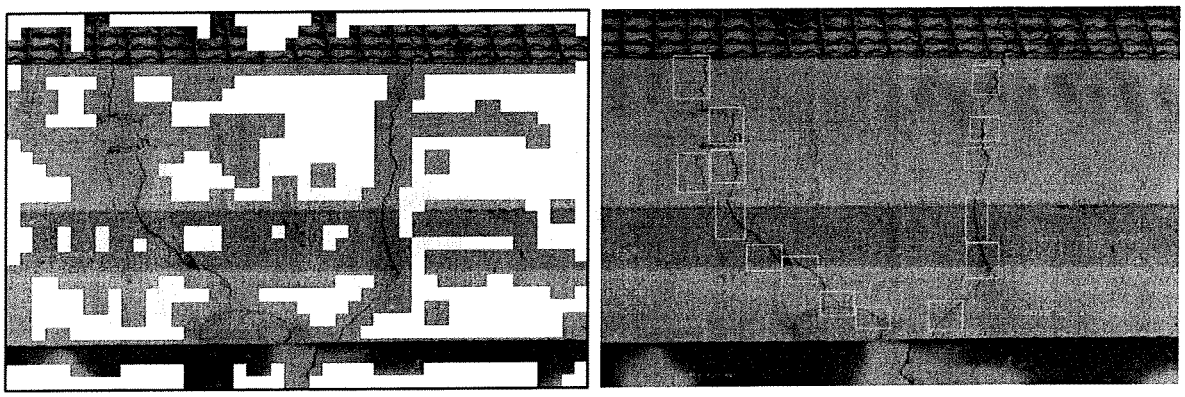
Figure 32C:
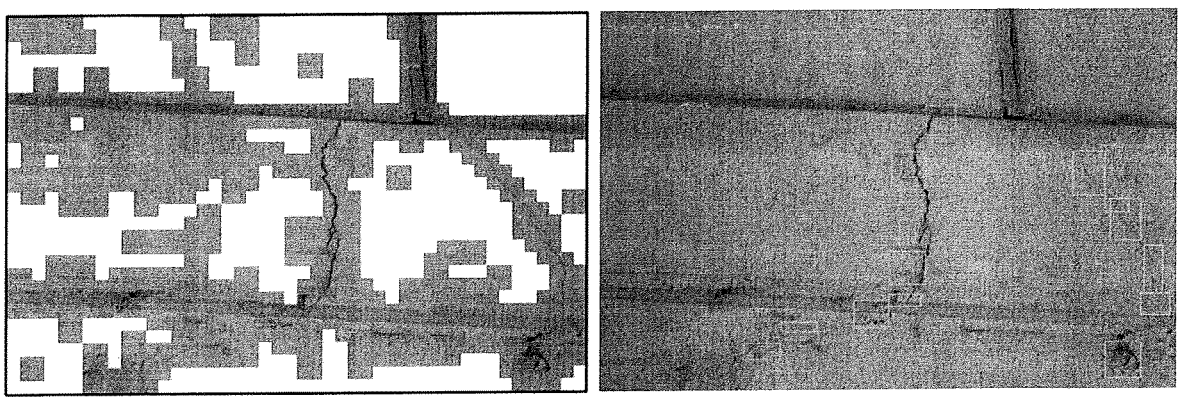
Figure 33:
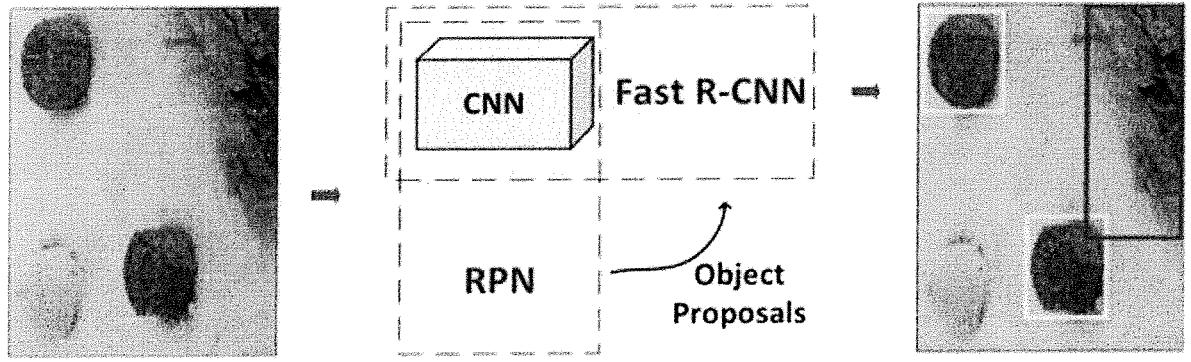
Figure 34:
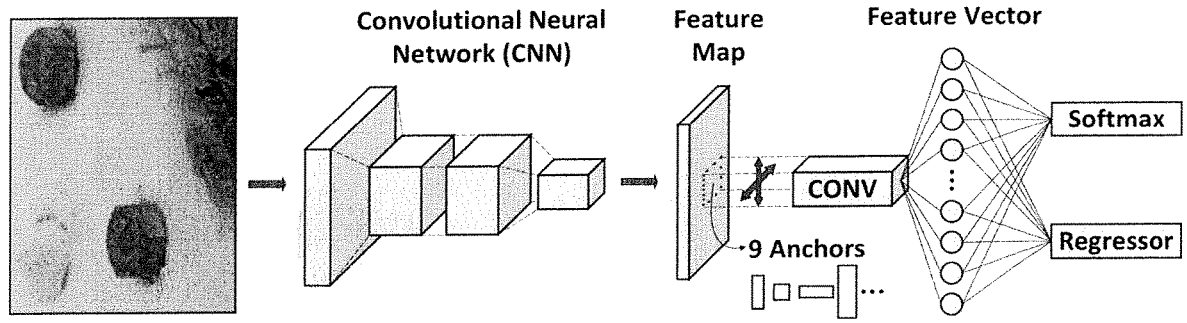
Figure 35:
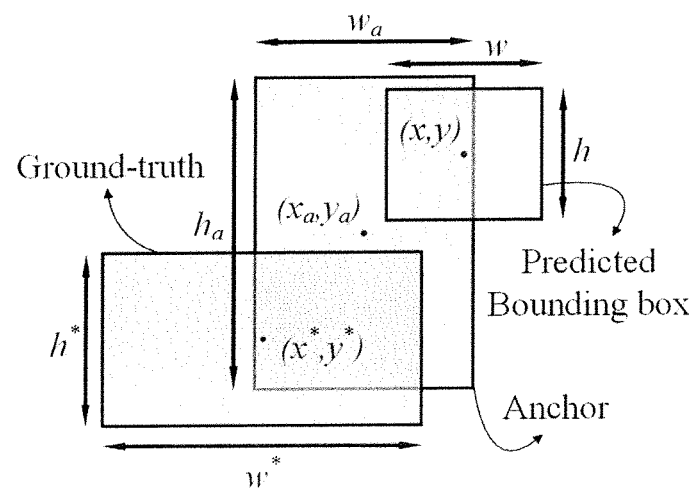
Figure 36:
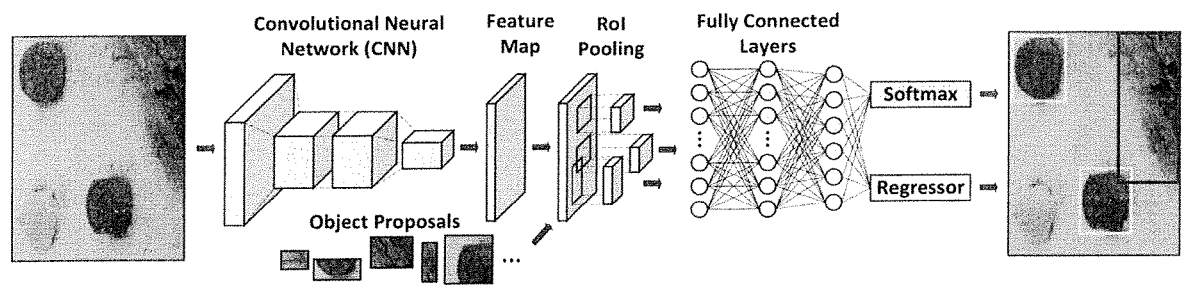
Figure 37:
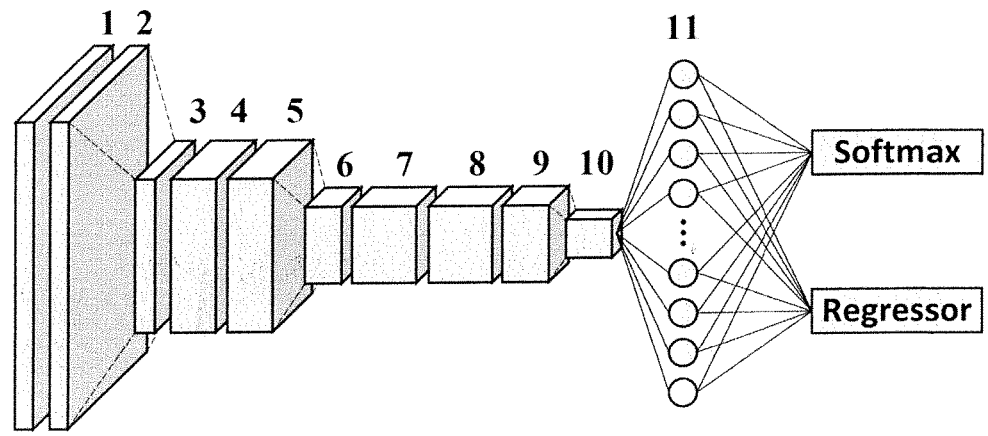
Figure 38:
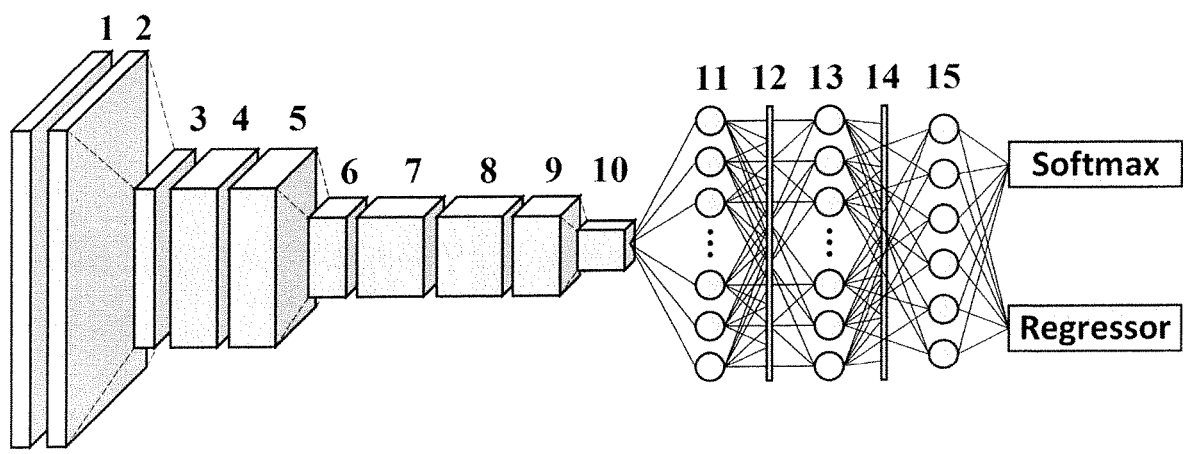
Figure 39:
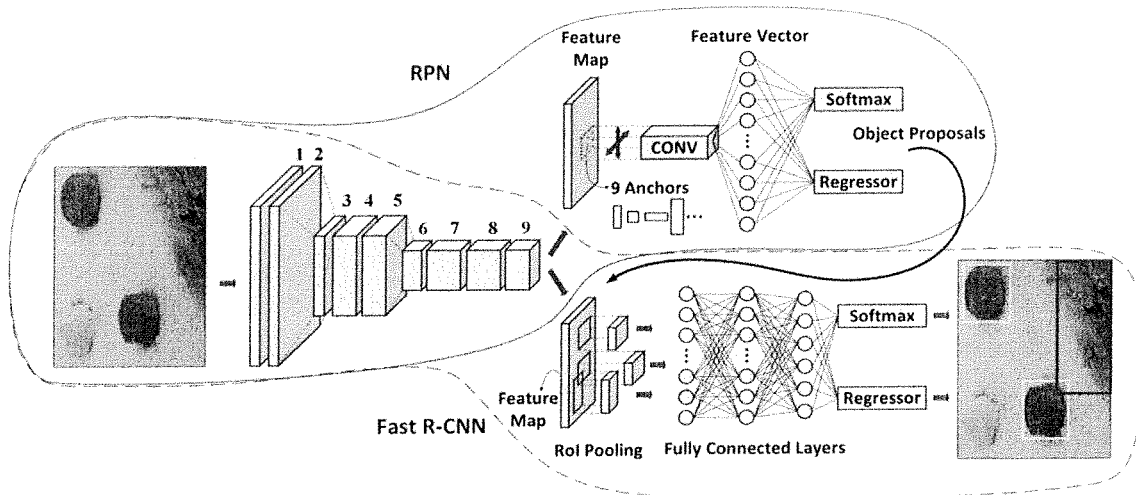
Figure 40:
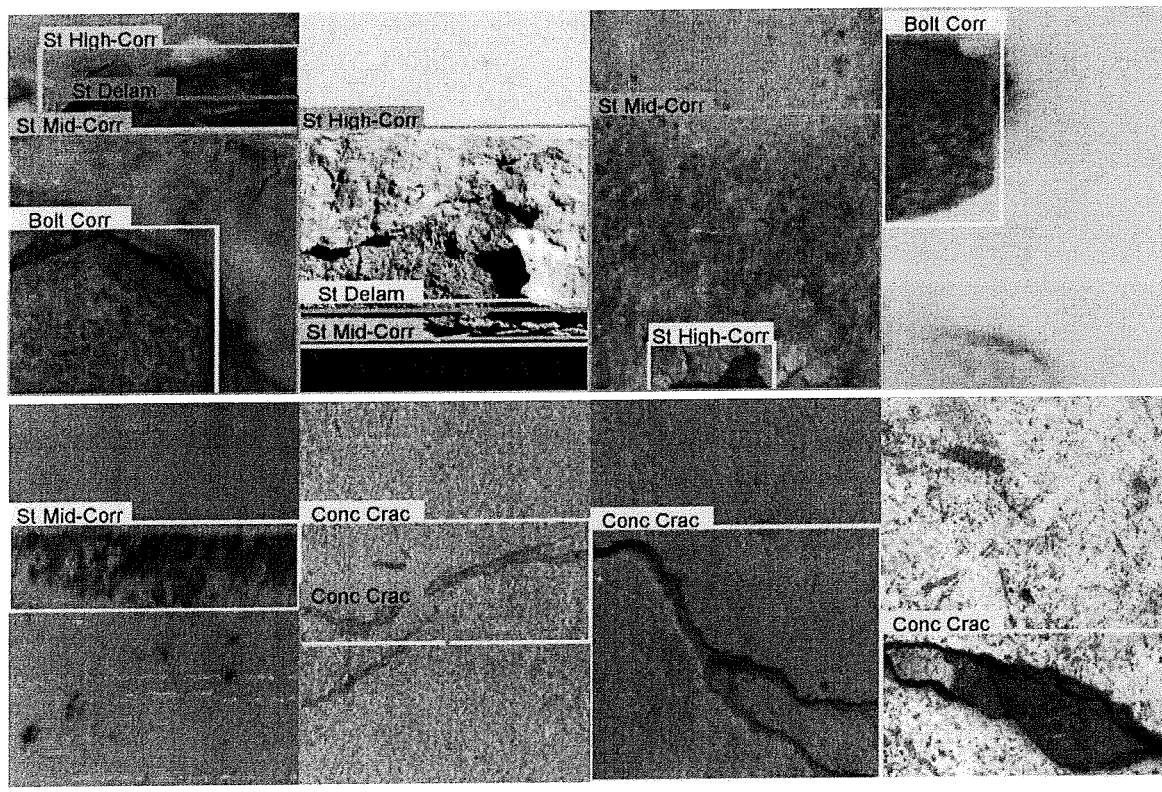
Figure 41:
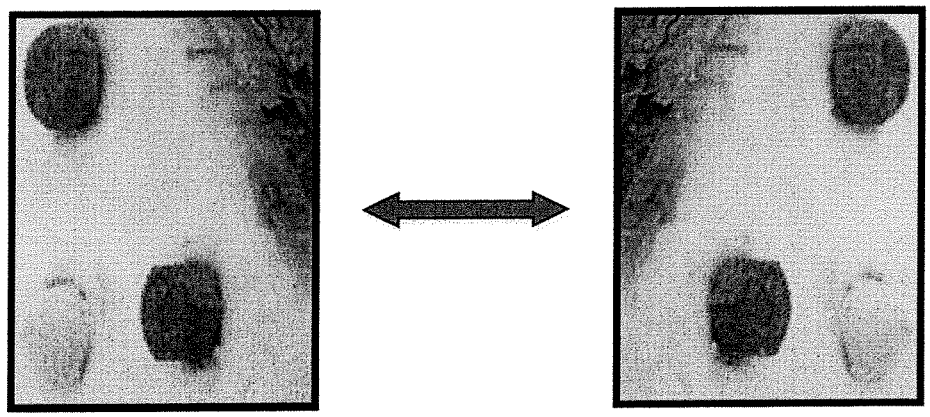
Figure 42:
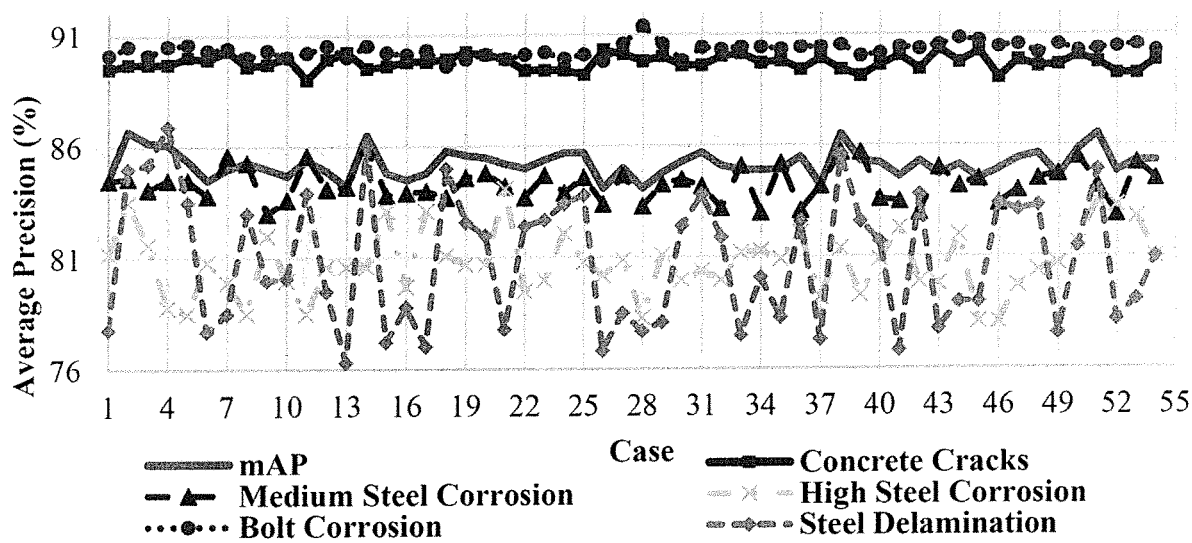
Figure 43A:
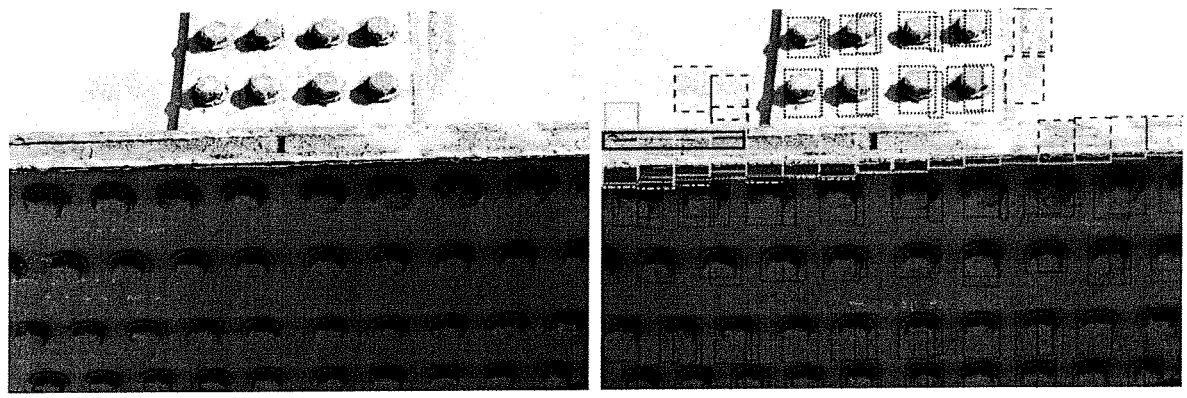
Figure 43B:
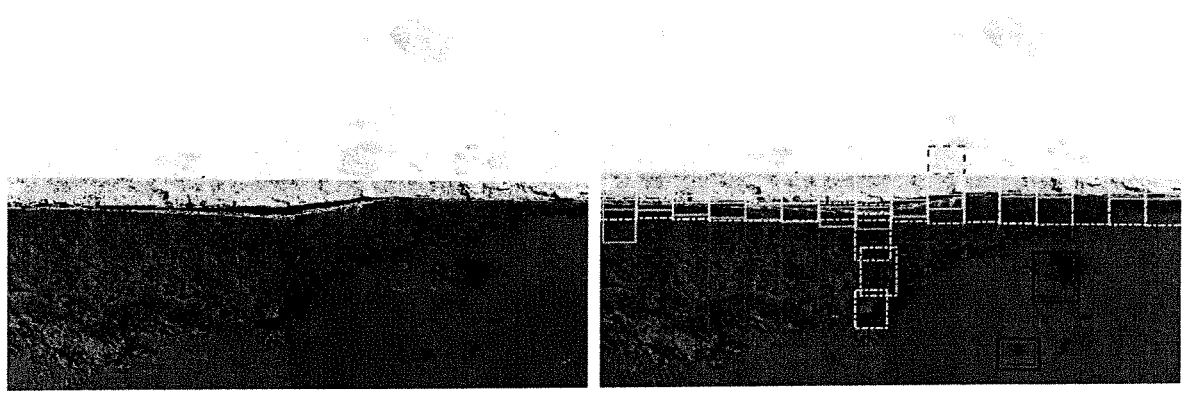
Figure 43C:
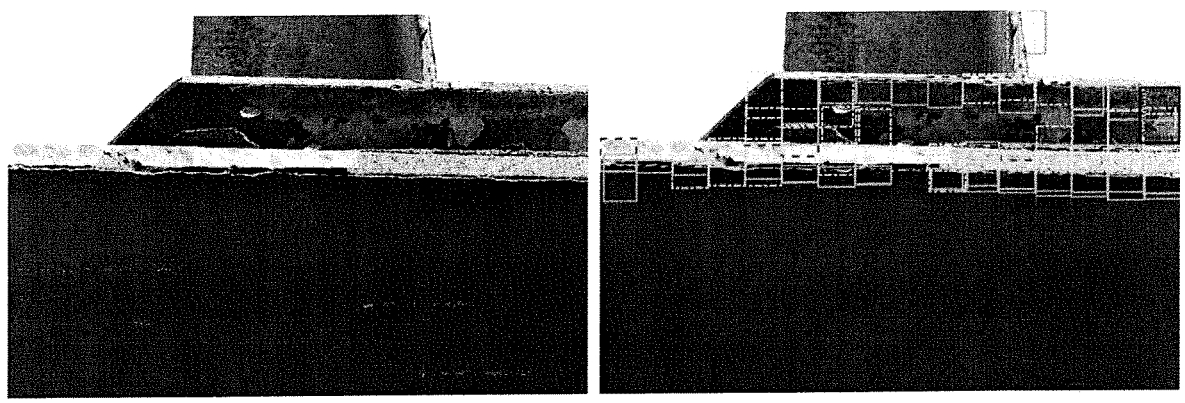
Figure 46:
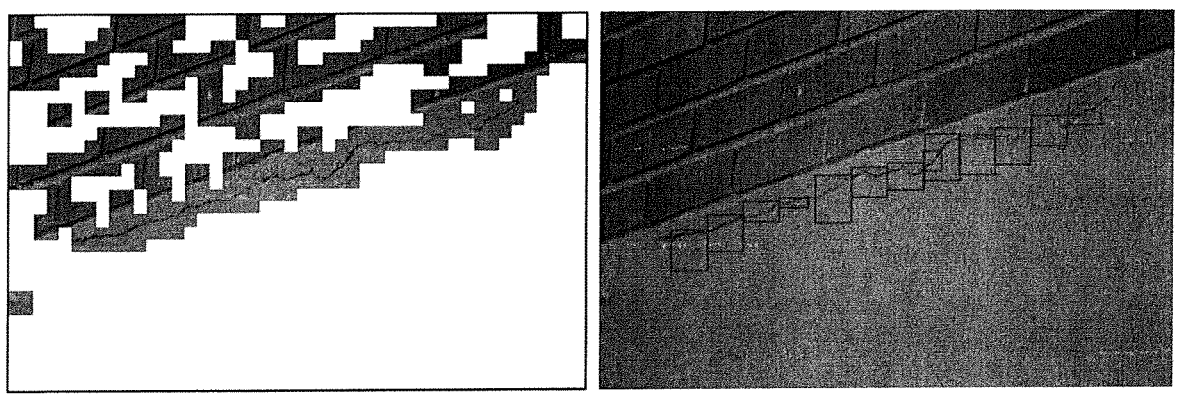
Figure 47:
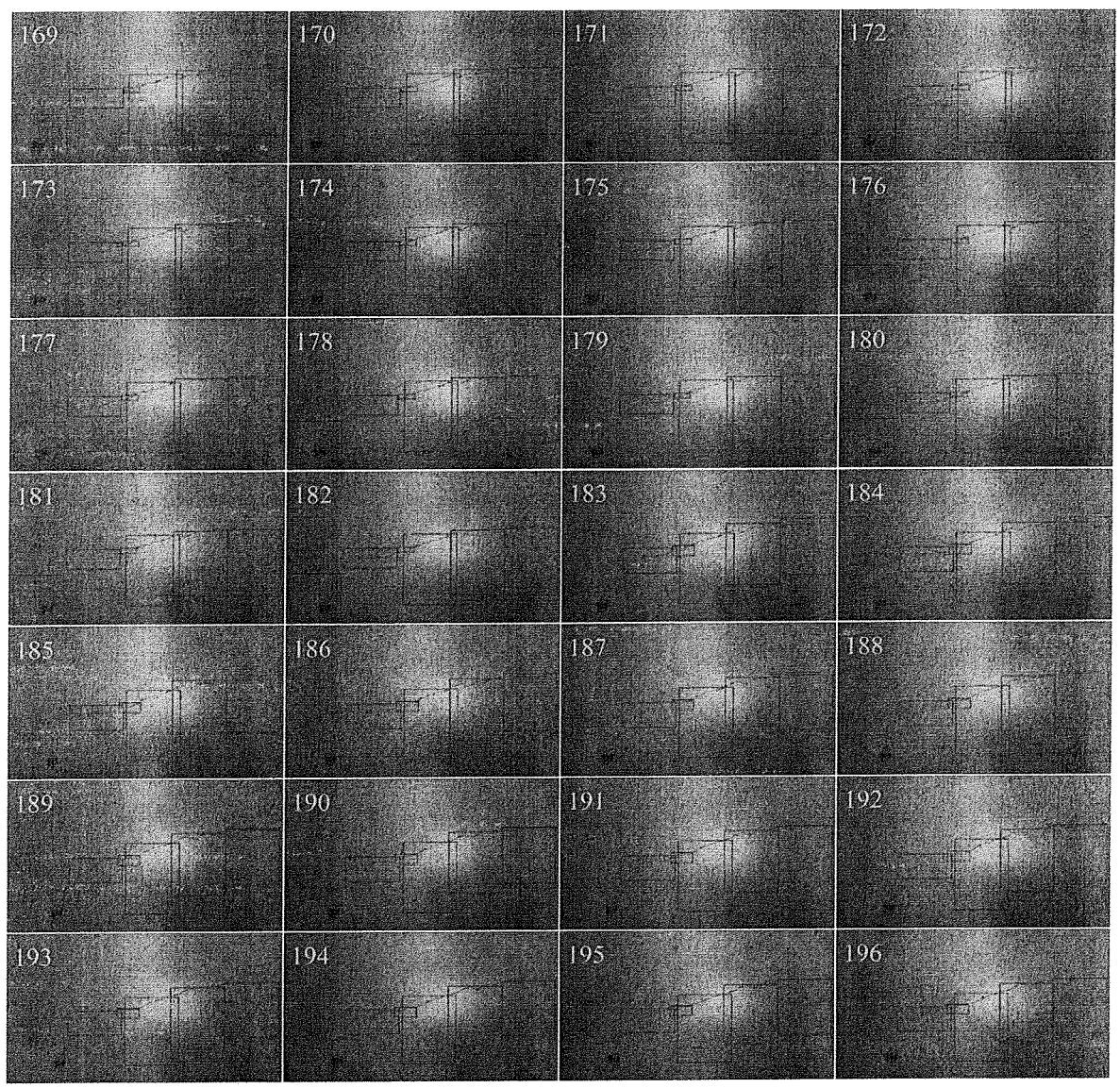

FIGS. 6A-B show example small and large learning rates of a gradient decent loss algorithm, respectively;

FIGS. 7A-C are schematic diagrams for selecting a suitable image for forming the training data set if the direction in which the crack extends is substantially horizontal, vertical or diagonal, respectively;

FIGS. 8A-C are examples of various types of images including fine images, distorted images and strong light spotted images, respectively, used in a training set for training the first arrangement;

FIG. 9 shows examples of images not selected for the training set;

FIG. 10 is a graph of a learning rate used in training;

FIG. 11 is a graph of accuracies for each epoch during training;

FIGS. 12A-B show learned features of a less-trained network after the first epoch, and a better-trained network after the $51^{st}$ epoch;

FIG. 13 is a graph of training and validation results of the first arrangement for various size of image database;

FIG. 14A is a schematic diagram showing a scanning plan;

FIG. 14B is a schematic diagram showing in more detail a first scanning step of the scanning plan of FIG. 14A;

FIG. 14C is a schematic diagram showing in more detail a first scanning step of the scanning plan of FIG. 14A;

FIGS. 15A-E show results of image scanning using a trained CNN for thin cracks, thin cracks and lighting spot, shadowed image, close-up image and close-up, blurred and strong light spot, respectively;

FIGS. 16A-D represent case 1 with normal, uniform lighting showing the original image, the result generated by the proposed CNN, the result generated by Canny edge detection and the result generated by Sobel edge detection, respectively;

FIGS. 17A-D represent case 2 with normal, uniform lighting showing the original image, the result generated by the proposed CNN, the result generated by Canny edge detection and the result generated by Sobel edge detection, respectively;

FIGS. 18A-D represent a thin crack case showing the original image, the result generated by the proposed CNN, the result generated by Canny edge detection and the result generated by Sobel edge detection, respectively;

FIGS. 19A-D represent a shadowed case showing the original image, the result generated by the proposed CNN, the result generated by Canny edge detection and the result generated by Sobel edge detection, respectively;

FIGS. 20A-D represent a thin crack with lighting case showing the original image, the result generated by the proposed CNN, the result generated by Canny edge detection and the result generated by Sobel edge detection, respectively;

FIG. 21 is a schematic illustration of a practical application of the embodiments for detecting a defect in a surface according to the present invention comprising an aerial drone with a camera lens scanning an upstanding surface;

FIG. 22 is a schematic illustration of a practical application of the embodiments for detecting a defect in a surface according to the present invention comprising a motor vehicle with a camera lens scanning a ground surface;

FIG. 23 schematically illustrates an architecture of a second embodiment of system and method for detecting a defect in a surface according to the present invention;

FIG. 24 schematically illustrates an architecture of a region of interest pooling layer of the second embodiment of FIG. 23;

FIG. 25 schematically illustrates a VGG-16 architecture of the second embodiment of FIG. 23;

FIG. 26 shows sample images used for training the second embodiment of system and method;

FIG. 27 shows graphs of minimization of loss function of the second embodiments of FIG. 23 which is represented by Equation 6 in the Detailed Description section;

FIG. 28A-F show graphs of variations in AP and testing times for mean average precision, medium steel corrosion, steel delamination, high steel corrosion, concrete crack and bolt corrosion, respectively for various numbers of object proposals, where horizontal, left vertical and right vertical axes correspond to the number of object proposals, AP and time, respectively;

FIGS. 29A-C show examples of output of the second embodiment of system and method when fed images showing primarily steel delamination, the original image being on the left and the output shown on the right;

FIGS. 30A-D show examples of output of the second embodiment of system and method when fed images showing primarily concrete cracks, the original image being on the left and the output shown on the right;

FIGS. 31A-D show examples of output of the second embodiment of system and method when fed images showing corroded steel bolts and plates, the original image being on the left and the output shown on the right;

FIGS. 32A-C show comparative outputs of the first embodiment and second embodiment of system and method according to the present invention;

FIG. 33 schematically illustrates a high-level architecture of a third embodiment of system and method for detecting a defect in a surface according to the present invention;

FIG. 34 schematically illustrates an architecture of a region proposal network of the third embodiment of FIG. 33;

FIG. 35 schematically illustrates a geometry of an anchor, a predicted bounding box, and a ground-truth box of the region proposal network of FIG. 34;

FIG. 36 schematically illustrates an architecture of a fast-type of R-CNN of the third embodiment of FIG. 33;

FIG. 37 schematically illustrates a modified architecture of ZF-net for RPN as used in the third embodiment of FIG. 33;

FIG. 38 schematically illustrates a modified architecture of ZF-net for the fast-type R-CNN used in the third embodiment of FIG. 33;

FIG. 39 schematically illustrates the architecture of the third embodiment of FIG. 33 in greater detail than that shown in FIG. 33;

FIG. 40 shows examples of images of defects which are annotated with bounding boxes and labels;

FIG. 41 schematically illustrates a concept of horizontal flipping for data augmentation performed on training and validation data sets used by the third embodiment of FIG. 33;

FIG. 42 shows a graph of a performance of the third embodiment of FIG. 33 for a testing set;

FIGS. 43A-C show examples of output of the third embodiment of system and method when fed images showing primarily steel delamination, the original image being on the left and the output shown on the right;

FIGS. 44A-D show examples of output of the third embodiment of system and method when fed images showing primarily concrete cracks, the original image being on the left and the output shown on the right;

FIGS. 45A-D show examples of output of the third embodiment of system and method when fed images showing corroded steel bolts and plates, the original image being on the left and the output shown on the right;

FIG. 46 shows comparative outputs of the first embodiment and the third embodiment of system and method according to the present invention;

FIG. 47 shows 28 sequential frames of an example video processed by the third embodiment of FIG. 33;

Table 1 shows dimensions of layers and operations of the first embodiment of FIG. 1;

Table 2 shows the summarized results of scanned images of the first embodiment of FIG. 1; Table 3 provides a detailed specification of the VGG-16 architecture layers of FIG. 25 which relates to the second embodiment of FIG. 23;

Table 4 provides a proportion of training and validation sets for the second embodiment of FIG. 23;

Table 5 provides detailed parameters of each experimental case of the second embodiment of FIG. 23;

Table 6 summarizes performance of the second embodiment of FIG. 23 for its validation set;

Table 7 shows detailed specifications of layers of a RPN of the third embodiment of FIG. 33;

Table 8 shows detailed specifications of layers of the fast-type R-CNN of the third embodiment of FIG. 33;

Table 9 provides a proportion of training, validation and testing sets for the third embodiment of FIG. 33; and Table 10 summarizes performance of the third embodiment of FIG. 33 for its testing set.

In the drawings like characters of reference indicate corresponding parts in the different figures.

DETAILED DESCRIPTION

The accompanying figures illustrate computer-implemented arrangements for detecting defects in surfaces.

In FIGS. 1-20 is shown a first embodiment of such a computer-implemented arrangement in which a CNN is used to build a classifier for detecting concrete cracks from images. The first aspect is to build a robust classifier that is less influenced by noise introduced into an image by effects such as lighting, shadow casting, and blur, so as to provide better practical adaptability. The second objective is to build an initial test bed that will allow other researchers to detect additional types of structural damage, such as delamination, voids, spalling, and corrosion of concrete and steel members. In this CNN-based detection of concrete cracks there is no feature extraction and calculation which is performed in order to detect the defect.

FIG. 1 shows the method's general flow with training steps (in solid lines) and testing steps (in dashed lines). In order to train a CNN classifier, raw images of concrete surfaces with a broad range of image variations, including lighting, shadow, etc. capable of potentially triggering false alarms, are taken from a building using a DSLR camera. Some of the images used contains cracks, while others do not. A total of 332 raw images were used (i.e., 277 images with 4928×3264 pixel resolutions for training and validation and 55 images for testing with 5888×3584 pixel resolutions).

The 277 images are cropped into small images (256×256 pixel resolutions), which are manually annotated as crack or intact images in order to generate a database (DB). From the DB, the small cropped images are randomly selected in order to generate training and validation sets. The prepared training image set is fed into a CNN in order to build a CNN classifier for separating cracked from intact concrete images in the validation set. When the CNN classifier is validated through the validation set of images in the DB, 55 additional concrete images with 5888×3584 pixel resolutions are taken and scanned by the validated classifier in order to generate a report of crack damages.

The general CNN architecture can be created using multiple layers, such as input, convolution, pooling, activation, and output layers; convolution and pooling operations are conducted in the convolution and pooling layers. A deep CNN refers to an architecture having many layers. Some other auxiliary layers, such as dropout and batch normalization layers, can be implemented within the aforementioned layers in accordance with the purposes of use. The software toolbox of MatConvNet (Vedaldi and Lenc, 2015) can be used in order to implement the CNN architecture.

Figure 2:
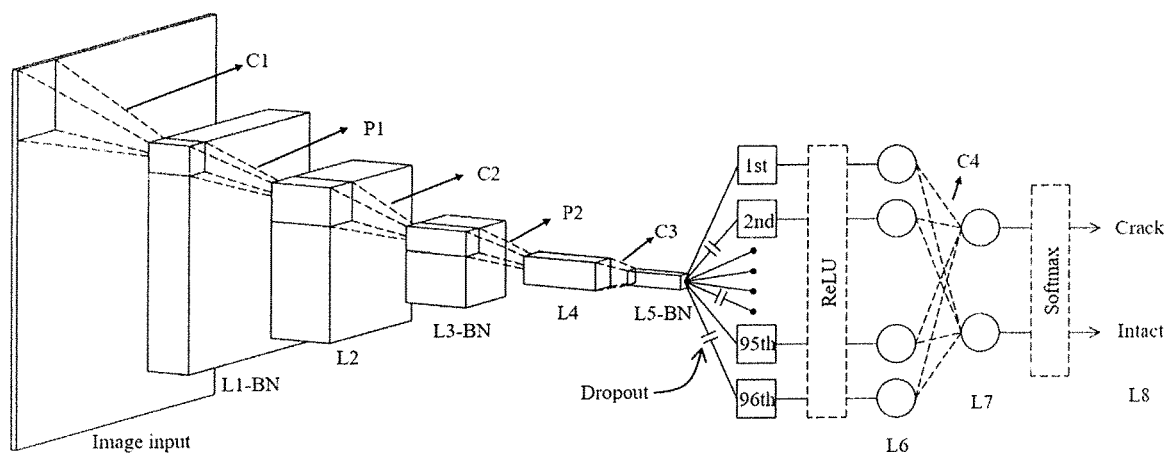
FIG. 2 is a schematic diagram of an overall architecture of the first arrangement.

FIG. 2 presents the CNN architecture, which is the original configuration for concrete crack detection. In FIG. 2, L # refers to layers corresponding to operations (L1, L3, L5, L7: convolution layers; L2, IA: pooling layers; L6: ReLU layer; L8: softmax layer); C #: convolution; P #: pooling; BN: Batch normalization. The first layer is the input layer of 256×256×3 pixel resolutions, where each dimension indicates height, width, and channel (e.g., red, green, and blue), respectively. Input data passes through the architecture and are generalized with spatial size reduction to 1×1×96 at L5. The vector, including the 96 elements, is fed into the rectified linear unit (ReLU) layer, which is an activation layer. Finally, the softmax layer predicts whether each input data is a cracked or intact concrete surface after the convolution of C4. Table 1 lists the detailed dimensions of each layer and operation. Batch normalization and dropout layers, which cannot be visualized, are also used. Batch normalization (BN) layers are located after L1, L3, and L5, and a dropout layer is located after the batch normalization layer of L5.

Figure 3:
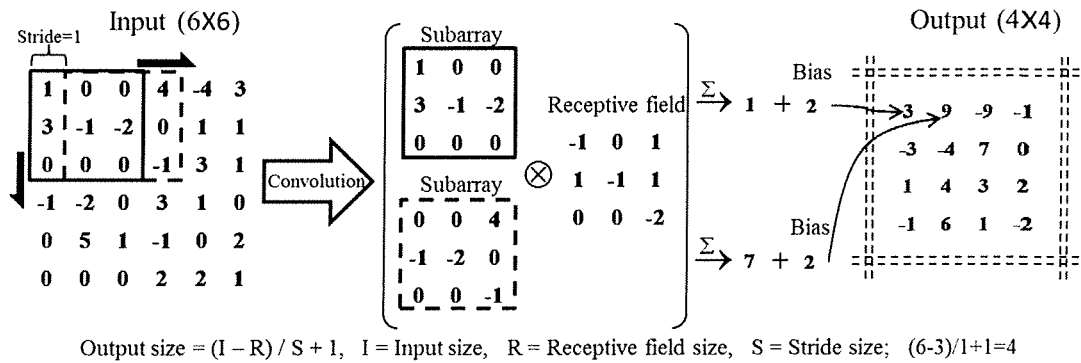
FIG. 3 shows one example of operations in a convolution layer.

A convolution layer performs the following three operations throughout an input array as shown in FIG. 3. First, it performs element-by-element multiplications (i.e., dot product) between a subarray of an input array and a receptive field. The receptive field is also often called the filter, or kernel. The initial weight values of a receptive field are typically randomly generated. Those of bias can be set in many ways in accordance with networks' configurations, and one of the most well-known initializations of bias can be found from Krizhevsky (2012). Both values are tuned in training using a stochastic gradient descent algorithm which will be described in further detail shortly. The size of a subarray is equal to a receptive field, but the receptive field is smaller than the input array. Second, the multiplied values are summed, and bias is added to the summed values. FIG. 3 shows the convolutions ($\otimes$) of the subarrays (solid and dashed windows) with an input array and a receptive field. One of the advantages of the convolution is that it reduces input data size, which reduces computational cost. An additional hyperparameter of the layer is the stride. The stride defines how many of the receptive field's columns and rows (pixels) slide at a time across the input array's width and height. A larger stride size leads to fewer receptive field applications and a smaller output size, which also reduces computational cost, though it may also lose features of the input data. The output size of a convolution layer is calculated by the equation shown in FIG. 3.

To determine the dimensions of a layer based on parameters of a corresponding operator:

(Input layer height/width−convolution height/width)/stride+1

For example, for the first convolution layer of the illustrated embodiment, using in the foregoing formula the pertinent relation related to the previous layer's size which is shown in Table 1 which provides the dimensions of layers and operators, (256−20)/2+1=119, which is the first convolution layer's size as indicated in FIG. 2.

In another example, the pooling layer's size is calculated as follows using the information from Table 2 input into the foregoing formula: (119−7)/2+1=57, which is the first pooling layer's size.

Therefore these relationships may be extended to the remaining layers, where the input size of a subsequent layer is dependent upon the immediately previous layer's output, and the output of this subsequent layer is dependent upon said subsequent layer's operator dimensions.

Figure 4:
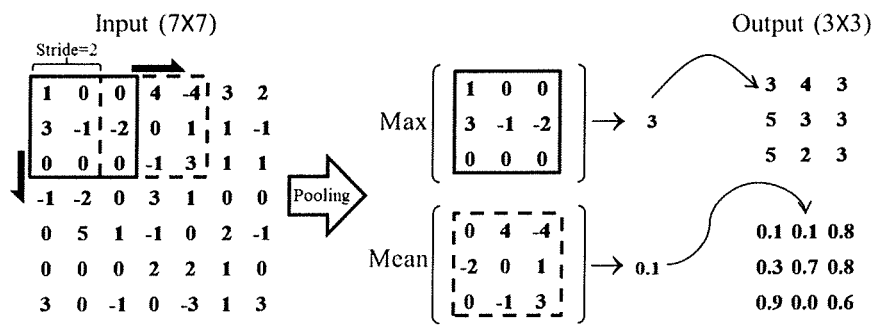
FIG. 4 shows one example of operations in a pooling layer.

Another aspect of the CNN is the pooling layer, which reduces the spatial size of an input array. This process is often defined as down-sampling. There are two different pooling options. Max pooling takes the max values from an input array's subarrays, whereas mean pooling takes the mean values. FIG. 4 shows each pooling method with a stride of two, where the pooling layer output size is calculated by the equation in the figure. Owing to the stride size being larger than the convolution example in FIG. 3, the output size is further reduced to 3×3. Scherer et al. (2010) teaches that max pooling performance in image datasets is better than that of mean pooling. As such, all pooling layers are of the max pooling layer type in this embodiment.

Figure 5:
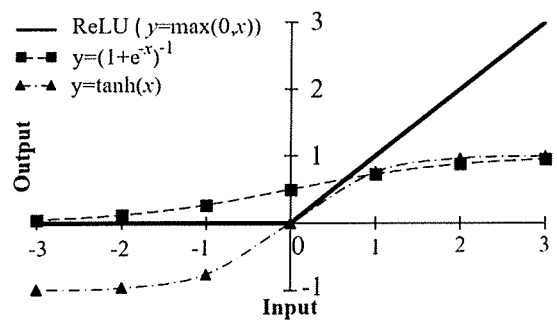
FIG. 5 shows examples of nonlinear activation functions.

The most typical way to give non-linearity in the standard ANN (artificial neural network) is using sigmoidal functions, such as y=tan h(x), but it has been claimed by Nair and Hinton (2010) that saturating nonlinearities slow computations. Recently, the ReLU was introduced (Nair and Hinton, 2010) as a nonlinear activation function. FIG. 5 depicts several examples of nonlinear functions. Briefly, while other nonlinear functions are bounded to output values (e.g., positive and negative ones, and zeros), the ReLU has no bounded outputs except for its negative input values. Intuitively, the gradients of the ReLU are always zeros and ones. These features facilitate much faster computations than those using sigmoidal functions and achieve better accuracies.

Overfitting has been a long-standing issue in the field of machine learning. This is a phenomenon where a network classifies a training dataset effectively but fails to provide satisfactory validation and testing results. To address this issue, dropout layers (Srivastava et al., 2014) are used. Training a network with a large amount of neurons often results in overfitting due to complex co-adaptations. The main idea of dropout is to randomly disconnect the connections between neurons of connected layers with a certain dropout rate. Accordingly, a network can generalize training examples much more efficiently by reducing these co-adaptations.

A well-known trick, taking the average values of a training dataset (i.e., whitening), has often been used to shorten network training time (LeCun et al., 2012). However, the distribution of layer's input shifts by passing through layers, which is defined as internal covariate shift, and this has been pointed out as being the major culprit of slow training speed. Ioffe and Szegedy (2015) proposed Batch normalization in order to adapt the similar effect of whitening on layers. As a result, this technique facilitates high-learning rate and leads to much faster network convergence.

To classify input data, it is necessary to have a layer for predicting classes, which is usually located at the last layer of the CNN architecture. The most prominent method to date is using the softmax function given by Equation (1), which is expressed as the probabilistic expression $p(y^{(i)}=n|x^{(i)}; W)$ for the i-th training example out of m number of training examples, the j-th class out of n number of classes, and weights W, where $W_n^T x^{(i)}$ are inputs of the softmax layer. The sum of the right-hand side for the i-th input always returns as one, as the function always normalizes the distribution. In other words, Equation (1) returns probabilities of each input's individual classes.

$$P(y^{(i)}=n|x^{(i)}; W) = \begin{bmatrix} p(y^{(i)}=1|x^{(i)}; W) \\ p(y^{(i)}=2|x^{(i)}; W) \\ \vdots \\ p(y^{(i)}=n|x^{(i)}; W) \end{bmatrix} = \frac{1}{\sum_{j=1}^{n} e^{W_j^T x^{(i)}}} \begin{bmatrix} e^{W_1^T x^{(i)}} \\ e^{W_2^T x^{(i)}} \\ \vdots \\ e^{W_n^T x^{(i)}} \end{bmatrix} \quad (1)$$

for $i = 1 \ldots m$

As the initial values of W are randomly assigned during training, the predicted and actual classes do not usually coincide. To calculate the amount of deviations between the predicted and actual classes, the softmax loss function is defined by Equation (2).

$$L = \frac{1}{m} \left[ \sum_{i=1}^{m} \sum_{j=1}^{n} 1\{y^{(i)}=j\} \log \frac{e^{W_j^T x^{(i)}}}{\sum_{l=1}^{n} e^{W_l^T x^{(i)}}} \right] + \frac{\lambda}{2} \sum_{j=1}^{n} w_j^2 \quad (2)$$

The new index L is introduced in order to indicate that $\Sigma_{l=1}$ exp $(W_l^T x^{(i)}$ is independent from $\Sigma_{j=1}^{n} 1\{\cdot\}$. The term $1\{y^{(i)}=j\}$ is the logical expression that always returns either zeros or ones. In other words, if a predicted class of the i-th input is true for j class, the term returns ones, returning zeros otherwise. The last hyperparameter λ in the equation is a regularization (i.e., weight decay) parameter to penalize large weights, which is also a well-known trick for preventing overfitting (Bengio, 2012; Bottou, 2012).

To narrow the deviations, an algorithm is used to update receptive field weights to obtain the expected results (i.e., predicting true classes). This process is considered for CNN training. There are several known methods, but stochastic gradient descent (SGD) using backpropagation is considered the most efficient and simplest way to minimize the deviations (LeCun et al., 2012). The standard gradient descent algorithm performs updating W on an entire training dataset, but the SGD algorithm performs it on single or several training samples. To accelerate the training speed, the momentum algorithm (Bengio, 2012) is also often used in SGD. The overall updating process is as follows. First, the gradient $\nabla_W$ of a loss function is calculated with respect to W, which is given by Equation (3). Second, the hyperparameters of momentum ε and learning rate α are introduced in Equation (4) to update (←) velocity v, where momentum is defined as mass times velocity in physics, but with unit mass being what is considered in SGD. Last, the weights are updated using Equation (5). A network can be tuned by repeating the explained process several times until Equation (5) converges. The superscript (i) indicates the i-th training sample, where the range of i is dependent on a minibatch size, which defines how many training samples out of the whole dataset are used. For example, if 100 images are given as the training dataset and 10 images are assigned as the minibatch size, this network updates weights 10 times; each complete update out of the whole data is called an epoch.

$$\nabla_W L(W; x^{(i)}, y^{(i)}) = \frac{1}{m} \sum_{i=1}^{m} [x^{(i)}\{1(y^{(i)} = j) - p(y^{(i)} = j \mid x^{(i)}; W)\}] + \lambda W_i \quad (3)$$

$$v \leftarrow \varepsilon v - \alpha \nabla_{W_j} L(W; x^{(i)}, y^{(i)}) \quad (4)$$

$$W_j \leftarrow W_j + v \quad (5)$$

The explained algorithm (i.e., gradient descent) is often described as a bead climbing down a convex bowl. For example, if it considers a simple example with two features, the number of weights is also two. Then, a loss function of the given example can be depicted in a three-dimensional parameter space, as shown in FIG. 6. The z-axis indicates the loss, and the x and y axes are weights (i.e., W1 and W2), respectively. If the partial derivatives of the loss function at point a with respect to W1 and W2 is calculated, a vector (i.e., gradient) is obtained at this point. The projection of the calculated vector on the W1–W2 plane always tends to head towards the steepest gradient, which is towards the minimum of the loss function. In this process, if a learning rate is given by a small number, a network is trained efficiently where the overlaid path with individual circular markers trailing from starting point a reaches the minimum of the loss function, as shown in FIG. 6A. However, if a large learning rate is assigned, the network may converge slowly, as shown in FIG. 6B, or even diverge, which can result in overflow.

In FIGS. 6A and 6B the dashed arrows at point a in (a) shows the partial derivatives with respect W1 and W2, and the solid arrow is the gradient of the partial derivatives (∂L/∂W1, ∂L/∂W2) that always indicates the steepest gradient.

Configuring and choosing adequate hyperparameter (e.g., learning rates and regularization parameters) is tedious and no exact guidelines for those parameter optimizations are available. Thus, the optimal network architecture for this concrete crack detection must be explored via trial and error and guided by checking the validation set error (Bengio et al., 2015). However, several useful articles can be found from Bottou (2012), LeCun et al. (2012), and Bengio (2012). All of the described tasks in this paper are performed on a workstation with two GPUs (CPU: Intel Xeon E5-2650 v3 @2.3 GHz, RAM: 64 GB, and GPU: Nvidia Geforce Titan X×2ea).

The total number of raw images is 332 (277 images with 4928×3264 pixel resolutions and 55 images with 5888×3584 pixel resolutions). The images are taken from a complex building at the University of Manitoba with a hand-held DSLR camera (Nikon D5200). Distances to the objects ranged from approximately 1.0-1.5 m; however, some images are taken below a 0.1 m distance for tests, and each image's lighting intensity is substantially different. Among the 332 raw images, 277 images are used for training and validation processes, and 55 images are used for the testing process. The 277 raw images are cropped into smaller images of 256×256 pixel resolutions to build the DB for training and validation as a preprocessing step after annotating each image as either an intact or cracked image. Thus, the total number of the prepared training images in the DB is 40K. Images are randomly chosen from the DB for generating training and validation sets. The reason for choosing the relatively small cropping size is that a network trained on small images enables scanning of any images larger than the designed size. However, if smaller images than those selected here are used, the network may catch any elongated features, such as scratches. In addition, smaller images also make it harder to annotate images as defect or intact. The generated DB includes a broad range of image variations for a robust damage classifier, as shown in FIG. 8.

The set of training images is to be consistent. For example, the training set comprises two categories of images including "cracked concrete surface" and "intact concrete surface" each of which can only contain the appropriate type of image (with a crack, or without).

Each image of a class contains both "invariant features" and varying features. "Invariant features" refers to the defect, which in this instance is a crack-related feature of the surface. "Varying features" refers to different textures of concrete surfaces and the features caused for example by lighting conditions and blur. By feeding these images into the proposed CNN architecture, convolutional layer can effectively learn "invariant features" of the object to be detected.

In order to classify a direction in which a crack extends so as to later determine if the image containing that crack is a suitable candidate image to use in the training set, criteria such as the following may be applied to determine the direction of extent:

(i) a "horizontal" crack has terminal ends of the crack which are spaced apart by a greater horizontal distance than a vertical distance, and the vertical distance is smaller than a first threshold distance;

(ii) a "vertical" crack has terminal ends of the crack which are spaced apart by a greater vertical distance than a horizontal distance and the horizontal distance is smaller than a second threshold distance;

(iii) a "diagonal" crack has terminal ends of the crack are spaced apart by a vertical distance exceeding the first threshold distance and by a horizontal distance exceeding the second threshold distance.

Furthermore, images containing cracks which may potentially be used for training are assessed in the following manner illustrated below, as to whether or not an image serves as a proper candidate for training the CNN.

More specifically, the respective one of the images is selected for the training set (as a crack-containing image) if the crack is located within a prescribed zone of the image depending on the direction which it has been classified as having, as illustrated above:

(i) for horizontal cracks, the prescribed zone/region is defined horizontally between the opposite side edges of the image and vertically between top and bottom limits each spaced from a respective one of the top and bottom edges of the image;

(ii) for vertical cracks, the prescribed zone/region is defined vertically between the top edge and the bottom edge of the image and horizontally between a pair of side limits each spaced from a respective one of the side edges of the image;

(iii) for a diagonal crack, the prescribed zone is collectively defined by a portion of each of the top, the bottom, and the side edges and a plurality of diagonal limits each spanning between an intersecting pair of the edges of the image so as to define a triangular area of the image at a corner of the image which said prescribed zone excludes.

Any cracks existing outside the corresponding prescribed zone and therefore within "disregard zones" are disregarded and thus not selected for use as a training image for training the CNN. FIG. 9 shows some of the cropped images which have cracks adjacent four peripheral edges of image spaces that are indicated within overlaid boxes for illustration, which types of images are not used in training the CNN for the following reasons. First, input images get smaller while the images pass through the CNN, which implies that cracks on edges have fewer chances to be recognized by a network than those with cracks in the middle of images during training. Second, it is not possible to identify whether such crack features are actually cracks or not, which can therefore lead to the training dataset's false annotations. Last, even if a trained network classifies such images, verifying whether the predicted class is false-positive or true-positive is not viable due to the hardly recognizable crack features. To tackle this issue, a sliding window technique is used in the testing step in order to detect cracks located in any positions of the image spaces which is described in further detail shortly.

The CNN of this first embodiment is trained using an SGD algorithm with a minibatch size of 100 out of 40,000 images. Since small and decreasing learning rates are recommended (Wilson and Martinez, 2001), the logarithmically decreasing learning rates, which are depicted in FIG. 10, are used. The x axis represents epochs so that the learning rates are updated each time. Weight decay and momentum parameters are assigned at 0.0001 and 0.9. The stride sizes of C1 through C3 and P1 to P2 are assigned to 2, and C4 is assigned to 1. The dropout rate at the dropout layer, located before the ReLU, is 0.5.

Feature extraction techniques are not necessary in the first embodiment, as CNNs learn features automatically by updating the weights of receptive fields. However, a trick taking the training dataset's mean values is used for the sake of efficient computation (LeCun et al., 2012). FIG. 11 summarizes the training and validation results. The ratio of the number of crack and intact images is 1:1, with that of training and validation being 4:1. The training accuracy is thus calculated out of 32,000 images, and validation is calculated out of 8,000 images. The highest accuracies achieved in training and validation are 98.22% at the 51th epoch and 97.95% at 49th epoch, respectively. The conjugation of two GPUs boosts the consequently recorded training speed by about 90 minutes until the 60th epoch, but the estimated running time on only CPU is about 1-2 days. The trained CNN of the 51st epoch is used in testing.

FIG. 12 represents the receptive field visualizations at the first layer (C1), where the visualizations of each receptive field are acknowledged as learned features of CNNs. The number of receptive fields of the designed architecture is 24 with 20×20×3 dimensions, as indicated in Table 1. The visualized features provide intuitions that indicate whether the network needs more training and what kinds of features are recognized by the trained network. For example, FIG. 12B shows clearer spots and lines than FIG. 12A, indicating that the network of FIG. 12B is well-trained and better trained than that of FIG. 12A. In FIG. 12B, the features of a2-4, b3-5, c5, d3-4, and e2-4 can be considered crack features, and those of a1-5, b1, c1-4, and d5 are most likely speculated as concrete surface cavities or aggregates in the training dataset. Receptive fields of a well-trained network generally have smooth patterns, but the noisy features with various colors (illustrated in grayscale in FIG. 12B) are still reasonable due to the complex and arbitrary patterns of concrete surfaces.

To approximate the desirable number of training images, a parametric study on the datasets comprising 2,000, 4,000, 8,000, 10,000, 16,000, 20,000, 28,000, and 40,000 images with 256×256 pixel resolutions is conducted, as shown in FIG. 13. The portions of training, validation, crack, and intact (i.e., free of cracks) images are the same as the aforementioned 40,000 image dataset. The architectures for each training datasets are equal to FIG. 2. From this parametric study, the number of properly cropped images is at least 10,000 to obtain a reasonable CNN classifier, which obtains an accuracy of 97.42% in validation of the concrete crack detection problem.

The CNN is prone to misclassifying test images having cracks on the peripheral edges of the test image 140 in a conventional implementation of the CNN, due to the types of images used as the training set of images, which do not include cracks along edges of the training images. Therefore, processing of the test images comprises two consecutive scanning steps each with a sliding window technique, as depicted in FIG. 14A, with the scanning window indicated at 142, and shown in more detail in FIGS. 14B and 14C. A first scanning step is shown by solid line squares in FIG. 14A and a second scanning step is shown by dashed line squares in FIG. 14A, both of which are described in more detail shortly.

Referring to FIG. 14B, the test image 140 can be divided into 10×5 blocks where each block size is equal to the scanning window size which is 256 pixels by 256 pixels so as to be square in shape. The scanning window 142 moves within the test image sized 2560 pixels by 1280 pixels from one block to the next from left to right before moving to the subjacent row of blocks and evaluates one block at a time. In this example 50 blocks exist, and there are 50 iterations or scans performed in the first scanning phase. Thus in this step there is a first set of non-overlapping areas of the image that are scanned, where each such area is contiguous with at least one other such area at one edge. As such an entirety of the image is captured in this first scanning step.

However, there is a considerable probability of a crack 145 being present in the test image on the edge of one of the scanning blocks as shown in FIG. 14B which is not captured by any one of the adjacent scanning block windows which are contiguous with one another. Therefore, a second scanning step is performed on a smaller portion of the test image which periphery follows that of the whole of the test image (so as to have the same shape) but is spaced therefrom by half of the sliding window's size (128 pixels which is half the size of the sliding window at 256 pixels) as shown in FIG. 14C. There are thus only 36 iterations or scans performed in the second scanning step. As such, any cracks on the test image present along the edge of the scanning window of the first scanning step is captured centrally by the scanning window of the second scanning step, which increases the accuracy of the first embodiment of computer-implemented defect detection analysis. Thus in this step there is a second set of non-overlapping areas of the image that are scanned, where each such area is contiguous with at least one other such area at one edge. Each one of the second set of non-overlapping areas overlaps more than one of the first set of non-overlapping areas so as to capture information at edges of the first set of non-overlapping areas which is otherwise unavailable to the machine learning algorithm from the scanning of the first set of non-overlapping areas.

Figure 15A:
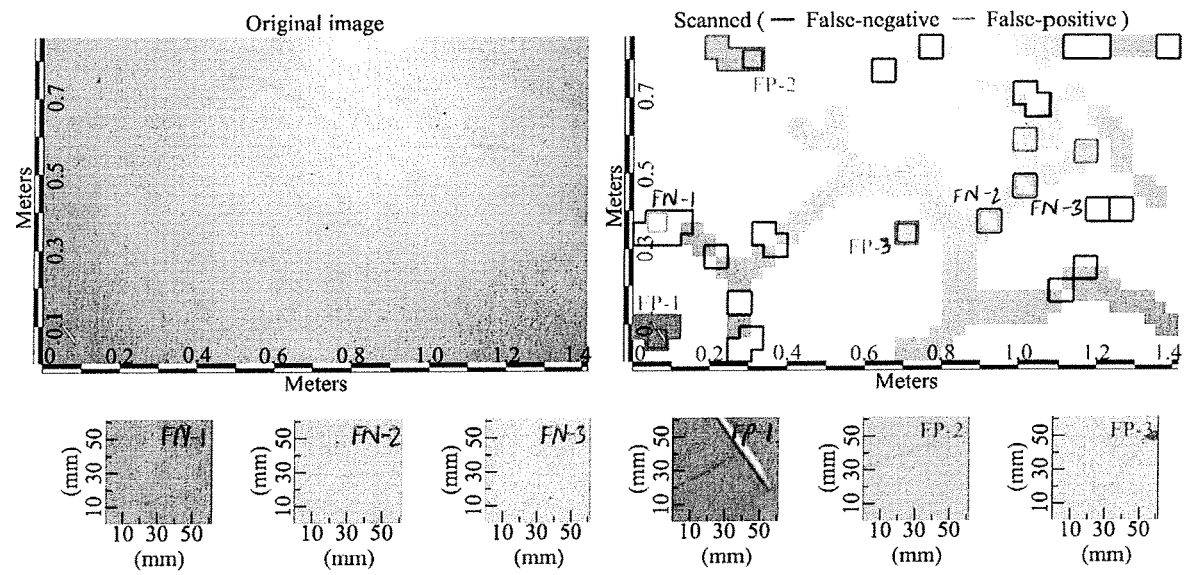

To examine the performance of the trained and validated CNN as described above, 55 raw images that are not used for training and validation processes are used for performance testing. These test images are taken from a different structure so that there is a greater probability of variability in features from the training set of images, and images used for validation, in comparison to those used in performance testing. The testing results are presented in Table 2. The achieved results indicate a 97% accuracy, which is nearly identical to the accuracy of 98% of the validation process previously described. Thus, the trained and validated CNN shows nearly the same performance without any degradation of the accuracy, even though totally different images are used for testing. Examples of tested images taken under various conditions are shown in FIGS. 15A-E. The image space axes indicate each image's dimensions. Some of these images which have water-marked regions are still recognized by the trained network as intact surfaces (false, that is not having a crack) or otherwise cracked (true, that is having a crack). In each of FIGS. 15A-E the original test image is shown on the left and on the right is shown the processed image displaying only the areas indicated by the CNN as including a crack feature. The processed image includes some incorrectly detected areas which are indicated as boxed region of the processed image. The boxed areas include both false-negative (FN) regions, which were incorrectly indicated as lacking a crack, and false-positive (FP) regions, which were incorrectly indicated as having a crack. Select example FN and FP regions are magnified and highlighted with green and red boxes. The testing duration is recorded as 4.5 seconds for each image. FIG. 15A shows a test image containing very thin cracks with uniform lighting conditions, where the thickest crack width is about 1.5 mm laying on 4 pixels. The majority of FN regions in FIG. 15A are distributed around the test image's central area due to image distortions on the thin crack regions.

Figure 15B:
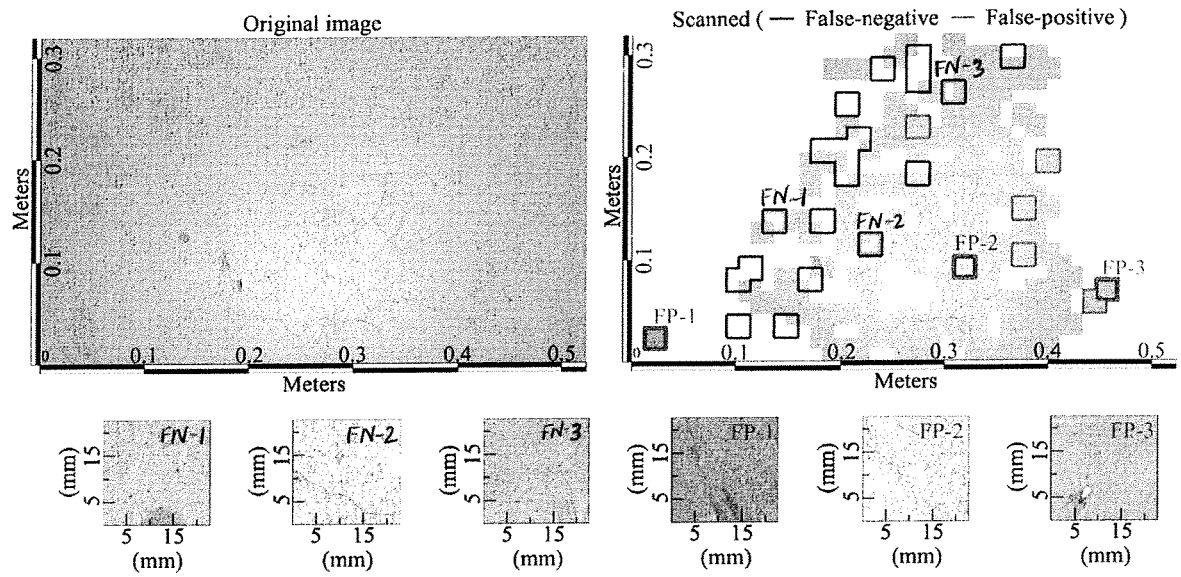
Figure 15C:
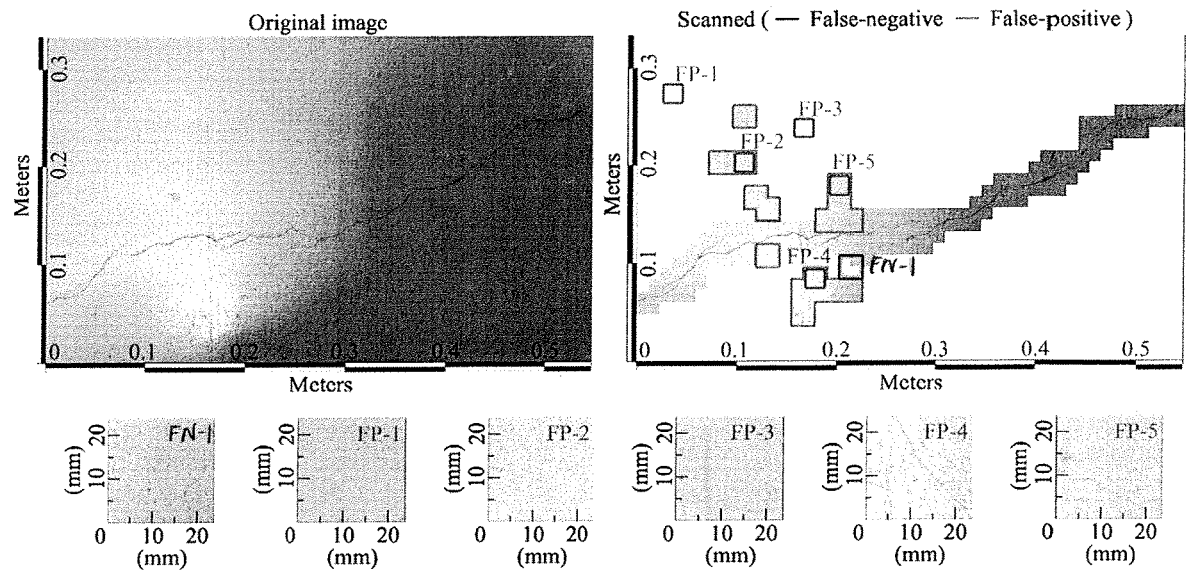

FIGS. 15B and 15C are test images with a lighting spot and another with a shadow area, respectively. In FIG. 15B, FN is mainly detected on the edges of the lighting spot. In FIG. 15C, only one FN region exists, but a number of scratches are classified as FP regions. FIGS. 15A-C show that the CNN is not sensitive to lighting conditions and is still able to provide consistent results.

Figure 15D:
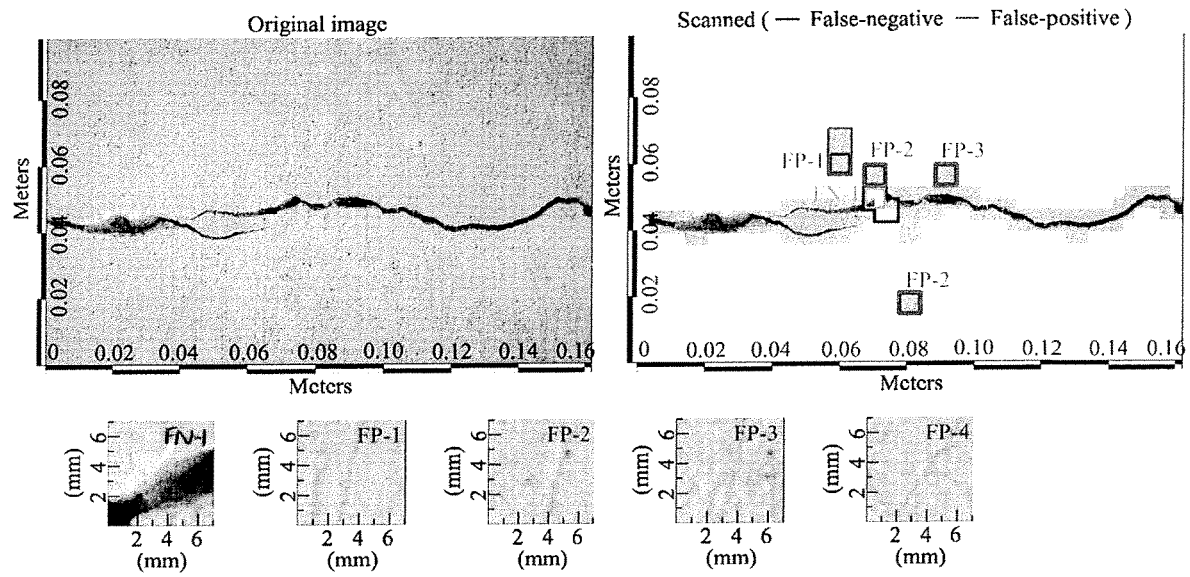

FIG. 15D is a test image deliberately taken approximately 70 mm away from a concrete surface to test the effect of distance on the performance of the CNN, and the crack in this test image was identified with a 99% accuracy.

Figure 15E:
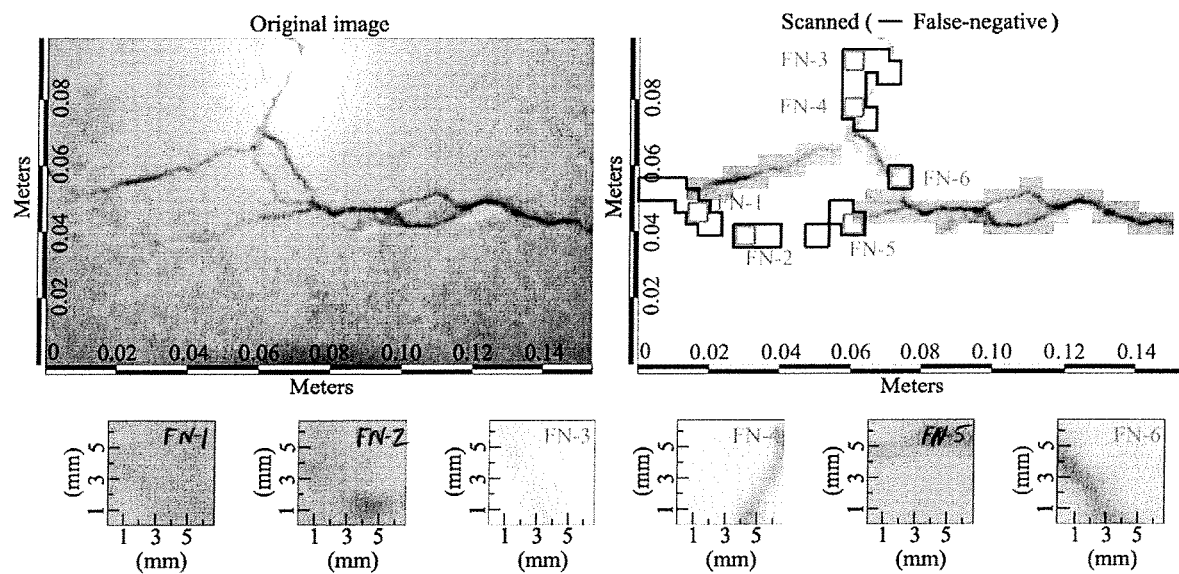
Figure 16A:
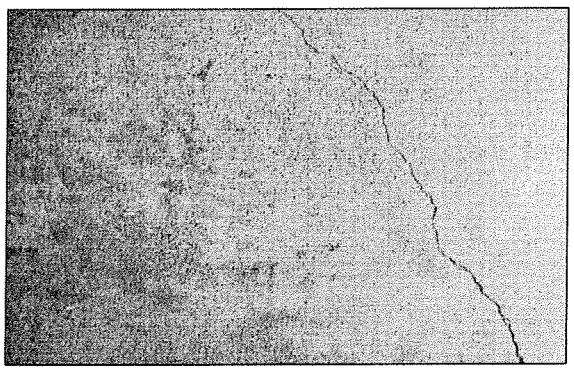
Figure 16B:
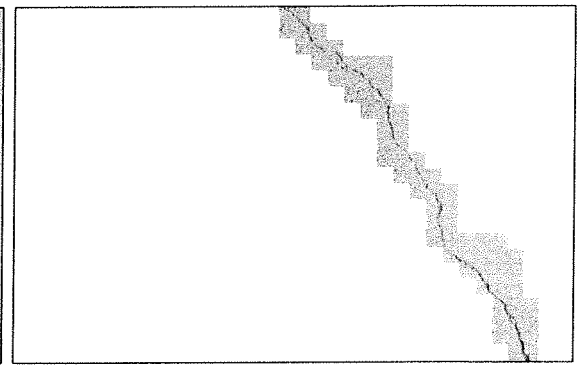
Figure 16C:
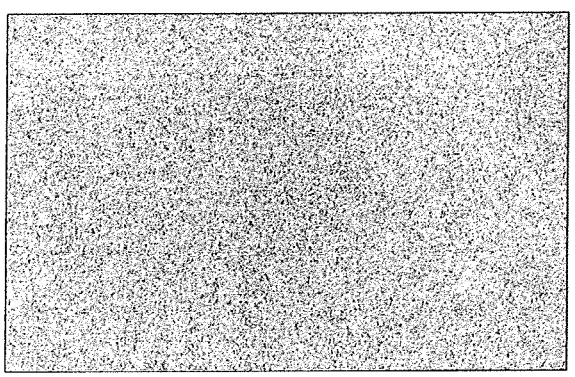
Figure 16D:
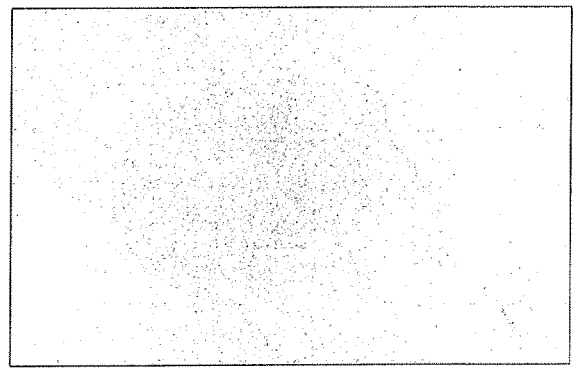
Figure 17A:
Figure 17B:
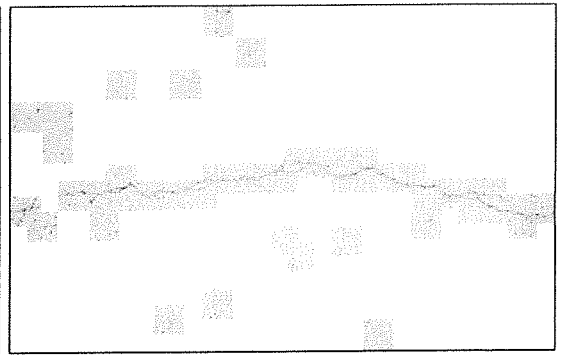
Figure 17C:
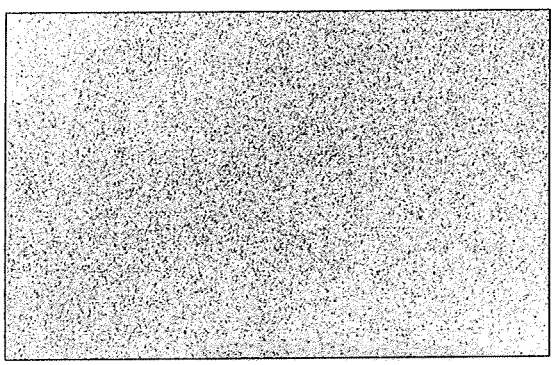
Figure 17D:
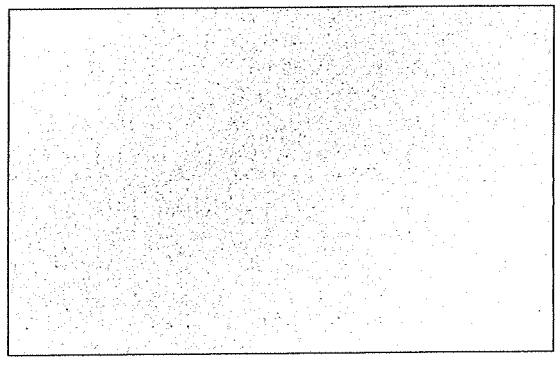

FIG. 15E shows a test image captured at a distance of about 60 mm from the photographed surface. The image is blurred due to the small distance from the concrete surface, and the image contains a lighting spot on crack regions. In a comparison of FIG. 15A and FIGS. 15D-E, the CNN is not sensitive to distance changes and thus is precise even when images are captured at varying distances from the subject surface.

FIGS. 16A-D, 17A-D, 18A-D, 19A-D and 20A-D show a comparison of a common test image analyzed by the CNN of the first embodiment herein and two other, traditional crack detection methods, specifically Canny and Sobel edge detection. In these comparisons, four images from the 55 tested images were used, each exemplary of a different set of conditions.

FIGS. 16 and 17 show an original image under normal, substantially uniform lighting. The CNN of the first embodiment herein provides clear crack information and identification, as shown in FIGS. 16B and 17B. Although the Sobel edge detection provides some information which can be subsequently deciphered as showing a crack in FIG. 16D, the Sobel method does not provide any meaningful information in the case represented in FIG. 17D. The Canny detection method shown in FIGS. 16C and 17C provides no meaningful information regarding cracks with high levels of noise. The comparison cases shown by FIGS. 16 and 17 show that the performance of the Canny and Sobel edge detection methods are quite dependent on the image conditions; conversely, the CNN is not affected by the conditions of the images.

Figure 18A:
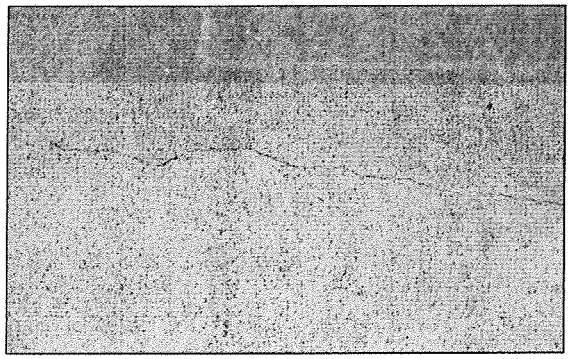
Figure 18B:
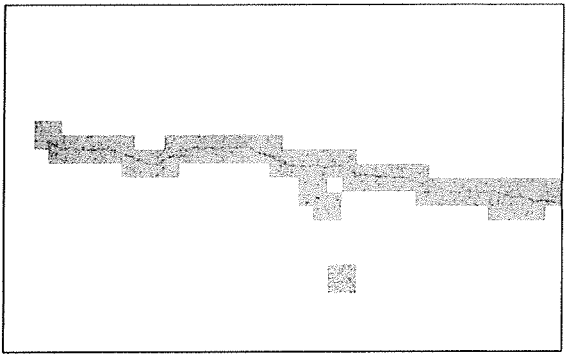
Figure 18C:
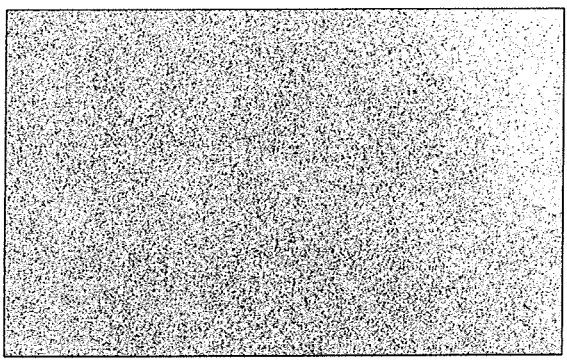
Figure 18D:
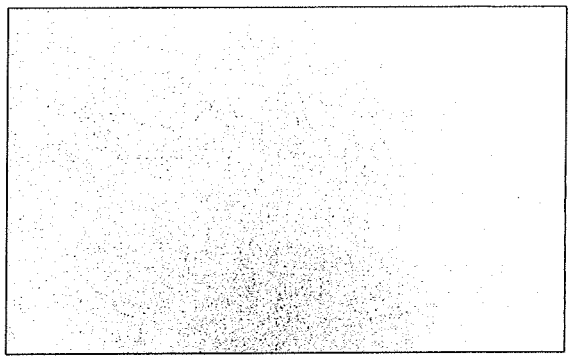

FIG. 18A shows a second type of image including thin cracks. This comparison case as depicted by FIGS. 18A-D also has results similar to the typical image case, as shown in FIGS. 16 and 17. The Sobel and Canny methods do not provide crack information with high levels of noise. However, the CNN detects nearly all the thin cracks, with few errors, as shown in FIG. 18B.

FIG. 19 shows a comparison case with a shadowed image. This case also shows that the CNN detects the crack accurately, as shown in FIG. 19B. The Sobel method in FIG. 19D includes a dark area 196 that is not damaged and is different from the original image. These cases show that the advantage of the proposed CNN method is that it can provide a raw, unprocessed image of the detected crack which allows engineers differentiate between cracks and noise. The Sobel method provides a processed image with grayscale, which made it difficult to determine if the dark area 196 is either damage or noise.

FIG. 20 shows a comparison case where the test image has thin cracks with lighting spots (i.e., non-uniform lighting) across the image. For this, the Canny and Sobel methods provides no meaningful results, as shown in FIGS. 20C and 20D. However, the CNN detects cracks accurately.

Thus, these comparative studies show that the CNN of the first embodiment shows improved performance in crack detection over traditional Canny and Sobel methods.

Figure 19A:
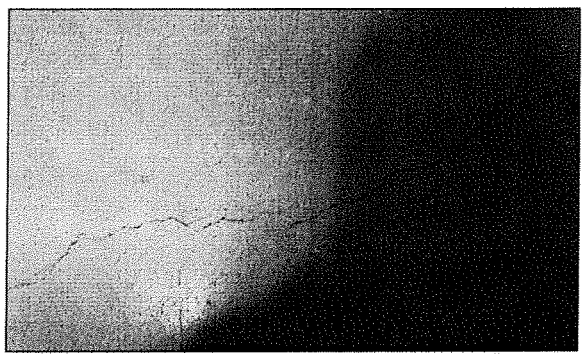
Figure 19B:
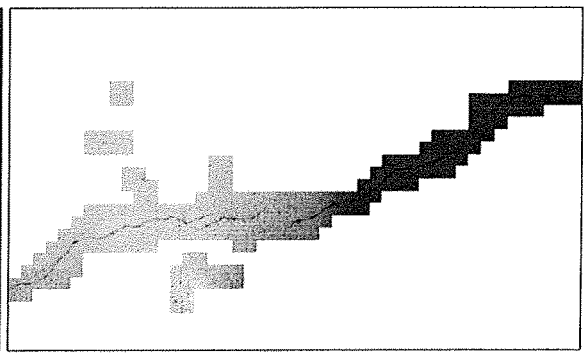
Figure 19C:
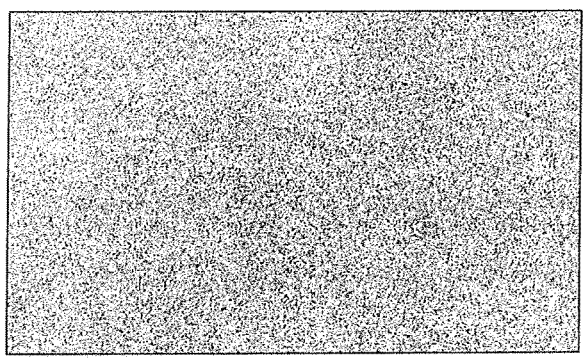
Figure 19D:
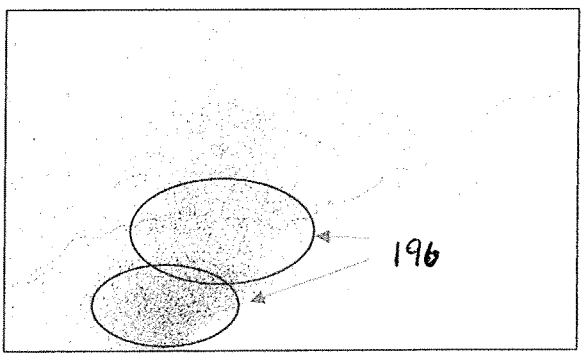
Figure 20A:
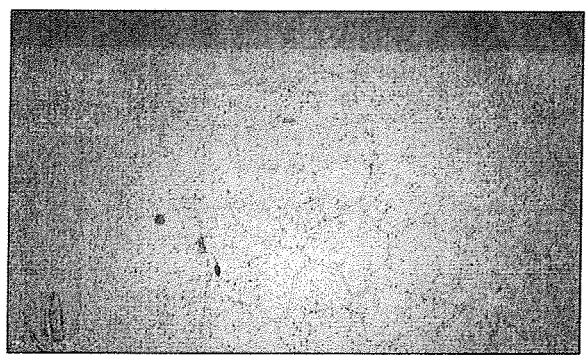
Figure 20B:
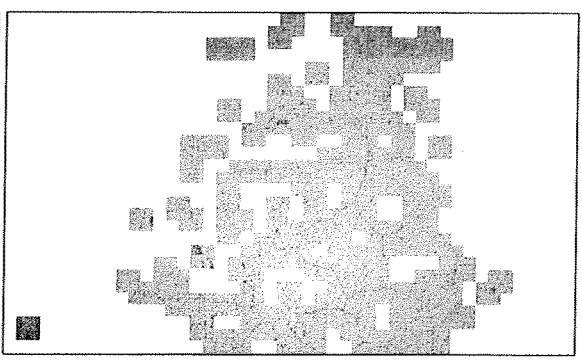
Figure 20C:
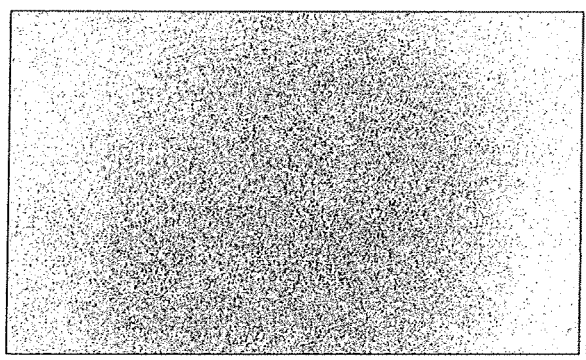
Figure 20D:
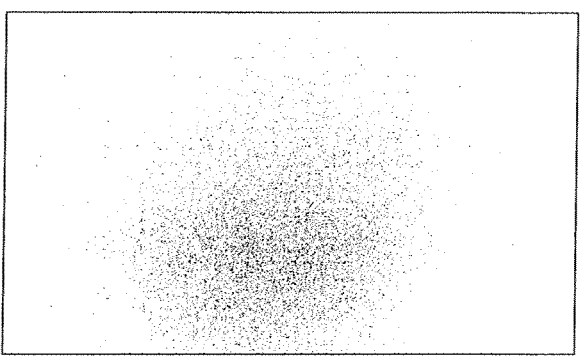

Another primary advantage of the CNN is that feature extraction techniques are not necessary because the CNN automatically learns features when the network is tuned by SGD. This can save a lot of (computational) effort compared to traditional IPT implementation. For example, suppose that one tries to find cracks on images with lighting spots and shadowed areas. Methods using IPTs may find edges from the verges of lighting spots and shadowed areas rather than crack edges without carefully parameterized methods as shown in FIG. 19D. By contrast, the CNN is capable of learning invariant features from a vast amount of images. If certain types of features are not well classified, the only action necessary is to re-train the CNN using the misclassified data indicated as such to the CNN during training. These aspects make the CNN robust in real-world problems.

In one example of a practical application, in FIG. 21 is schematically illustrated a structural health monitoring application in which a conventional drone 2100 carrying a camera 2101 is remotely operated by an operator 2103 using a controller 2104. The drone 2100 is operated so as to hover across surface S in proximity thereto suitable for the camera 2101 to capture visual image of the surface S. The captured images are provided to a processor 2106A operatively coupled to a non-transitory memory 2106B storing instructions for executing the deep learning algorithm so as to process the visual images to identify defects therein. As the drone 2100 is displaced across the surface S, at position of the drone indicated by reference numeral 2107 a defect D in the surface is identified. The drone may then be maintained at position 2107 serving as a visual indicator to an approaching worker of where the defect is located on the surface S.

In another example schematically illustrated in FIG. 22, a motor vehicle 2200 such as a conventional car arranged for rolling movement across a road surface R carries camera 2201 in proximity to the road surface. The motor vehicle 2200 is operated so as to be displaced along the road surface R while the camera captures visual images thereof. When a defect D is identified by the machine learning algorithm, the vehicle operator can stop the vehicle and exit same so as to directly check.

Mapping of defects in large surfaces whose surface area exceeds an area which can be captured in an image for suitable processing by the algorithm can be performed in conjunction with a global position system (GPS) unit mounted on the vehicle carrying the camera that captures the visual images.

Thus, in this disclosure is described a method of determining structural health of a concrete or steel surface, comprising the steps of:

operating a vehicle carrying a camera to move across the surface and capturing visual images of the surface;

processing the visual images using a machine learning algorithm which includes a region-based convolutional neural network such as the Fast R-CNN or the Faster R-CNN to identify in the visual images defects in the surface.

The vehicle may be for example an unmanned aerial vehicle or a motor vehicle.

Thus, in summary of the first embodiment, a vision-based approach for detecting cracks on concrete images using a deep learning method is described. The concrete images used for the training, validation, and tests were taken with a hand-held camera. A total 332 images were taken and divided into 277 images with 4928×3264 pixel resolutions for training and validation and 55 images with 5888×3584 pixel resolutions for testing. In order to secure a wide range of adaptability, the images were taken under uncontrolled situations. The 277 images were cropped into 40,000 images with 256×256 pixel resolutions for training and validation processes. The small images were used as the dataset to train the CNN. The trained network recorded accuracies of 98.22% out of 32,000 images and 97.95% out of 8,000 images in training and validation, respectively. According to a parametric study, more than 10,000 images were recommended in order to secure sufficient robustness.

The performance of the trained CNN was evaluated on 55 large images with resolutions of 5888×3584 pixels. The test images were scanned by the trained CNN using a sliding window technique, which facilitated the scanning of any images larger than 256×256 pixel resolutions, and the crack maps were consequently obtained. The test results showed consistent performance although test images taken under various conditions, including strong lighting spot, shadow, blur, and close-up. Moreover, the performances of the proposed method were not susceptible to the quality of images, camera specification, and working distance. From the comparative studies, which used various conditions with raw images, the proposed CNN method showed very robust performance compared to the traditional, well-known edge detection methods (i.e., Canny and Sobel). The Sobel and Canny edge detection methods provided no meaningful crack information, even though the test images were normal. These methods might not able to treat properly the non-homogeneous concrete surfaces in terms of color and texture. The proposed CNN was especially strong at detecting thin cracks under lighting conditions that make detection difficult when using traditional methods. The proposed method also showed lower levels of noise than the traditional methods and provided raw image results, which allowed for differentiation between noises and errors. As far as the method in general goes, the CNN's ability to learn features from a vast amount of training data is a huge advantage. This also means that a CNN implemented method uses a large amount of training data in order to train a robust classifier. One common limitation of almost all vision-based approaches, including the implementations of IPTs and CNNs, is the incapability of sensing internal features due to the nature of photographic images. In the future, the CNN will be developed to detect various types of superficial damage, such as voids, delamination, spalling, and corrosion of concrete and steel structures, to partially replace the biannual visual inspection, is currently the most reliable method for monitoring structure health. This will also be combined with autonomous drones in order to monitor the damage of civil structures.

It may be possible that the algorithm and processes described herein may be usable to detect in any type of image of any surface a continuously extending line thereacross.

Thus is proposed a vision-based method using a deep architecture of convolutional neural networks (CNNs) for detecting concrete cracks without calculating the defect features. As CNNs are capable of learning image features automatically, the proposed method works without the conjugation of IPTs for extracting features. The designed CNN is trained on 40,000 images of 256×256 pixel resolutions and, consequently, records with about 98% accuracy. The trained CNN is combined with a sliding window technique in order to scan any image size larger than 256×256 pixel resolutions. The robustness and adaptability of the proposed approach are tested on 55 images of 5888×3584 pixel resolutions taken from a different structure which is not used for training and validation processes under various conditions (e.g., strong light spot, shadows, and very thin cracks). Comparative studies are conducted to examine the performance of the proposed CNN using traditional Canny and Sobel edge detection methods. The results show that the CNN performs better than traditional methods and can indeed find concrete cracks in realistic situations where the image conditions, which are typically uncontrollable, vary from one instance to the next.

The first embodiment described herein discloses a computer-implemented method of analyzing an image of a surface to detect a defect in the surface, comprising:

receiving the image of the surface;

processing the image using a machine learning algorithm configured to detect the defect comprising a convolutional neural network, the convolutional neural network including:

at least one convolution layer;

at least one max pooling layer;

and displaying the image with location of the defect being indicated if determined to be present by the convolutional neural network.

The processing of the image by the CNN comprises the steps of:

scanning a first set of non-overlapping areas of the image;

scanning a second set of non-overlapping areas of the image each which overlap more than one of the first set of non-overlapping areas so as to capture information at edges of the first set of non-overlapping areas which is otherwise unavailable to the convolutional neural network from the scanning of the first set of non-overlapping areas.

More specifically, the convolutional neural network comprises:

an input layer having a height of n pixels, a width of n pixels, and a depth of d channels;

the at least one convolution layer comprising a preliminary convolution layer, a secondary convolution layer, a tertiary convolution layer and a quaternary convolution layer;

said at least one pooling layer comprising a preliminary pooling layer and a secondary pooling layer;

the preliminary convolution layer having a height of $Hc_1$ pixels, a width of $Hc_1$ pixels, and a depth of $Dc_1$ channels formed by a first convolution operator having a height of $hc_1$ pixels, a width of $hc_1$ pixels, and a depth of $dc_1$ channels with a stride of $sc_1$ performed upon the input layer;

wherein $Hc_1=[(n-hc_1)/sc_1]+1$;

wherein $Dc_1=dc_1$;

the preliminary pooling layer having a height of $Hp_1$ pixels, a width of $Hp_1$ pixels, and a depth of $Dp_1$ channels formed by a first pooling operator having a height of $hp_1$ pixels and a width of $hp_1$ pixels with a stride of $sp_1$ performed on the preliminary convolution layer;

wherein $Hp_1=[(Hc_1-hp_1)/sp_1]+1$;

wherein $Dp_1=Dc_1$;

the secondary convolution layer having a height of $Hc_2$ pixels, a width of $Hc_2$ pixels, and a depth of $Dc_2$ channels formed by a second convolution operator having a height of $hc_2$ pixels, a width of $hc_2$ pixels, and a depth of $dc_2$ channels with a stride of $sc_2$ performed upon the preliminary pooling layer;

wherein $Hc_2=[(Hp_1-hc_2)/sc_2]+1$;

wherein $Dc_2=dc_2$ the secondary pooling layer having a height of $Hp_2$ pixels, a width of $Hp_2$ pixels, and a depth of $Dp_2$ channels formed by a second pooling operator having a height of $hp_2$ pixels and a width of $hp_2$ pixels with a stride of $sp_2$ performed upon the secondary convolution layer;

wherein $Hp_2=[(Hc_1-hp_2)/sp_2]+1$;

wherein $Dp_2=Dc_2$ the tertiary convolution layer having a height of $Hc_3$ pixels, a width of $Hc_3$ pixels, and a depth of $Dc_3$ channels formed by a third convolution operator having a height of $hc_3$ pixels, a width of $hc_3$ pixels, and a depth of $dc_3$ channels with a stride of $sc_3$ that is performed upon the secondary pooling layer;

wherein $Hc_3=[(Hp_2-hc_3)/sc_3]+1$;

wherein $Dc_3=dc_3$;

an activation layer having a height of $Ha_1$ pixels, a width of $Ha_1$ pixel, and a depth of Dar channels formed by a nonlinear activation function operator performed upon the tertiary convolution layer;

wherein $Ha_1=Hc_3$;

wherein $Da_1=Dc_3$;

the quaternary convolution layer having a height of $Hc_4$ pixels, a width of $Hc_4$ pixels, and a depth of $Dc_4$ channels formed by a fourth convolution operator having a height of $hc_4$ pixel, a width of $hc_4$ pixel, and a depth of $dc_4$ channels with a stride of $sc_4$ performed upon the activation layer;

wherein $Hc_4=[(Ha_1-hc_4)/sc_4]+1$;

wherein $Dc_4=dc_4$;

and a softmax layer having a height of $Sm_1$ pixels, a width of $Sm_1$ pixels, and a depth of $Dsm_1$ channels formed by a softmax operator performed upon the quaternary convolution layer such that a continuously extending line in an image can be detected;

wherein $Sm_1=Hc_4$;

wherein $Dsm_1=Dc_4$.

The convolutional neural network further comprises a dropout layer intermediate the tertiary convolution layer and the activation layer.

The nonlinear activation function operator comprises a rectified linear unit function.

When the defect to be detected includes a crack, the convolutional neural network is trained by programming instructions stored on a computer readable medium comprising:

a data structure including a set of training images each having a top edge, a bottom edge, and opposite sides edges;

wherein a first portion of the set of training images includes a crack and a second portion of the set of training images lack a crack;

the first portion of the set of training images comprising:

a first category of crack-containing images having a crack extending substantially horizontally across the image in a direction from one side edge to the other and spaced from the top and bottom edges of the image;

a second category of crack-containing images having a crack extending substantially vertically across the image in a direction from the top edge to the bottom edge and spaced from the side edges of the image;

a third category of crack-containing images having a crack extending diagonally across the image such that terminal ends of the crack are spaced substantially vertically and substantially horizontally apart from one another that is located within a region of the respective image spanning vertically between the top and bottom edges and horizontally between the side edges but excluding triangular areas each at one corner of the image formed by a portion of each of two edges of the image and a diagonal line interconnecting said portions;

and training instructions stored on the medium and executable by a computer processor for training the convolutional neural network with said data structure so that the convolutional neural network is enabled to detect the crack in the image of the surface.

The ratio of a number of images forming each of the first portion of the set of training images including a crack and the second portion of the set of training images lacking a crack is 1:1.

Each of the set of training images has a 1:1 aspect ratio.

The set of training images is formed from a plurality of photographs cropped to form smaller images each having a 1:1 aspect ratio.

Each photograph forms a plurality of smaller images with 1:1 aspect ratio.

The cracks in each of the first category of crack-containing images, the second category of crack-containing images and the third category of crack-containing images are located generally centrally with respect to a direction transverse to the direction in which a respective one of the cracks extends across a respective one of the training images.

The first embodiment described herein also discloses a computer-implemented system and method of analyzing an image of a surface to detect a defect in the surface, comprising:

receiving the image of the surface;

processing the image of the surface using a machine learning algorithm configured to detect the defect which includes a neural network, an example of the neural network being a convolutional neural network;

said processing including scanning a first set of non-overlapping areas of the image;

said processing including scanning a second set of non-overlapping areas of the image each which overlap more than one of the first set of non-overlapping areas so as to capture information at edges of the first set of non-overlapping areas which is otherwise unavailable to the machine learning algorithm from the scanning of the first set of non-overlapping areas;

and determining whether the image contains the defect.

The portion of the image captured by the second set of non-overlapping areas has a periphery which substantially follows a periphery of the image, the periphery of the said portion of the image extending through each one of a series of the first set of non-overlapping areas arranged along the periphery of the image.

The method further comprises displaying only those areas of the image which contain the defect, in the event that the image is determined to have the defect.

Those areas of the image which are displayed are defined by respective ones of the first set of non-overlapping areas and the second set areas of non-overlapping areas which contain the defect.

The first embodiment additionally discloses a method of forming a set of training data for training a convolutional neural network to detect a crack in a surface from an image of the surface, comprising:

processing a plurality of images to determine which ones of the images include a crack, each one of the images having a top edge 701, a bottom edge 702, and opposite side edges 703 and 704;

if a respective one of the images does not have a crack, selecting said image as a non-crack training image;
if a respective one of the images includes a crack:
classifying a direction in which the crack extends as one of:
(i) extending substantially horizontally across the image from one side to the other such that terminal ends of the crack are spaced apart by a greater horizontal distance than a vertical distance and the vertical distance is smaller than a first threshold distance;
(ii) extending substantially vertically across the image from top to bottom such that terminal ends of the crack are spaced apart by a greater vertical distance than a horizontal distance and the horizontal distance is smaller than a second threshold distance;
(iii) extending diagonally across the image such that terminal ends of the crack are spaced apart by a vertical distance exceeding the first threshold distance and by a horizontal distance exceeding the second threshold distance;
selecting the respective one of the images as a crack-containing training image if the crack is located within a prescribed zone 710 of the image depending on the direction which it has been classified as having, wherein:
(a) if the crack has the direction defined in (i), the prescribed zone is defined horizontally between the opposite side edges 703, 704 of the image and vertically between top and bottom limits 711 and 712 each spaced from a respective one of the top and bottom edges 701, 702 of the image;
(b) if the crack has the direction defined in (ii), the prescribed zone is defined vertically between the top edge and the bottom edge 701, 702 of the image and horizontally between a pair of side limits 713, 714 each spaced from a respective one of the side edges 703, 704 of the image;
(c) if the crack has the direction defined in (iii), the prescribed zone is collectively defined by a portion of each of the top, the bottom, and the side edges 701-704 and a plurality of diagonal limits 715-718 each spanning between an intersecting pair of the edges of the image so as to define a triangular area 720 of the image at a corner of the image which said prescribed zone excludes;
wherein a plurality of non-crack training images and a plurality of crack-containing training images form the set of training data for the convolutional neural network.

Excluded rectangular strips of images for "horizontal" and "vertical" cracks are indicated at 722.

The method comprises processing a plurality of photographs so as to form therefrom the plurality of images with 1:1 aspect ratio that have reduced size relative to the photographs. This is shown in FIGS. 7A-7C where the images are sized 256 pixels by 256 pixels.

The first threshold distance is equal to the second threshold distance.

The top and bottom limits 711, 712 are spaced by a common distance from the respective one of the top and bottom edges 701, 702 of the image which in the illustrated embodiment is 20% of a height dimension of the image.

The side limits 713, 714 each are spaced by a common distance from the respective one of the side edges 703, 704 of the image which in the illustrated embodiment is 20% of a height dimension of the image.

The diagonal limits 715-718 each form a 45 degree angle of the triangular area 720 where it intersects a respective one of the edges 701-704 of the image such that the prescribed zone 710 is centered with respect to each of the edges of the image which define it. In the illustrated embodiment, the length of each triangular excluded area is 30% of the image edge defining same.

FIGS. 23-32 show a second embodiment of the computer-implemented arrangement for detecting defects in surfaces in which a unique architecture and dataset is proposed to train and validate the fast R-CNN and to automate structural surface damage detection of multiple damage types in images simultaneously, without using multiple CNN architectures. The second embodiment comprises a regional convolutional neural network (R-CNN), referred to herein as fast R-CNN for convenient reference, and visual geometry group (VGG)-16 architecture therefor and a selective search method to generate object proposals. In the illustrated second embodiment, five examples of structural surface damage are shown: steel delamination, steel corrosion (medium and high levels), bolt corrosion, and concrete cracks. Other damage types can also be detected.

FIG. 23 shows a schematic of the architecture for the fast R-CNN of the second embodiment, which takes images and pre-computed object proposals from selective searches (Uijlings et al. 2013) as input and localizes and classifies objects in the images. The Fast R-CNN uses a CNN similar to the VGG-16 model (Simonyan and Zisserman 2014) to extract feature maps and merge object proposals into these feature maps. Each part of the feature maps is bounded by object proposals and called a region of interest (RoI) and is input into the RoI pooling layer as shown more clearly in FIG. 24. This layer takes individual features of each RoI and applies max pooling to generate a fixed-size feature vector. Referring back to FIG. 23, these feature vectors are imported to fully connected layers, followed by two sibling softmax and regression layers, which calculate probability for each object class in bounded boxes and the coordinates of bounded boxes for each object class, respectively.

The regressor layer as shown in FIG. 23, which follows the fully connected layer, outputs four parameters ($t=(t_x, t_y, t_h, t_w)$) that represent center coordinates ($t_x, t_y$) of objects and the height ($t_h$) and width ($t_w$) of RoIs for each class, respectively. Each ground truth is parameterized for its bounding box, $v=(v_1, v_y, v_h, v_w)$, and its label (u). The classifier calculates the probability of k+1 classes (k training class+1 background class), $p=(p0, p1, \ldots, pk)$, for each RoI. An RoI is labelled as positive if the intersection-over-union (IoU) ratio with ground truth is more than 0.5 and as background if the IoU is between 0.1 and 0.5. Other RoIs are not used in the training process.

The fast R-CNN is trained end-to-end for both classification and regression layers by mini-batch gradient descent (MBGD), which updates the network using small groups of training samples, unlike stochastic gradient descent (SGD) and gradient descent (GD) that use one training sample and all training samples, respectively. MBGB computes gradients using a mini-batch size, normally between 50 and 256, and has better computational performance than SGD and GD (Ruder 2016). According to Girshick (2015), the MBGD randomly selects two images per iteration and 64 mini-batches (one quarter positive and three quarters negative RoIs) for each image and trains the fast R-CNN for each RoI using the following loss function indicated as Equation 6:

$$L(p,u,t^u,v) = L_{cls}(p,u) + [u \geq 1] \Sigma_{i \in (x,y,w,h)} \text{smooth}_{L1}(t_i^u - v_i)$$

where $L_{cls}$ is standard log loss and used as a classification loss function; $\text{smooth}_{L1}$ is shown in Equation 7 and is used for regression loss. Parameter u represents the label of each RoI and is one or zero if the RoI is positive or background, respectively.

$$\text{smooth}_{L1}(t_i^u - v_i) = \begin{cases} 0.5(t_i^u - v_i)^2 & \text{if } |x| < 1 \\ |t_i^u - v_i| - 0.5 & \text{otherwise} \end{cases}$$

Simonyan and Zisserman (2014) investigated the effect of network depth on accuracy and won the Large-scale Visual Recognition Challenge 2014 for classification and localization (Russakovsky et al. 2015). Their deep structure (VGG-16), with 16 weighted convolution and fully connected layers, was found to be most accurate in Girshick's (2015) study. The architecture and layer specification of VGG-16 are composed of 22 layers with convolutional (CONV), max pooling, fully connected soft layers. All CONV layers perform convolution using 3×3 filters with a 1 pixel stride and are followed by a rectified linear unit (ReLU) activation function (Nair and Hinton 2010), which is used to provide non-linearity and increase the speed of convergence by six in a CNN, compared to other activation functions (Krizhevsky et al. 2012). To maintain a constant spatial resolution, zero padding equal to 1 pixel in the CONV layers is used. Max-pooling layers perform spatial pooling using 2×2 filters with a two pixel stride. These CONV and pooling layers (one to 18) are followed by three fully connected layers and a softmax layer, which are customized for the 1,000 class ImageNet dataset.

The original VGG-16 architecture was modified to develop the fast R-CNN-based method to detect multiple types of structural damage of the second embodiment. The last max-pooling (layer 18) was replaced by the RoI pooling layer. To prevent overfitting during the training process, dropout layers with a threshold of 0.5 were added between the first and second fully connected layers and between the second and third fully connected layers. The depth of the last fully connected layer was modified to six for the five damage types and background to ensure compatibility with the problem. The softmax layer was replaced with softmax and regression layers as shown in FIGS. 23 and 25. The details of the fast R-CNN method are presented in Table 3, and the layers as indicated in Table 3 are labeled in a corresponding manner in FIG. 25.

Selective searches were introduced by Uijlings et al. (2013) to generate object proposals using segmentation for computing small, similar regions based on pixel values in an image and perform hierarchical grouping of these regions. To calculate small, similar regions, Euclidian distances between values of pixels and surrounding pixels are calculated. Progressive merging is applied on neighboring pixels with distances smaller than a specific factor ($\sigma$) to reach regions with sizes greater than k (Felzenszwalb and Huttenlocher 2004), which is described in further detail shortly. Selective searches create hierarchical groupings, in which the similarities of neighboring regions are computed, and the two most similar regions are merged. These similarities are measured based on color, texture, size, and the way gaps are filled between the two regions. In each iteration of the hierarchical grouping, the merged region can be bounded by a box, which is extracted as an object proposal. This procedure of selective searching can generate object proposals with different scales, based on the characteristics of the input image and initial segments. Thus, by changing the parameters of the segmentation step ($\sigma$ and k), selective searches provide various numbers of object proposals.

In the illustrated second embodiment, a database of five structural damage classes was developed, containing steel delamination, steel corrosion (medium and high), bolt corrosion, and concrete cracking. To collect image samples, a Nikon 5200 DSLR camera with a resolution of 6,000×4,000 was used to take 258 images of a building and two bridges, for example. The images contained damaged elements under different lighting conditions at a distance of 1.0 to 1.5 m from the camera and were cropped to 500×375 pixels. Among the cropped images, 1,697 contained structural damage and were chosen to generate the database.

Each image included more than one object (damage) with different classes (damage type); thus, it was necessary to specify the ground-truth location of each object and its corresponding label in the image. To prepare annotations, including object classes and object bounding boxes, a simple MATLAB code was developed to specify the label and coordinates of the box surrounding each object manually. Then, among the 1,697 images selected, 2,488 objects were annotated. Examples of images, their annotations including object labels, and bounding boxes are shown in FIG. 26.

To prepare training and validate the datasets from the annotated images as for example shown in FIG. 26, the validation set was selected randomly so that the validation set for each damage class contained at least 30% of both images and objects. The training and validation sets did not overlap. The detailed proportions of training and validation sets for each damage class are shown in Table 4.

All experiments were performed using MatConvNet (Vedaldi and Lenc 2015), MATLAB 2016a, official selective search MATLAB code (Uijlings et al. 2013), CUDA 8.0, and CUDNN 5.1 on a computer with a Core i7-6700k @4 GHz CPU, 32 GB DDR4, memory and 8 GB memory ASUS Turbo GeForce GTX 1080 graphics processing unit (GPU). The network was trained with a learning rate of 0.00001 for the first 50 epochs, which decreased to 0.000001 for the second 50 epochs. Following the work of Girshick (2015), a momentum of 0.9 and a weight decay of 0.0005 were used for the training process. Partial and fully connected softmax and regression layers of the CNN were initialized by a pre-trained VGG-16 on Imagenet and a zero-mean Gaussian distribution with standard deviations of 0.01 and 0.001, for each layer respectively. Fast R-CNN scales were used to input images and reduce errors related to scale variations among objects. The network was examined by scaling the shorter side of input images to 375 and 750 pixels, while maintaining aspect ratios. To find the optimal parameters for selective searches to generate object proposals, 10 combinations of k (50, 75, 100, 125, and 150) and a (0.2 and 0.4) were used. The detailed parameters of each case and the time required to generate object proposals for a 500×375 pixel image are shown in Table 5.

The network was trained with 100 epochs and the convergence checked for 20 cases, which are presented in Table 5. Network precision was evaluated with a validation set. FIGS. 27A-F shows the learning process for Case 9 (Table 6) with 375 and 100 scaling for 0.2 k and a, respectively. In FIGS. 27A-F, graph lines with circular markers in the graphs represent data for a scaling of 375; graph lines with triangular markers represent data for a scaling of 750; graph lines with square markers represent data for a test time for scaling of 375; and graph lines with diamond-shaped markers represent data for test time for scaling of 750. The training time using for GPU was about 11.5 hours and 3.5 hours for scaling of 750 and 375. Without using the GPU, these times increased to 12.5 days and 4.2 days in CPU mode. The average precision (AP) for the five types of damages, mean AP (mAP), and time required to evaluate a 500×375 pixel image are shown in Table 6.

FIGS. 28A-F shows variations in AP based on the number of object proposals for each damage class with different scaling. In addition, the required time to produce proposals and test a 500×375 pixel image was based on the number of object proposals and different scaling, as shown. The highest AP for different classes was for scaling at 375 (i.e., there were no changes in images size), although the accuracy of the fast R-CNN for VOC improved by scaling up (Girshick 2015). Using a scale of 750 may increase the AP of a class in some cases, but the corresponding mAP and APs of other classes may decrease. For example, the AP of Case 12 (scaling of 750) (Table 6) was dramatically improved for high steel corrosion, compared to Case 11 (Table 6) with the same proposals (scaling 375), but the APs for concrete cracks, steel delamination, and medium steel corrosion decreased with a slight increase in mAP related to high steel corrosion. As seen in FIGS. 28A-F, increasing the number of object proposals increases computational costs and has no correlation with APs and mAP, unlike the results for the VOC that showed improved mAPs when increasing the number of proposals to 4,000 (after 4000 proposals, the mAP decreases; Girshick 2015). To ensure reasonable balance among APs, mAP, and testing times, Case 13 was chosen because it had the highest mAP and required 0.46 sec to evaluate an image after generating proposals and testing.

To validate the performance of the trained fast R-CNN for structural surface damage detection, extensive tests were carried out on 11 new images with 6,000×4,000 resolution, taken at a distance of 1.0 to 1.5 m from the target object. The test images included various conditions, such as spot lighting, shadowing, and blurring, to investigate the robustness of the proposed method. To retain the performance level achieved by Case 13, each image was input into the network in 128 separate parts with 500×375 resolution, and the output was reassembled. The input and output images are shown in FIGS. 14, 8, and 9, the mAP was 74.2%, and the overall APs were 74.1%, 65.4%, 82.2%, 78.2%, and 71.3% for concrete cracks, steel delamination, bolt corrosion, and steel corrosion (medium and high levels), respectively.

FIGS. 29A-C includes images with steel damage in intense lighting. FIG. 29A shows good performance for detecting objects at distances between 1 m and 1.5 m from the camera. The areas enclosed by rectangular boxes in the right-hand side image of each of FIGS. 29A-C identify a defect identified by the fast R-CNN. Typically, each boxed area corresponding to a different type of defect has a prescribed colour or hue so as to not only indicate presence of the defect but also to identify the type of defect indicated by the system. For example, cyan, green, yellow, purple, and blue boxes correspond to the damage types of concrete crack, bolt corrosion, steel delamination, medium steel corrosion and high steel corrosion detected by the network in the images received. In FIG. 29A, a corroded bolt was incorrectly detected as indicated by the outlying boxed area in the bottom left-hand quadrant of the output image (on the right hand side of FIG. 29A), and areas beyond 1.5 m from the camera were not detected and thus are not enclosed by any overlaid identification box or perimeter. FIGS. 29B and 29C show suitable results in intensive sunlight and shadow, but in FIG. 29C, two corroded bolts were incorrectly detected generally within an area of the image in which medium steel corrosion was detected at various spots in the image. In FIG. 29B, an elongate horizontally extending overlaid band identifies an area between surfaces under sunlight and shadow which was not initially detected in the image as illustrated in FIG. 29B until the camera's angle and location was subsequently modified. Generally speaking, this can be overcome by rotating the angle of the camera with the camera is mounted on a movable support such as the unmanned aerial vehicle.

FIGS. 30A-D shows including cracks in a concrete surface. Concrete cracks under different lighting conditions were detected successfully; however, in the example of FIG. 30A some areas were incorrectly identified as being defects due to the intense lighting conditions, the fact that the cracks were smaller than the training set provided to the fast R-CNN. These incorrect markers include the outliers generally on the right half of the output image of FIG. 30A.

Figure 31A:
Figure 31B:
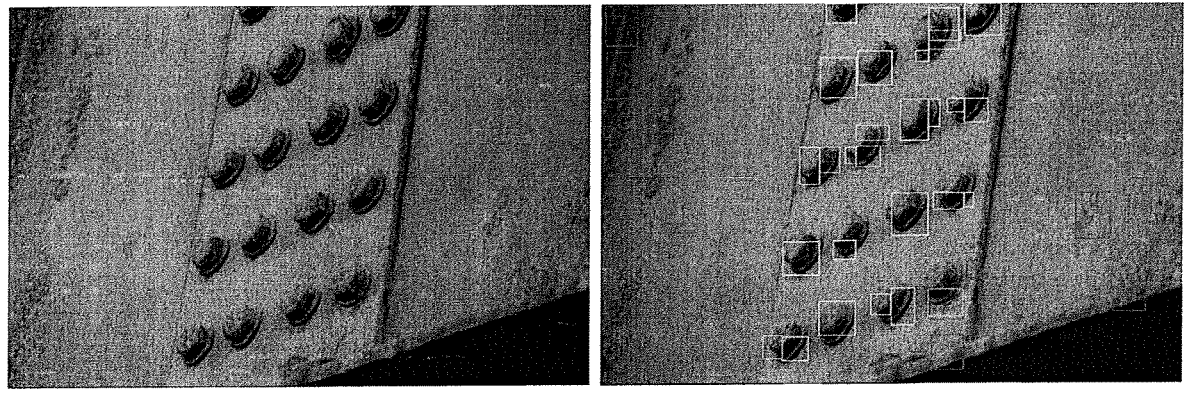
Figure 31C:
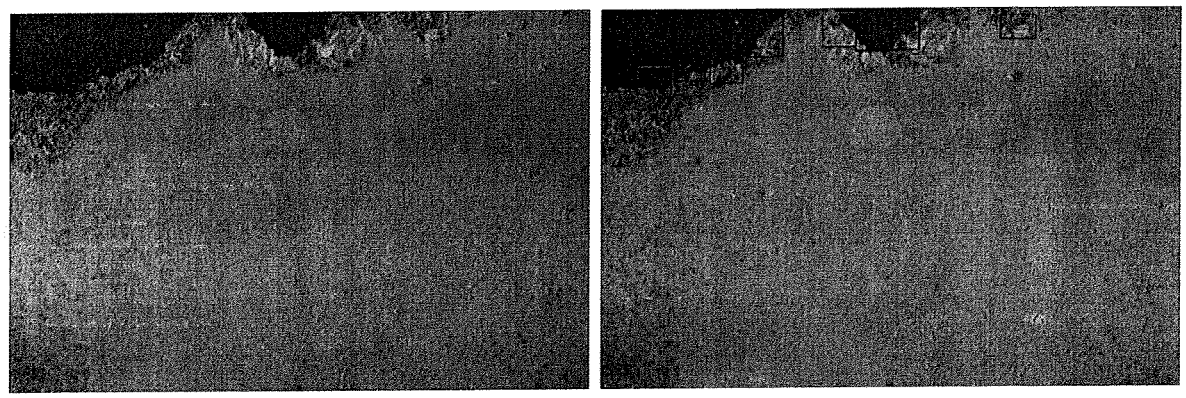
Figure 31D:
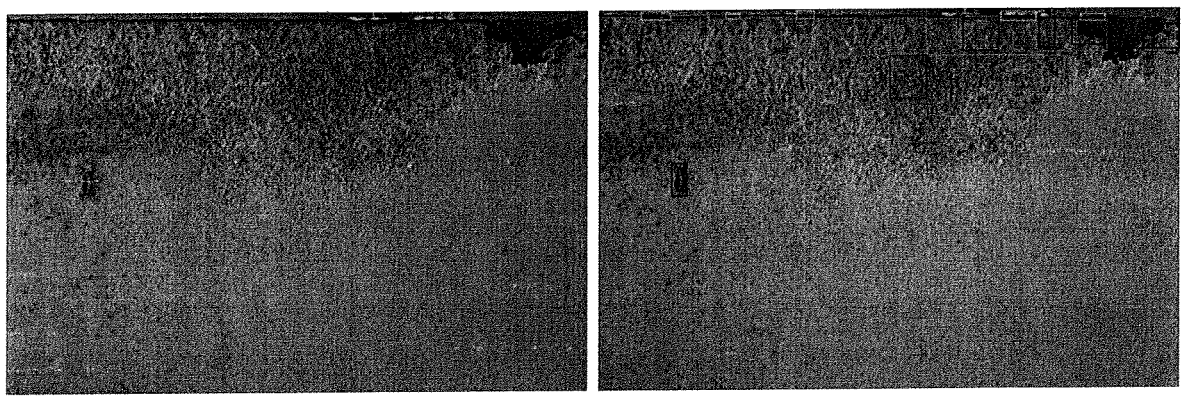

FIGS. 31A-D show steel structures with steel plates and bolts under uniform lighting conditions. FIGS. 31C-D show corroded steel surfaces without any bolts. In FIGS. 31A-C, damage was detected satisfactorily, but at some locations, corroded bolts were incorrectly detected as steel corrosion even though the fast R-CNN has been trained to detect corroded bolts as a separate damage type. In FIG. 31D, smaller objects, such as steel delamination, were more sensitive, compared to others because of the camera distance.

The results demonstrate that the second embodiment offers suitable performance for detecting structural surface damage, although minor errors occurred caused by distances that were to close or far between damage objects and the camera, which may be overcome by providing a larger dataset for training.

FIGS. 32A-C provide a comparison of the output of the first and second embodiments. These figures show that the fast R-CNN of the illustrated second embodiment is less susceptible to incorrect defect detection caused by edges or non-structural elements as compared to the CNN of the first illustrated embodiment which is configured for binary classification (i.e., crack or no crack). As such, intact edges in the concrete members of the photographs represented by FIGS. 32A-C were detected as cracks, and parts of the images, including non-concrete elements, were detected as intact or cracked concrete. The fast R-CNN has improved defect detection (as it relates to correctness of the type of damage detected) because it localizes RoIs before applying classification.

Thus, in summary of the second illustrated embodiment, there is disclosed a multi-task, structural surface-damage detection method using a fast R-CNN to detect five types of damages: concrete cracks, steel delamination, bolt corrosion, and steel corrosion (medium and high levels). To provide a database for training and validating the fast R-CNN, 258 images with resolutions of 6,000×4,000 were taken using a DSLR camera. The images were cropped to 500×375 pixels, and 1,697 cropped images containing structural damage were selected to generate a database. The ground-truth location of each damaged object and its corresponding label in the selected images were prepared, and 2,488 objects were labeled. To train, validate, and test the proposed method, during each step of the process, different sets of image data were used. The results showed 81.7%, 77.4%, 89.6%, 82.9%, and 79.7% AP for the five damage classes, respectively, and an 82.3% mAP during the validation step. The robustness of the trained fast R-CNN was investigated using 11 new 6,000×4,000 pixel images taken of different structures for testing. The results showed suitable performance using these new samples.

FIGS. 33-47 show a third embodiment of the computer-implemented arrangement for detecting defects in surfaces in which an architecture and dataset are modified to classify five objects and train and validate the Faster R-CNN to provide quasi real-time, simultaneous, and automated vision-based structural surface damage detection of multiple damage types in videos. Generally speaking, this embodiment comprises a region proposal network (RPN) to generate object proposals, architecture for CNNs (Zeiler and Fergus, 2014), Fast R-CNN, and combining Fast R-CNN and RPN to create the Faster R-CNN, which is also an alternative term used herein for convenient reference to the third illustrated embodiment.

The Faster R-CNN is used for quasi real-time processing of images and videos to detect and localize multiple types of damage. The overall schematic architecture of the Faster R-CNN is shown in FIG. 33. A RPN is used to provide object proposals in images and a Fast R-CNN is used to improve the localization of the object proposals provided by the RPN and to classify objects in images. As shown in FIG. 33, both RPN and Fast R-CNN networks use the same convolutional neural network (CNN) to extract features from images. The Faster R-CNN of the third illustrated embodiment is configured to achieve structural damage detection and localization.

Turning now in more detail to the structure of the CNN shared by the RPN and Fast R-CNN, a convolutional layer of the CNN has the primary computational role and includes a set of filters (kernels) with learnable weights. Filters have the same depth as the input of their layer, and a smaller width and height than the input. For example, the filters of the first convolutional layer of a CNN that takes red-green-blue (RGB) images (which have depth 3) as input have depth 3. Each filter slide on the input and dot product (convolution) is calculated between the filter and its respective field on the input. A sliding step is defined by a stride that has an effect on output size and computational costs. Higher strides may decrease output size and computational cost, but might lead to lost features. The computed dot product values related to the channels of each filter are added together with a bias to produce the responses of each filter. These responses are stacked to produce the spatial output of the convolutional layer. Convolutional layer outputs feature its size, depending on stride, input size, and filter size, and may be less than the input size. As reducing output size may lead to lost features, symmetrical zeros can be added into the input to maintain output size.

A max pooling layer performs down-sampling by decreasing the spatial size of its input. Down-sampling reduces computational costs and the probability of over-fitting. A max pooling layer slides a window (filter) on the input and outputs the maximum value from its respective field.

Unlike a convolutional layer, which connects to a local spatial region of its input, a fully-connected layer connects to all neurons in its previous layer. This layer, such as a layer in a regular multi-layer artificial neural networks, is a vector that performs dot product and adds a bias on its inputs in each neuron.

A softmax layer is a well-known multi-class classifier in CNNs that can predict the class of its input. Softmax normally takes features from a fully-connected layer, calculates the probabilities of each individual class, and then outputs the class with the highest probability as the classification results.

The role of the region proposal network (RPN) which is schematically illustrated in FIG. 34 is to put forward or suggest (for use) selected object proposals. The RPN takes images as inputs and outputs a set of rectangular object proposals, including the probability of being an object in each proposal. RPN uses a CNN to extract a feature map (outputs of the last layer of CNN) and slide another convolutional layer (CONV) on the map. The CONY layer is followed by a rectified linear unit (ReLU) activation function (Nair and Hinton, 2010), which provides non-linearity and increases the speed of convergence (Krizhevsky et al., 2012). This CONV, followed by ReLU, maps the features of each sliding window to a vector, which is fed into regression and softmax layers. Regression and softmax layers predict the coordinates of the multiple bounding boxes and the probability of being an object in each box, respectively.

In order to generate object proposals, each corresponding spatial window of the sliding CONY is associated with nine rectangular boxes called anchors, as shown in FIG. 34. Based on the work of Ren et al. (2016), the recommended number of anchors is nine. The nine anchors are composed of three different widths and heights, and are expressed as eight constants [i.e., center of the sliding CONV window: $(x_a, y_a)$, width and height: $(w_a^k, h_a^k)$] for nine anchors, where k is three. Thus, the combinations of the three widths and heights provides nine anchors. In order to calculate the overlap between an anchor and a ground truth, the Intersection-over-Union (IoU) concept is used. An anchor is labelled as positive if its IoU ratio with a ground-truth is the highest, if there are multiple ground truths, or if it is greater than 0.7 (Ren et al., 2016). Boxes with every IoU ratio lower than 0.3 are labelled as negative (background). The other anchors are not used for the training process.

This sliding CONV, followed by ReLU, is fed into a fully-connected layer (feature vector) as shown in FIG. 34. Using the vector and initial weights, the softmax layer calculates two outputs for each of the nine generated boxes at each sliding CONV window, which are the probability of being an object in the box or just being part of the background (having no object). The probability of object-ness, i.e. there being an object, which is calculated by softmax layer for each bounding box, is between zero and one, and is updated during training process to minimize its difference from one or zero for positive or negative anchors, respectively. The regression layer, which is the regressor introduced by Girshick et al. (2014), predicts the center coordinates, width, and height of a bounding box, and is trained to map the predicted box to a ground-truth box.

RPN is trained end-to-end, for both classification and regression layers, by mini-batch gradient descent (MBGD). The MBGD computes gradients for one image per iteration by randomly selecting 256 mini-batches (half positive and half negative anchors) to train RPN using the following loss function indicated as Equation 8, $$L(p_i, p_i^*, t_i, t_i^*) = \frac{1}{N_{cls}} \sum_i L_{cls}(p_i, p_i^*) + \frac{1}{N_{reg}} \sum_{j \in \{x,y,w,h\}} p_i^* L_{reg}(t_{i,j}, t_{i,j}^*) \quad (8)$$

where i is related to each anchor in the mini-batch, and pi* and pi are the ground truth label and predicted probability of being an object in the anchor, respectively. pi* is zero or one for negative or positive labels of an anchor, respectively. In Equation (8), when an anchor is negative, just the term including Lcls is active to improve classification. For normalization of classification and regression terms in multi-task loss, the constants Ncls and Nreg are used (Ren et al., 2016), and are equal to the mini-batch size and number of anchors divided by 10, respectively. The variables ti,j and ti,j* in Equation (8) are used to define the geometrical differences between the predicted bounding box and anchor, as well as the ground-truth box and the anchor, and is calculated as indicated by Equation 9 below, $$\begin{bmatrix} t_{i,x}, t_{i,y} \\ t_{i,w}, t_{i,h} \\ t_{i,x}^*, t_{i,y}^* \\ t_{i,w}^*, t_{i,h}^* \end{bmatrix} = \begin{bmatrix} (x_i - x_{i,a})/w_{i,a}, (y_i - y_{i,a})/h_{i,a} \\ \log(w_i/w_{i,a}), \log(h_i/h_{i,a}) \\ (x^* - x_{i,a})/w_{i,a}, (y^* - y_{i,a})/h_{i,a} \\ \log(w^*/w_{i,a}), \log(h^*/h_{i,a}) \end{bmatrix} \quad (9)$$

where $(x_i,y_i)$, $y_{i,a}$) and (x*, r) are center coordinates of the predicted bounding for the i-th anchor, the anchor, and the ground-truth with the highest IoU with the anchor, respectively. Variables $(w_i, h_i)$, $(w_i, h_{i,a})$, and (w*,h*) are the width and height of predicted bounding box, anchor, and ground truth box, respectively. FIG. 35 shows an example of the geometry of an anchor, a predicted bounding box, and a ground-truth box, respectively.

The predicted bounding box parameters are trained to improve their overlap with those of the ground-truth boxes. The Log Loss function is used as the classification loss function, $L_{cls}$, and regression loss function; Lreg is determined by Equation 10 as follows $$L_{reg}(X_1, X_2) = \begin{cases} 0.5(X_1 - X_2)^2 & \text{if } |X_1 - X_2| < 1 \\ |X_1 - X_2| - 0.5 & \text{otherwise} \end{cases} \quad (10)$$

where $X_1$ and $X_2$ are example variables. As can be seen in Equations 8 to 10, the variables of Equation 9 are used in Equation 10 to calculate the geometrical differences between the predicted bounding box and the ground-truth box to use as the regression loss. These differences are minimized in the training process to improve the overlap between the predicted bounding box and ground-truth box. A detailed description of the updating process of bounding boxes can be found in the research of Girshick et al. (2014).

The schematic architecture of the Fast R-CNN shown in FIG. 36, which forms the Faster R-CNN of the third embodiment, acts to localizes and classifies objects in images. The Fast R-CNN takes pre-computed object proposals from RPN and uses CNNs, like RPN, to extract a features map from the input image. Features bound by object proposals are called a region of interest (RoI). In the RoI pooling layer as shown in FIG. 36, pre-computed object proposals are overlaid on the feature map. RoI pooling takes RoIs and applies max pooling operation to extract a fixed-size feature vector from each RoI. These vectors are fed into fully-connected layers, followed by two regression and softmax layers, to calculate the location of bounding boxes and classify objects in the boxes.

For each RoI, the regressor outputs four parameters that represent the center coordinates (Txu, Tyu) of object bounding boxes, as well as their height (Thu) and width (Twu); softmax outputs the probability (P=($P_0, P_1, \ldots, P_k$)) of k+1 classes (k training class+1 background class). If the IoU ratio between a RoI and a ground truth is more than 0.5 (Girshick, 2015), its label is positive. By contrast, the label of the RoI is background if the IoU is between 0.1 and 0.5.

Mini-batch gradient descent (MBGD) is used to train end-to-end Fast R-CNN using Equation 11 below as loss function where u and v represent the label and coordinates (center coordinates, height and width) of the bounding box of each ground truth, v=($v_x, v_y, v_h, v_w$). Parameter u is one or zero for positive or background RoIs, respectively. $L_{cls}$ is log loss and operates as the softmax's loss, whereas $L_{reg}$ (Equation 10) works as regression loss. Two images per iteration and 64 RoIs as mini-batches (25% positive and 75% negative) for each image are randomly selected to train Fast R-CNN (Girshick, 2015).

$$L(P,u,T^u,v)=L_{cls}(P,u)+[u\geq 1]\Sigma_{i\in(x,y,w,h)}L_{reg}(T_i^u,v_i) \quad (11)$$

The same architecture of CNN for RPN and Fast R-CNN should be used to share their features for Faster R-CNN. There are many well-known architectures for CNNs [i.e., VGG-16 (Simonyan and Zisserman, 2014), Microsoft ResNet-152 (He et al., 2016), and GoogleNet (Szegedy et al., 2015)]. However, ZF-net (Zeiler and Fergus, 2014) has the fastest training and testing speed and can be used for real-time detection, as demonstrated in many studies (Ren et al., 2016; Li et al., 2016). Zeiler and Fergus (2014) introduced their network (ZF-net) with eight weighted convolutional and fully-connected (FC) layers, and won the Large-scale Visual Recognition Challenge 2013 for its classification (Russakovsky et al., 2015). The architecture and layer specifications of ZF-net are composed of 13 layers with convolutional, local response normalization (LRN), max pooling, fully-connected and softmax layers. All CONV layers are followed by a ReLU activation function and have zero padding, in the way that keeps their constant spatial resolution. Max-pooling layers perform spatial pooling using 3×3 filters with a two-pixel stride and zero padding equal to 1 pixel. These CONV, LRN, and pooling layers are followed by three fully-connected layers and a softmax layer, which are customized for the 1,000 class ImageNet dataset.

To develop a Faster R-CNN-based method to detect multiple types of structural damage, the original ZF-net architecture is modified for RPN and Fast R-CNN. In order to develop RPN, the original ZF-net is modified. That is, the last max-pooling and FC layers of ZF-net are replaced by the sliding CONV, followed by a fully-connected layer (feature vector) with 256 in depth, and its softmax layer is replaced with softmax and regression layers as shown in FIG. 37. The details of the ZF-net-based RPN are presented in Table 7 and the layers as indicated in Table 8 are labeled accordingly in FIG. 37.

In order to modify for Fast R-CNN, the last max-pooling layer of ZF-net is replaced by the RoI pooling layer. To prevent overfitting during the training process, dropout layers with a threshold of 0.5 are added between the first and second fully-connected layers and between the second and third fully-connected layers of ZF-net. The depth of the last fully-connected layer is modified to six for the five damage types and background to ensure compatibility with the problem. The softmax layer is replaced with softmax and regression layers as shown in FIG. 38. The details of the ZF-net-based Fast R-CNN are presented in Table 8 and the layers as indicated in Table 8 are labeled accordingly in FIG. 38.

In the Faster R-CNN of the third embodiment, computations of the CNN for feature extraction are shared between RPN and Fast R-CNN, as shown in FIG. 38. Also, the first nine layers of both RPN and Fast R-CNN have the same specifications, and their computations can be shared. FIG. 39 shows the eventual architecture of the Faster R-CNN of the third embodiment produced by a combination of Fast R-CNN and RPN and sharing these nine layers.

A four-step training process is used to fine tune the parameters of the RPN and Fast R-CNN. In the first step, RPN is trained with initial weights, and object proposals are prepared for Fast R-CNN. Then, the Fast R-CNN is initialized with the trained weights from step one. In step three, RPN is initialized with the final weights of the previous step and trained again. For the last step, Fast R-CNN takes the object proposals generated in step three and is trained with the initial parameters trained in step three. As RPN may produce more than 2,000 object proposals for an image, which causes costly computations and may decrease the accuracy of object detection (Girshick, 2015; Ren et al., 2016; Fan et al., 2016), outputs of RPN are sorted based on the score of its softmax layer, and the first 2,000 objects proposals (if there are more than 2,000 generated proposals) with the highest scores are fed into the Fast R-CNN in the second stage of training. Using the methods of Ren et al. (2016) for the fourth stage of training as well as the testing stage, the first 300 object proposals with the highest scores are used to increase the speed of detection.

In order to develop a database containing steel delamination, steel corrosion (medium and high), bolt corrosion, and concrete cracks, 258 images (with a resolution of 6,000×4,000 pixels) are collected using a Nikon 5200 DSLR camera. Images are taken under different lighting conditions at a distance of 1.0 to 1.5 m from the camera. The images are taken from two bridges and a building, for example. These images are cropped to 500×375 pixels, and 1,697 cropped images that include the structural damage types are chosen to generate the database.

To annotate the labels of the objects (damage type) and the coordinates of their corresponding bounding boxes in images, a code in a MATLAB environment is developed to specify them manually. During the annotation process, the labels and bounding boxes for 2,488 objects are specified in the 1,697 images. FIG. 40 shows the examples of annotated images. As used with reference to the third embodiment, corrosion under the covered steel sections that cause color change and cover deformation is considered to be medium corrosion. In contrast, a corrosion is deemed to be "high corrosion" when the cover is removed and a rough corroded steel surface is observed.

In order to generate the testing dataset, images are randomly selected from the annotated images so that the selected testing set contained at least 30% of images of each damage type, and simultaneously, included at least 30% objects of each damage type. The remaining images not selected for the testing dataset are used to create a training and validation dataset. Data augmentation is a way to increase the performance of CNNs and can reduce the probability of overfitting, in addition to dropout, on small databases. Following the work of He et al. (2014), we perform horizontal flipping as shown in FIG. 41 on the training and validation set for data augmentation. Table 9 shows the detailed proportions of the testing, training and validation sets after data augmentation.

All experiments are performed using the open source Faster R-CNN library (Ren et al., 2016), MATLAB 2016a, CUDA 8.0, and CUDNN 5.1 on a computer with a Core i7-6700k @4 GHz CPU, 32 GB DDR4 memory and 8 GB memory ASUS Turbo GeForce GTX 1080 graphics processing unit (GPU). The layers of the CNN and fully-connected layers are initialized by zero-mean Gaussian distribution with standard deviations of 0.01 and 0.001, respectively. The RPN and Fast R-CNN networks are trained with a learning rate of 0.001, momentum of 0.9 and weight decay of 0.0005 for 80,000 and 40,000 iterations, respectively.

Average precision (AP) is used to evaluate the performance of an object detector (Girshick et al., 2014; He et al., 2014; Girshick, 2015; Ren et al., 2016), and summarizes the precision/recall curve by calculating the area under the curve (Everingham et al., 2010). For a given class, precision and recall are defined as the proportions of true positives in the retrieved results and the proportions of true positives which are from the positive class, respectively. Mean average precision (mAP) is defined as the average of calculated APs for all classes.

In order to find the optimal anchor sizes and ratios for initializing the Faster R-CNN, 27 combinations of ratios from nine different ratios (0.2, 0.35, 0.5, 0.85, 1, 1.15, 1.7, 1.85, and 2) and two combinations of sizes from six different anchor sizes (96, 128, 192, 256, 384, and 512) were investigated. In the trials documented herein, the validation set is randomly chosen for each case from all available training and validation sets so that the selected validation testing set contained at least 30% of images from each damage type. Ren et al. (2016) labelled a RoI as the calculated class determined by the softmax layer of the Fast R-CNN if the calculated probability of softmax for the RoI was 0.6 or more (for each class among the 20 classes of VOC database). If the probability was lower than 0.6 for the 20 classes of VOC, or was more than 0.6 for classifying as a background, the Faster R-CNN was configured so as to not consider the RoI to be the result of object detection. Increasing this probability causes higher mean average precision in the examples used by the illustrated embodiment, so the probability of 0.97, instead of 0.6, is used in the trials documented herein.

No scaling is applied to the images used by the third embodiment, which are taken from an approximately constant distance between the damages and camera and have insignificant scale invariances. Additionally, a stride of 16 was implemented in regard to the sliding step of the CONV of the illustrated third embodiment.

The network is trained using the four-step training strategy for 54 cases, and its precision is evaluated with the test set. The training time using GPU mode is approximately 4 hours, and using CPU mode would be approximately 4.5 days. The time required to evaluate a 500×375-pixel image is 0.03 s in GPU mode and 0.45 s in CPU mode. FIG. 42 and Table 10 show the average precision (AP) recorded for the five types of damages and mean AP (mAP) therefor. In FIG. 42, the solid graph line with no markers corresponds to mAP; the solid graph line with rectangular markers corresponds to concrete cracks; the broken graph line with triangular markers corresponds to the damage type of medium steel corrosion; the broken graph line with markers in the form of X's corresponds to high steel corrosion; the broken graph line with circular markers corresponds to bolt corrosion; and the broken graph line with diamond-shaped markers corresponds to steel delamination.

FIG. 42 and Table 10 show that the highest AP for concrete cracks is 90.3% in Cases 7, 26 and 43, although the APs for the other classes in these cases may be lower than their average. To ensure a reasonable balance among APs, we choose Case 2, which had the highest mAP (86.7%) and APs with 89.7, 84.6, 83.5, 90.5 and 85.0 for concrete cracks, medium steel corrosion, high steel corrosion, bolt corrosion and steel delamination, respectively. Case 2 has anchors with the ratios of 0.20, 0.85, and 1.70 and the sizes of 96, 192, and 384.

The trained Faster R-CNN was subsequently tested using 11 newly taken and not previously processed 6,000×4,000-pixel images. These images have visual features produced by various lighting conditions and are captured at a distance of 1.0 to 1.5 m of the camera lens from the surface. To yield similar precision as produced for Case 2 in Table 10, each image is inputted into the network in 128 separate parts (with 500×375 resolution), and its output parts are subsequently reassembled. The outputs show mAP with 86.5% and APs with 90.6, 83, 84.3, 91.4, and 83.3 for concrete cracks, medium steel corrosion, high steel corrosion, bolt corrosion, and steel delamination, respectively, which are similar to the average precisions of Case 2. Examples of input and output images are shown in FIGS. 43A-C, FIGS. 44A-C and FIGS. 45A-D.

FIGS. 43A-C show images of a structure comprising steel plates and bolts with steel damage taken in intense lighting. Defects related to bolt corrosion, steel delamination, medium steel corrosion and high steel corrosion were identified by the Faster R-CNN on the subject structure defining the target surface of the health analysis each indicated by enclosed area markers with different styles of border or boundary line. Upon a comparison to the original images, the output successfully identifies the substantial majority of the defects visible at the surface of the subject structure, aside from a few incorrectly identified defects which can be correctly identified by rotating the angle of the camera with a movable unmanned aerial vehicle in order to compensate for factors which decrease the likelihood of proper identification such distance to object and extremely intense lighting which causes the image to lose some information on the target surface.

Figure 44A:
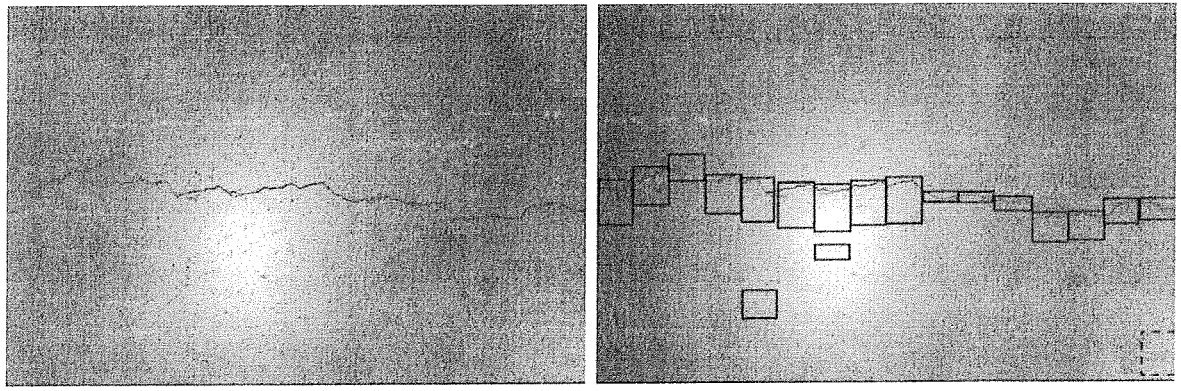
Figure 44B:
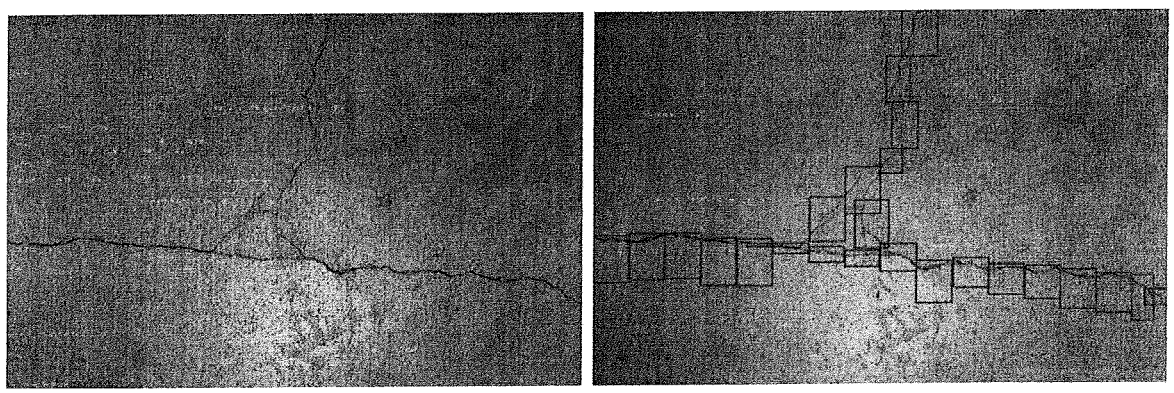
Figure 44C:
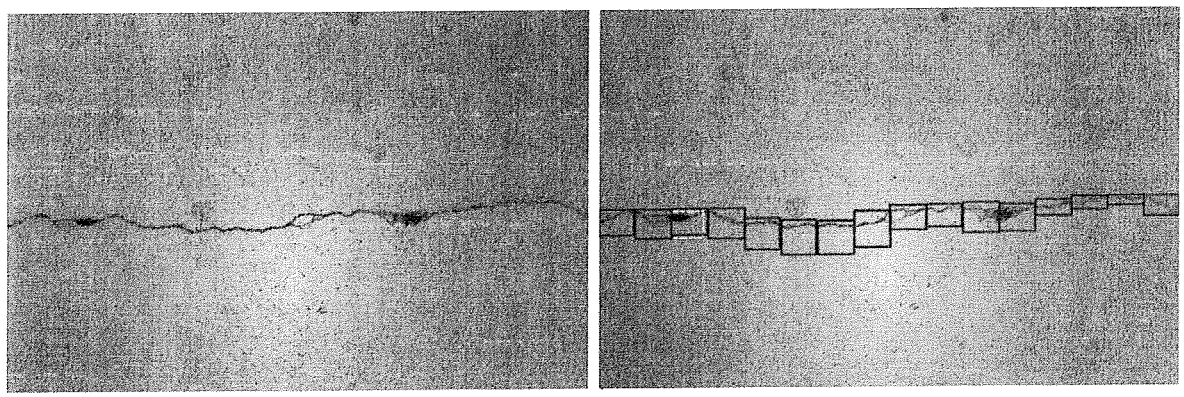
Figure 44D:
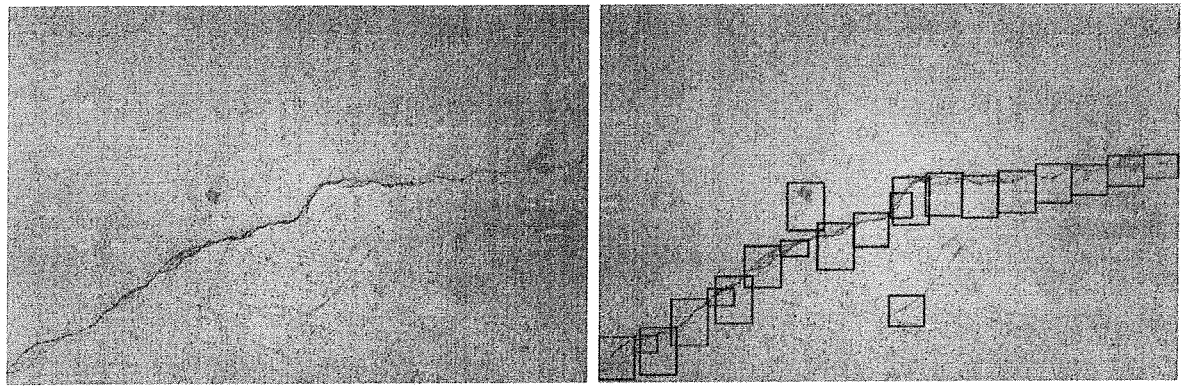

Images including concrete cracks are shown in FIGS. 44A-D. In these examples, the output of the Faster R-CNN identified three damage types including concrete crack, medium steel corrosion, and high steel corrosion, each instance of which is encompassed by an overlaid area marker with a different style of boundary line. The foregoing figures show that concrete cracks are successfully detected under different lighting conditions, although two incidences of incorrect detection are shown in FIG. 44A, which are due to intense lighting conditions and due to cracks as shown being smaller than those depicted in the training set. In addition, one location with orange lighting in FIG. 44A is detected as medium steel corrosion as identified by the outlying area marker in the bottom right-hand quadrant of FIG. 44A. In FIG. 44D, two locations on the subject surface with patterns visually similar in appearance to cracking (but which are not cracks confirmed upon a visual inspection) are incorrectly detected as cracks, and one location with intensive lighting produced results that detected high steel corrosion. However, these errors are resolvable by using a larger training database and/or rotating the angle of the camera.

Figure 45A:
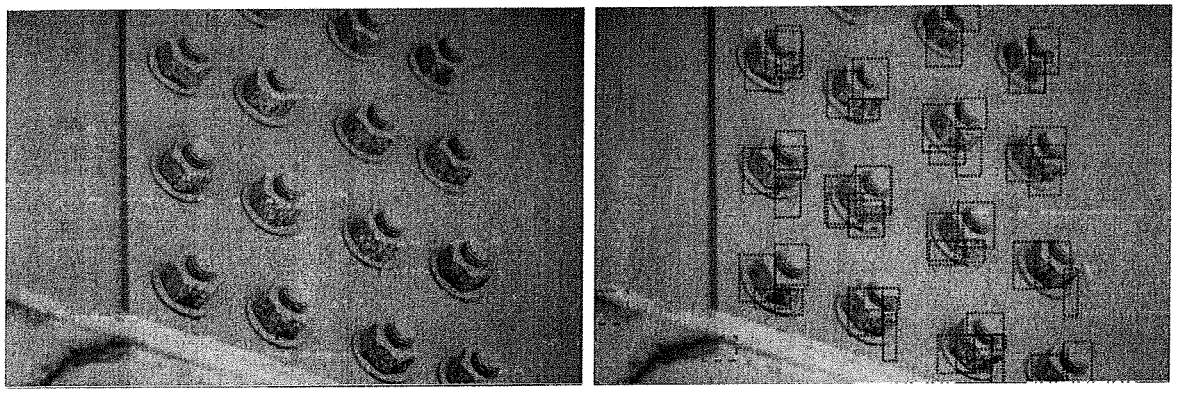
Figure 45B:
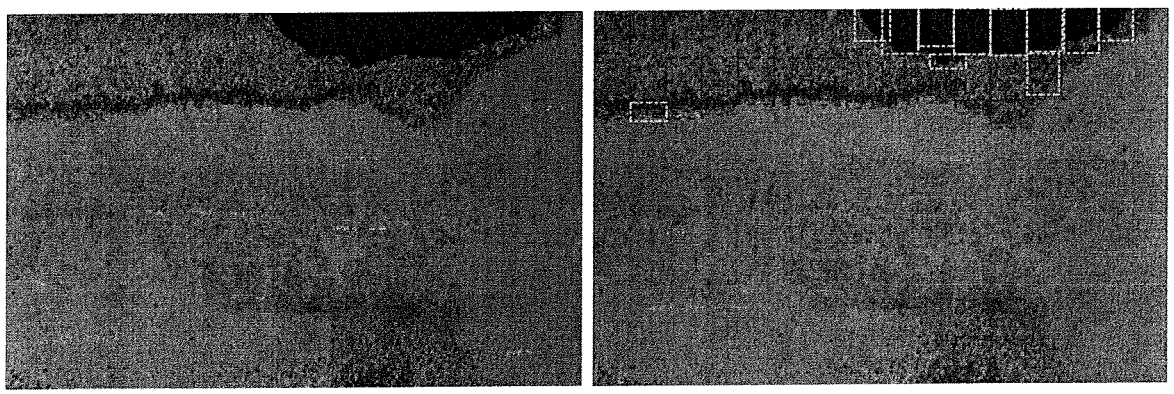
Figure 45C:
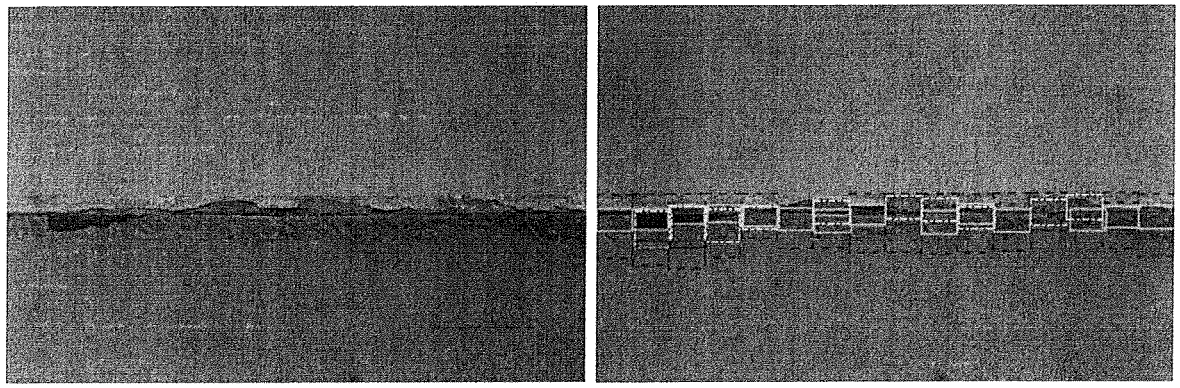
Figure 45D:
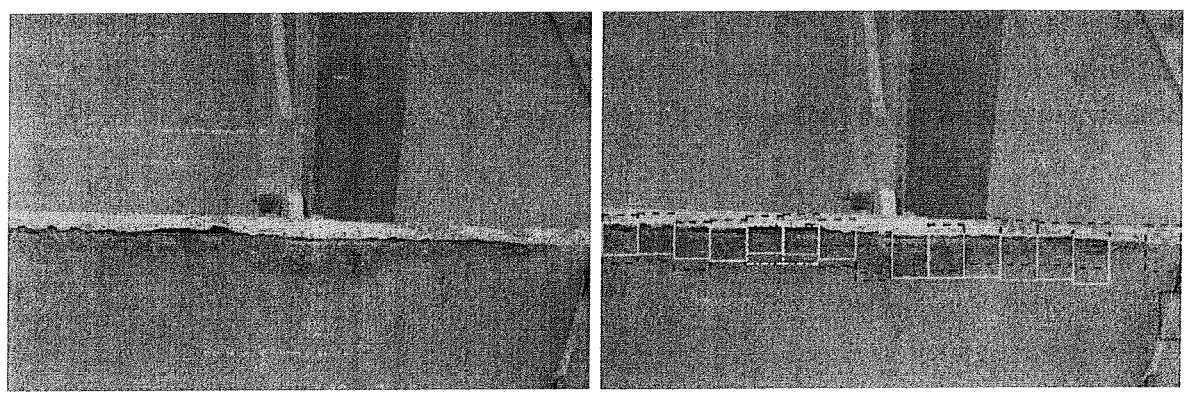

FIGS. 45A-D includes images of steel damage comprising primary corroded bolts and/or plates, captured under uniform lighting conditions. The Faster R-CNN detected all five trained types of damage, each designated on the output image by an area marker having a distinct boundary line. Generally speaking, the Faster R-CNN was successful aside from some errors which can be resolved by increasing the training dataset and exhibiting more care when capturing the images. For example, in FIG. 45A, at some locations, defects which are in actuality corroded bolts are incorrectly detected as steel corrosion despite the Faster R-CNN being trained to distinguish therebetween. Moreover, a corroded steel area in the foreground of FIG. 45A and thus blurred is not detected successfully. In FIG. 45B and FIG. 45C, the output incorrectly indicates the presence of two concrete cracks embedded amongst the area markers correctly showing delamination and the two levels of steel corrosion. In FIG. 45D, in addition to good performance in detecting areas that include corroded or delaminated steel, there are two incorrectly or undetected areas in the bottom right-hand quadrant of the image.

The results demonstrate the suitable performance of the Faster R-CNN-of the third embodiment, which is particularly suited for the autonomous visual inspection of civil infrastructure and which can generate results in real-time.

FIG. 46 compares the outputs of the first and third illustrated embodiments on a common test image. As shown in FIG. 46, the Faster R-CNN of the third embodiment includes two incorrect detections as medium steel corrosion which are the outlying area markers near the top edge of the image, which error can be solved by using a larger database. The output of the first embodiment shown on the left-hand side of FIG. 46 shows that the first embodiment is affected by the edges of concrete and brick elements, and most edges of intact concrete and bricks are detected as cracked concrete.

Thus the first embodiment is suited to more homogeneous-appearing surfaces, particularly since the first illustrated embodiment is trained for binary class detection only. More specifically, the false detection of the edges of the concrete and brick elements as defects by the first illustrated embodiment is attributable to the training of same for using images showing homogeneous-appearing and no edge-like shapes such as bricks, etc. However, if those edge-like shapes were fed to the CNN of the first embodiment, this system and method may provide results more accurate than what is shown in FIG. 46.

Nevertheless, the Faster R-CNN provided better results, even assuming the same training data specifically for concrete cracks is used to train the Faster R-CNN and the CNN of the first embodiment, because the Faster R-CNN is trained by many other image data that have many other backgrounds such as edges and edge-like shapes of structural elements for the other four types of damage used as examples of common damage types. Additionally, the Faster R-CNN uses various different-sized bounding boxes during the preparation of the training data for cracks as opposed to the fixed sliding window size of the CNN of the first embodiment, even assuming that the same original images are used. Therefore, the flexible sizes of the bounding boxes for the Faster R-CNN during the preparation of the training data provide greater variety in lengths and shapes of cracks, which help to differentiate cracks and edge-like straight lines. Thus, the Faster R-CNN provides better results with the advantage of flexible bounding box technique. Moreover, the Faster R-CNN has faster processing of the testing images than the CNN of the first embodiment because the original testing input image is only processed one time by the CNN (i.e., layers 1-9) and the Faster R-CNN applies bounding boxes (i.e., anchors) for the localization to the trained "feature map" as shown in FIG. 39. However, the CNN of the first embodiment applies "sliding window" to the original image many times implementing the processing of the entire network for each sliding window, and the sliding windows are overlapped 50% for the detection of crack in edges. Moreover, practically speaking, the sliding window size varies because the input testing images may have different scales and sizes with different distances between the camera and the object.

The trained Faster R-CNN of the third illustrated embodiment achieved 0.03 s per 500×375 resolution image in the detection of structural damage, which is suitable for quasi real-time detection. This test speed provided an evaluation of 3.33 frames per second if we had 1875×1000-pixel frames, including ten 500×375-pixel frames. In order to make the Faster R-CNN compatible with videos, we use videos with a 29.85 frame rate and 1920×1080 sizes, and considered an 1875×1000-pixel box at the center of the frames for evaluation. Boxes with frame step 14, f=(1,15, 29, . . . ), are input into the network, and the Faster R-CNN processed same in order to detect damages. As the detection results are provided for frame step 14, the resulting bounding boxes of Faster R-CNN are applied for the following frames of the evaluated frame until the next frame step. FIG. 47 shows a sample of 28 sequential frames (frame 167 to 194) from the example video for concrete detection where defect-identified area markers are overlaid on the image corresponding to each frame.

The Faster R-CNN thus accomplished quasi real-time autonomous damage detection. The speed of the network allows for the system and method to be implemented in a video-based scanning of a structure. An image can displayed to an inspector conducting the inspection shortly after being captured while the camera mounted to a moving vehicle continues to be displaced relative to the target surface in order to scan same.

Thus, in the second and third embodiments of this disclosure is described a system and method of detecting a defect in a surface from an image of the surface, such as a concrete or steel surface, comprising the steps of:

processing the image of the surface using a machine learning algorithm which includes a region-based convolutional neural network such as the Fast R-CNN or the Faster R-CNN;

and displaying on the image a region which locates the defect in the image and a classifier label identifying the defect.

The foregoing algorithms, particularly the Faster R-CNN due to its processing speed, are suited for use in real-time structural health monitoring applications in which a camera mounted on a vehicle, such as an unmanned aerial vehicle (e.g. a drone) or a motor vehicle, is carried across a surface and visual images thereof are captured. These images are then processed shortly thereafter, using the machine learning algorithm in the form of a deep learning algorithm to identify in the visual images defects in the surface. In one arrangement of the method of determining structural health of a structure or surface, in the event a defect is identified, an operator of the vehicle may stop it and use its location as a marker to indicate a location of the defect in the surface being scanned. This may allow the operator or a worker on site (for example, if the operator is at a remote location from the structure or surface being scanned) to readily locate the defect and perform a direct check of the surface to confirm the defect and apply a remedy if possible.

The Fast R-CNN is a region-based convolutional neural network for processing an image, comprising:

a convolutional neural network including:

a first convolutional layer;

a second convolutional layer;

a first max pooling layer after the second convolutional layer;

a third convolutional layer after the first max pooling layer;

a fourth convolutional layer;

a second max pooling layer after the fourth convolutional layer;

a fifth convolutional layer after the second max pooling layer;
a sixth convolutional layer;
a seventh convolutional layer;
a third max pooling layer after the fourth convolutional layer;
an eighth convolutional layer after the third max pooling layer;
a ninth convolutional layer;
a tenth convolutional layer;
a fourth max pooling layer after the tenth convolutional layer;
an eleventh convolutional layer after the fourth max pooling layer;
a twelfth convolutional layer;
a thirteenth convolutional layer;
wherein each convolutional layer is followed by a rectified linear unit activation function;
a region of interest pooling layer for receiving regions of interest of a feature map; a feature map which has been extracted from the image using the convolutional neural network and object proposals generated by a selective search, the regions of interest being delimited by the object proposals and for generating feature vectors;
a set of fully connected layers for receiving the feature vectors, with a dropout layer intermediate each pair of otherwise consecutive ones of the set of fully connected layers; and
parallel softmax and regressor layers after the set of fully connected layers for classifying and identifying objects in the image.

The Faster R-CNN is a region-based convolutional neural network for processing an image, comprising:
a convolutional neural network including:
a first convolutional layer;
a first local response normalization layer after the first convolutional layer;
a first max pooling layer after the first local response normalization layer;
a second convolutional layer after the first max pooling layer;
a second local response normalization layer after the second convolutional layer;
a second max pooling layer after the second local response normalization layer;
a third convolutional layer after the second max pooling layer;
a fourth convolutional layer;
a fifth convolutional layer;
wherein each convolutional layer is immediately followed by a rectified linear unit activation function;
a series of a sliding convolutional layer followed by a rectified linear unit activation function, a fully connected layer, and parallel softmax and regressor layers that forms with the convolutional neural network a region proposal network for generating object proposals;
a series of a region of interest pooling layer for regions of interest of a feature map which has been extracted from the image using the convolutional neural network and object proposals generated by the region proposal network, the regions of interest being delimited by the object proposals and for generating feature vectors, a set of fully connected layers with a dropout layer intermediate each otherwise consecutive pair thereof, wherein each one of the set of fully connected layers is immediately followed by a rectified linear unit activation function, and parallel softmax and regressor layers for locating and classifying objects in the image.

For the Fast R-CNN and the Faster R-CNN, there may be an input layer before the first convolutional layer for receiving the input image to be processed for defects.

Each of the CNN, the Fast R-CNN and the Faster R-CNN form a computer-implemented system and method of analyzing at least one image of a surface to detect a defect in the surface, executable on a computing device comprising:
at least one processor for controlling operation of the computing device;
a memory (or a non-transitory computer storage medium) storing data and program instructions used by the at least one processor, wherein the at least one processor are configured are configured to execute instructions stored in the memory to:
receive the image or video of the surface;
processing the image/video using the CNN, the Fast R-CNN or the Faster R-CNN;
and displaying the image/video with location of the defect being indicated if determined to be present by the region-based convolutional neural network.

The computing device and the camera may form a system for detecting defects in a surface or for performing structural health-monitoring.

The scope of the claims should not be limited by the preferred embodiments set forth in the examples but should be given the broadest interpretation consistent with the specification as a whole.

REFERENCES

Aaoshat (2008), Bridging the gap-restoring and rebuilding the nation's bridges, Washington (DC): American Association of State Highway and Transportation Officials.

Abdel-Qader, I., Abudayyeh, O. & Kelly, M. E. (2003), Analysis of edge-detection techniques for crack identification in bridges, Journal of Computing in Civil Engineering, 17(4), 255-63.

Adeli, H. and Jiang, X. (2009), Intelligent Infrastructure—Neural Networks, Wavelets, and Chaos Theory for Intelligent Transportation Systems and Smart Structures, CRC Press, Taylor & Francis, Boca Raton, Fla.

Ahmadlou, M. & Adeli, H. (2010), Enhanced probabilistic neural network with local decision circles: A robust classifier, Integrated Computer-Aided Engineering, 17(3), 197-210.

Alaknanda, Anand, R. S. & Kumar, P. (2009), Flaw detection in radiographic weldment images using morphological watershed segmentation technique, NDT & E International, 42(1), 2-8.

Bengio, Y. (2012), Practical Recommendations for Gradient-Based Training of Deep Architectures, In Neural Networks: Tricks of the Trade: Second Edition, Springer Berlin Heidelberg, 437-78.

Bengio, Y., Goodfellow, I. J. and Courville, A., Deep learning, An MIT Press book in preparation, online version is available at http://www.deeplearningbook.org.

Bottou, L. (2012), Stochastic gradient descent tricks, In Neural Networks: Tricks of the Trade: Second Edition, Springer Berlin Heidelberg, 421-36.

Butcher, J., Day, C., Austin, J., Haycock, P., Verstraeten, D. & Schrauwen, B. (2014), Defect detection in reinforced concrete using random neural architectures, Computer-Aided Civil and Infrastructure Engineering, 29(3), 191-207.

Cha, Y.-J., Choi, W. & Büyüköztürk, O. (2017), Deep Learning-Based Crack Damage Detection Using Convolutional Neural Networks, Computer-Aided Civil and Infrastructure Engineering, 32: 361-378.

Cha, Y.-J., Chen, J. G. & Buyukorturk, O. (2017), Output-only computer vision based damage detection using phase-based optical flow and unscented Kalman filters. Engineering Structures, 132, 300-313.

Cha, Y.-J. & Buyukorturk, O., (2015). Structural damage detection using modal strain energy and hybrid multiobjective optimization. Computer-Aided Civil and Infrastructure Engineering, 30(5), 347-358.

Cha, Y.-J., You, K. & Choi, W. (2016), Vision-based detection of loosened bolts using the Hough transform and support vector machines, Automation in Construction.

Chatzi, E. N., Hiriyur, B., Waisman, H. & Smyth, A. W. (2011), Experimental application and enhancement of the XFEM-GA algorithm for the detection of flaws in structures, Computers & Structures, 89(7), 556-70.

Chen, J. G., Wadhwa, N., Cha, Y.-J., Durand, F., Freeman, W. T. & Buyukorturk, O. (2015), Modal identification of simple structures with high-speed video using motion magnification, Journal of Sound and Vibration, 345, 58-71.

Chen, P.-H., Shen, H.-K., Lei, C.-Y. & Chang, L.-M. (2012), Support-vector-machine-based method for automated steel bridge rust assessment, Automation in Construction, 23: 9-19.

Cifia-10 and Cifar-100 Dataset. available at: https://www.cs.toronto.edu/-kriz/cifar.html, accessed Jul. 20, 2016.

Ciresan, D. C., Meier, U., Masci, J., Maria Gambardella, L. & Schmidhuber, J. (2011), Flexible, high performance convolutional neural networks for image classification in Proceedings of IJCAI Proceedings-International Joint Conference on Artificial Intelligence, 1237.

Cord, A., & Chambon, S. (2012), Automatic road defect detection by textural pattern recognition based on AdaBoost, Computer-Aided Civil and Infrastructure Engineering, 27(4), 244-259.

Cornwell, P., Farrar, C. R., Doebling, S. W. & Sohn, H. (1999), Environmental variability of modal properties, Experimental Techniques, 23(6), 45-8.

Deng, J., W. Dong, R. Socher, L.-J. Li, K. Li and L. Fei-Fei (2009). Imagenet: A large-scale hierarchical image database. Computer Vision and Pattern Recognition, 2009. CVPR 2009. IEEE Conference on, IEEE.

Everingham, M., Van Gool, L., Williams, C. K., Winn, J., & Zisserman, A. (2010), The pascal visual object classes (voc) challenge, International journal of computer vision, 88(2), 303-338.

Everingham, M., Zisserman, A., Williams, C. K., Van Gool, L., Allan, M., Bishop, C. M., Chapelle, O., Dalai, N., Deselaers, T. & Dorkó, G. (2007), The PASCAL visual object classes challenge 2007 (VOC2007) results, http://host.robots.ox.ac.uk/pascal/VOC/voc2007/(accessed 10 Jun. 2017).

Fan, Q., Brown, L. & Smith, J. (2016), A closer look at Faster R-CNN for vehicle detection, In: Proceedings of 2016 IEEE Intelligent Vehicles Symposium (IV), Gothenburg, Sweden, 19-22 Jun. 2016, 124-129.

Federal Highway Administration. available at: https://www.fhwa.dot.gov/bridge/, accessed Mar. 9, 2016.

Felzenszwalb, P. F. and D. P. Huttenlocher (2004). "Efficient graph-based image segmentation." International journal of computer vision 59(2): 167-181.

Frangi, A. F., Niessen, W. J., Hoogeveen, R. M., Van Walsum, T. & Viergever, M. A. (1999), Model-based quantitation of 3-D magnetic resonance angiographic images, IEEE Transactions on medical imaging, 18(10), 946-56.

German, S., Brilakis, I. & DesRoches, R. (2012), Rapid entropy-based detection and properties measurement of concrete spalling with machine vision for post-earthquake safety assessments, Advanced Engineering Informatics, 26(4): 846-858.

Girshick, R. (2015), Fast R-CNN, In: Proceedings of the IEEE International Conference on Computer Vision, Santiago, Chile, 07-13 Dec. 2015, 1440-1448.

Girshick, R., Donahue, J., Darrell, T. & Malik, J. (2014), Rich feature hierarchies for accurate object detection and semantic segmentation, In: Proceedings of the IEEE conference on computer vision and pattern recognition, Columbus, Ohio, 23-28 Jun. 2014, 580-587.

Graybeal, B. A., Phares, B. M., Rolander, D. D., Moore, M., & Washer, G. (2002), Visual inspection of highway bridges, Journal of nondestructive evaluation, 21(3), 67-83.

He, K., Zhang, X., Ren, S. & Sun, J. (2014), Spatial pyramid pooling in deep convolutional networks for visual recognition, In: Proceedings of the 13th European Conference on Computer Vision, Zurich, Switzerland, 6-12 Sep. 2014, 346-361.

He, K., Zhang, X., Ren, S. & Sun, J. (2016), Deep residual learning for image recognition, In: Proceedings of 2016 IEEE Conference on Computer Vision and Pattern Recognition (CVPR), Las Vegas, Nev., 12 Dec. 2016, 770-778.

Imagenet. available at: http://www.image-net.org/, accessed Jul. 20, 2016.

Ioffe, S. & Szegedy, C. (2015), Batch normalization: Accelerating deep network training by reducing internal covariate shift, arXiv preprint arXiv:1502.03167.

Jahanshahi, M. R., Masri, S. F., Padgett, C. W. & Sukhatme, G. S. (2013), An innovative methodology for detection and quantification of cracks through incorporation of depth perception, Machine vision and applications, 24(2), 227-41.

Jang, S., Jo, H., Cho, S., Mechitov, K., Rice, J. A., Sim, S.-H., Jung, H.-J., Yun, C.-B., Spencer Jr, B. F. & Agha, G. (2010), Structural health monitoring of a cable-stayed bridge using smart sensor technology: deployment and evaluation, Smart Structures and Systems, 6(5-6), 439-59.

Jiang, X. & Adeli, H. (2007), Pseudospectra, MUSIC, and dynamic wavelet neural network for damage detection of highrise buildings, International Journal for Numerical Methods in Engineering, 71(5), 606-29.

Koch, C. & Brilakis, I. (2011), Pothole detection in asphalt pavement images, Advanced Engineering Informatics, 25(3): 507-515.

Krizhevsky, A., Sutskever, I. & Hinton, G. E. (2012), Imagenet classification with deep convolutional neural networks, Advances in neural information processing systems, 1097-105.

Kurata, M., Kim, J., Lynch, J., Van Der Linden, G., Sedarat, H., Thometz, E., Hipley, P. & Sheng, L.-H. (2012), Internet-enabled wireless structural monitoring systems: development and permanent deployment at the New Carquinez Suspension Bridge, Journal of structural engineering, 139(10), 1688-702.

Lecun, Y., Bengio, Y. & Hinton, G. (2015), Deep learning, Nature, 521(7553), 436-44.

Lecun, Y., Bottou, L., Bengio, Y. & Haffner, P. (1998), Gradient-based learning applied to document recognition in Proceedings of Proceedings of the IEEE, 2278-324.

Lecun, Y. A., Bottou, L., Orr, G. B. & Müller, K.-R. (2012), Efficient backprop, In Neural networks: Tricks of the trade: Springer, 9-48.

Li, C., Kang, Q., Ge, G., Song, Q., Lu, H. & Cheng, J. (2016), Deep: Learning deep binary encoding for multi-label classification, In: Proceedings of 2016 IEEE Conference on Computer Vision and Pattern Recognition Workshops (CVPRW), Las Vegas, Nev., 26 Jun.-1 Jul. 2016, 744-751.

Liao, K.-W. & Lee, Y.-T. (2016), Detection of rust defects on steel bridge coatings via digital image recognition, Automation in Construction, 71(2): 294-306.

Liu, S. W., Huang, J. H., Sung, J. C. & Lee, C. C. (2002), Detection of cracks using neural networks and computational mechanics, Computer Methods in Applied Mechanics and Engineering, 191(25-26), 2831-45.

Mirzaei, G., Adeli, A., & Adeli, H. (2016), Imaging and Machine Learning Techniques for Diagnosis of Alzheimer Disease, Reviews in the Neurosciences, 27(8), 857-870.

Mnist Database. available at: http://yann.lecun.com/exdb/mnist/, accessed Jul. 20, 2016.

Moon, H. & Kim, J. (2011), Intelligent crack detecting algorithm on the concrete crack image using neural network, Proceedings of the 28th ISARC, 1461-7.

Nair, V. & Hinton, G. E. (2010), Rectified linear units improve restricted Boltzmann machines in Proceedings of The 27th International Conference on Machine Learning (ICML-10), Haifa, Israel, June 21-24, 807-14.

Nishikawa, T., Yoshida, J., Sugiyama, T. & Fujino, Y. (2012), Concrete crack detection by multiple sequential image filtering, Computer-Aided Civil and Infrastructure Engineering, 27(1), 29-47.

O'byrne, M., Ghosh, B., Schoefs, F. & Pakrashi, V. (2014), Regionally enhanced multiphase segmentation technique for damaged surfaces, Computer-Aided Civil and Infrastructure Engineering, 29(9), 644-58.

O'byrne, M., Schoefs, F., Ghosh, B. & Pakrashi, V. (2013), Texture analysis based damage detection of ageing infrastructural elements, Computer-Aided Civil and Infrastructure Engineering, 28(3), 162-77.

Park, J., Kim, T. & Kim, J. (2015), Image-based Bolt-loosening Detection Technique of Bolt Joint in Steel Bridges, In: 6th International Conference on Advances in Experimental Structural Engineering (6AESE), Urbana-Champaign, Ill., 1-2 Aug. 2015.

Rabinovich, D., Givoli, D. & Vigdergauz, S. (2007), XFEM-based crack detection scheme using a genetic algorithm, International Journal for Numerical Methods in Engineering, 71(9), 1051-80.

Rafiei, M. H., Khushefati, W. H., Demirboga, R., & Adeli, H. (2017), Supervised Deep Restricted Boltzmann Machine for Estimation of Concrete Compressive Strength, ACI Materials Journal, 114(2), 237-244.

Ren, S., He, K., Girshick, R. & Sun, J. (2016), Faster R-CNN: Towards Real-Time Object Detection with Region Proposal Networks, IEEE transactions on pattern analysis and machine intelligence, 39(6):1137-1149.

Ruder, S. (2016). "An overview of gradient descent optimization algorithms." arXiv preprint arXiv:1609.04747.

Rudin, L. I., Osher, S. & Fatemi, E. (1992), Nonlinear total variation based noise removal algorithms, Physica D: Nonlinear Phenomena, 60(1-4), 259-68.

Russakovsky, O., Deng, J., Su, H., Krause, J., Satheesh, S., Ma, S., Huang, Z., Karpathy, A., Khosla, A., Bernstein, M., Berg, A. C. & Fei-Fei, L. (2015), ImageNet Large Scale Visual Recognition Challenge, International Journal of Computer Vision, 115(3): 211-252.

Ryan, T., Mann, J., Chill, Z. & Ott, B. (2012), Bridge Inspector's Reference Manual (BIRM), Report, Federal Highway Administration (FHWA), Report No. FHWA NHI 12-049, 2012.

Scherer, D., Müller, A. & Behnke, S. (2010), Evaluation of pooling operations in convolutional architectures for object recognition, In Artificial Neural Networks-ICANN 2010: Springer, 92-101.

Sermanet, P., Eigen, D., Zhang, X., Mathieu, M., Fergus, R., & Lecun, Y. (2014), Overfeat: Integrated recognition, localization and detection using convolutional networks, In: International Conference on Learning Representations (ICLR2014), Banff, Canada, 14-16 Apr. 2014.

Siddique, N. H. & Adeli, H. (2016), Brief History of Natural Sciences for Nature-Inspired Computing in Engineering, Journal of Civil Engineering and Management, 22(3), 287-301.

Simard, P. Y., Steinkraus, D. & Platt, J. C. (2003), Best practices for convolutional neural networks applied to visual document analysis in Proceedings of of the Seventh International Conference on Document Analysis and Recognition, August 3-6, 958-62.

Simonyan, K. & Zisserman, A. (2014), Very deep convolutional networks for large-scale image recognition, In: International Conference on Learning Representations (ICLR), San Diego, Calif., 7-9 May 2015.

Sinha, K., Fieguth, P. W. & Polak, M. A. (2003), Computer Vision Techniques for Automatic Structural Assessment of Underground Pipes, Computer-Aided Civil and Infrastructure Engineering, 18(2): 95-112.

Sinha, S. K. & Fieguth, P. W. (2006), Automated detection of cracks in buried concrete pipe images, Automation in Construction, 15(1), 58-72.

Son, H., N. Hwang, C. Kim and C. Kim (2014). "Rapid and automated determination of rusted surface areas of a steel bridge for robotic maintenance systems." Automation in Construction 42: 13-24.

Song, M. & Civco, D. (2004), Road extraction using SVM and image segmentation, Photogrammetric Engineering & Remote Sensing, 70(12), 1365-71.

Soukup, D. & Huber-Mirk, R. (2014), Convolutional Neural Networks for Steel Surface Defect Detection from Photometric Stereo Images in Proceedings of International Symposium on Visual Computing, 668-77.

Srivastava, N., Hinton, G., Krizhevsky, A., Sutskever, I. & Salakhutdinov, R. (2014), Dropout: a simple way to prevent neural networks from overfitting, Journal of Machine Learning Research, 15(1), 1929-58.

Steinkrau, D., Simard, P. Y. & Buck, I. (2005), Using GPUs for machine learning algorithms in Proceedings of 8th International Conference on Document Analysis and Recognition, Seoul, Korea, August 29-Sep. 1, 1115-9.

Szegedy, C., Liu, W., Jia, Y., Sermanet, P., Reed, S., Anguelov, D., Erhan, D., Vanhoucke, V. & Rabinovich, A. (2015), Going deeper with convolutions, In: Proceedings of 2015 IEEE Conference on Computer Vision and Pattern Recognition (CVPR), Boston, Mass., 7-12 Jun. 2015, 1-9.

Teidj, S., Khamlichi, A. & Driouach, A. (2016), Identification of Beam Cracks by Solution of an Inverse Problem, Procedia Technology, 22, 86-93.

Uijlings, J. R., Van De Sande, K. E., Gevers, T. and Smeulders, A. W. (2013), Selective search for object recognition, International journal of computer vision, 104(2): 154-171.

Vedaldi, A. & Lenc, K. (2015), Matconvnet: Convolutional neural networks for matlab in Proceedings of Proceedings of the 23rd ACM international conference on Multimedia, Brisbane, Australia, October 26-30, 689-92.

Wilson, D. R. & Martinez, T. R. (2001), The need for small learning rates on large problems in Proceedings of Proceedings of International Joint Conference on Neural Networks, Washington, D.C., USA, July 15-19, 115-9.

Wu, L., Mokhtari, S., Nazef, A., Nam, B. & Yun, H.-B. (2014), Improvement of Crack-Detection Accuracy Using a Novel Crack Defragmentation Technique in Image-Based Road Assessment, Journal of Computing in Civil Engineering, 30(1), 04014118.

Xia, Y., Chen, B., Weng, S., Ni, Y.-Q. & Xu, Y.-L. (2012), Temperature effect on vibration properties of civil structures: a literature review and case studies, Journal of Civil Structural Health Monitoring, 2(1), 29-46.

Yamaguchi, T., Nakamura, S., Saegusa, R. & Hashimoto, S. (2008), Image-Based Crack Detection for Real Concrete Surfaces, IEEJ Transactions on Electrical and Electronic Engineering, 3(1), 128-35.

Yamaguchi, T. and S. Hashimoto (2010). "Fast crack detection method for large-size concrete surface images using percolation-based image processing." Machine Vision and Applications 21(5): 797-809.

Yeum, C. M. & Dyke, S. J. (2015), Vision-Based Automated Crack Detection for Bridge Inspection, Computer-Aided Civil and Infrastructure Engineering, 30(10), 759-70.

Ying, L., & Salari, E. (2010), Beamlet Transform-Based Technique for Pavement Crack Detection and Classification, Computer-Aided Civil and Infrastructure Engineering, 25(8), 572-580.

Zalama, E., Gomez-Garcia-Bermejo, J., Medina, R., & Llamas, J. (2014), Road crack detection using visual features extracted by Gabor filters, Computer-Aided Civil and Infrastructure Engineering, 29(5), 342-358.

Zhu, Z., S. German and I. Brilakis (2011). "Visual retrieval of concrete crack properties for automated post-earthquake structural safety evaluation." Automation in Construction 20(7): 874-883.

Ziou, D. & Tabbone, S. (1998), Edge detection techniques—an overview, Pattern Recognition and Image Analysis C/C of Raspoznavaniye Obrazov I Analiz Izobrazhenii, 8, 537-59.

TABLE 1

Dimensions of layers and operations

| Layer | Height | Width | Depth | Operator | Height | Width | Depth | No. | Stride |
|---|---|---|---|---|---|---|---|---|---|
| Input | 256 | 256 | 3 | C1 | 20 | 20 | 3 | 24 | 2 |
| L1 | 119 | 119 | 24 | P1 | 7 | 7 | — | — | 2 |
| L2 | 57 | 57 | 24 | C2 | 15 | 15 | 24 | 48 | 2 |
| L3 | 22 | 22 | 48 | P2 | 4 | 4 | — | — | 2 |
| L4 | 10 | 10 | 48 | C3 | 10 | 10 | 48 | 96 | 2 |
| L5 | 1 | 1 | 96 | ReLU | — | — | — | — | — |
| L6 | 1 | 1 | 96 | C4 | 1 | 1 | 96 | 2 | 1 |
| L7 | 1 | 1 | 2 | Softmax | — | — | — | — | — |
| L8 | 1 | 1 | 2 | — | — | — | — | — | — |

TABLE 2

Summarized results of scanned images

| No. | # of Pos.$^{(i)}$ | # of Neg.$^{(ii)}$ | # of TP$^{(iii)}$ | # of TN$^{(iv)}$ | # of FP$^{(v)}$ | # of FN$^{(vi)}$ | Accuracy | Precision | Recall | F1 | Remark |
|---|---|---|---|---|---|---|---|---|---|---|---|
| 1 | 126 | 482 | 103 | 473 | 9 | 23 | 0.95 | 0.92 | 0.82 | 0.87 | FIG. 14(a) |
| 2 | 162 | 446 | 143 | 438 | 8 | 19 | 0.96 | 0.95 | 0.88 | 0.91 | FIG. 14(b) |
| 3 | 55 | 553 | 54 | 538 | 15 | 1 | 0.97 | 0.78 | 0.98 | 0.87 | FIG. 14(c) |
| 4 | 37 | 571 | 35 | 566 | 5 | 2 | 0.99 | 0.88 | 0.95 | 0.91 | FIG. 14(d) |
| 5 | 58 | 550 | 41 | 550 | 0 | 17 | 0.97 | 1.00 | 0.71 | 0.83 | FIG. 14(e) |
| 6 | 45 | 269 | 42 | 266 | 3 | 3 | 0.98 | 0.93 | 0.93 | 0.93 | — |
| 7 | 23 | 291 | 23 | 289 | 2 | 0 | 0.99 | 0.92 | 1.00 | 0.96 | — |
| 8 | 35 | 279 | 35 | 275 | 4 | 0 | 0.99 | 0.90 | 1.00 | 0.95 | — |
| 9 | 31 | 283 | 25 | 283 | 0 | 6 | 0.98 | 1.00 | 0.81 | 0.89 | — |
| 10 | 31 | 283 | 29 | 281 | 2 | 2 | 0.99 | 0.94 | 0.94 | 0.94 | — |
| 11 | 32 | 282 | 32 | 279 | 3 | 0 | 0.99 | 0.91 | 1.00 | 0.96 | — |
| 12 | 30 | 284 | 30 | 277 | 7 | 0 | 0.98 | 0.81 | 1.00 | 0.90 | — |
| 13 | 30 | 284 | 30 | 283 | 1 | 0 | 1.00 | 0.97 | 1.00 | 0.98 | — |
| 14 | 31 | 283 | 31 | 281 | 2 | 0 | 0.99 | 0.94 | 1.00 | 0.97 | — |
| 15 | 31 | 283 | 30 | 253 | 30 | 1 | 0.90 | 0.50 | 0.97 | 0.66 | — |
| 16 | 38 | 276 | 32 | 271 | 5 | 6 | 0.96 | 0.86 | 0.84 | 0.85 | — |
| 17 | 28 | 286 | 28 | 285 | 1 | 0 | 1.00 | 0.97 | 1.00 | 0.98 | — |
| 18 | 34 | 392 | 34 | 389 | 3 | 0 | 0.99 | 0.92 | 1.00 | 0.96 | — |
| 19 | 30 | 396 | 30 | 391 | 5 | 0 | 0.99 | 0.86 | 1.00 | 0.92 | — |
| 20 | 23 | 403 | 23 | 400 | 3 | 0 | 0.99 | 0.88 | 1.00 | 0.94 | — |
| 21 | 36 | 390 | 34 | 376 | 14 | 2 | 0.96 | 0.71 | 0.94 | 0.81 | — |
| 22 | 39 | 387 | 38 | 366 | 21 | 1 | 0.95 | 0.64 | 0.97 | 0.78 | — |
| 23 | 27 | 399 | 26 | 396 | 3 | 1 | 0.99 | 0.90 | 0.96 | 0.93 | — |
| 24 | 27 | 399 | 25 | 391 | 8 | 2 | 0.98 | 0.76 | 0.93 | 0.83 | — |
| 25 | 22 | 404 | 22 | 386 | 18 | 0 | 0.96 | 0.55 | 1.00 | 0.71 | — |

TABLE 2-continued

Summarized results of scanned images

| No. | # of Pos.$^{(i)}$ | # of Neg.$^{(ii)}$ | # of TP$^{(iii)}$ | # of TN$^{(iv)}$ | # of FP$^{(v)}$ | # of FN$^{(vi)}$ | Accuracy | Precision | Recall | F1 | Remark |
|---|---|---|---|---|---|---|---|---|---|---|---|
| 26 | 34 | 392 | 34 | 373 | 19 | 0 | 0.96 | 0.64 | 1.00 | 0.78 | — |
| 27 | 33 | 393 | 30 | 377 | 16 | 3 | 0.96 | 0.65 | 0.91 | 0.76 | — |
| 28 | 31 | 395 | 31 | 381 | 14 | 0 | 0.97 | 0.69 | 1.00 | 0.82 | — |
| 29 | 33 | 393 | 33 | 379 | 14 | 0 | 0.97 | 0.70 | 1.00 | 0.83 | — |
| 30 | 30 | 396 | 30 | 395 | 1 | 0 | 1.00 | 0.97 | 1.00 | 0.98 | — |
| 31 | 46 | 380 | 45 | 379 | 1 | 2 | 1.00 | 0.98 | 0.96 | 0.97 | — |
| 32 | 31 | 316 | 31 | 295 | 21 | 0 | 0.94 | 0.60 | 1.00 | 0.75 | — |
| 33 | 49 | 298 | 43 | 298 | 0 | 6 | 0.98 | 1.00 | 0.88 | 0.93 | — |
| 34 | 53 | 294 | 49 | 292 | 2 | 4 | 0.98 | 0.96 | 0.92 | 0.94 | — |
| 35 | 30 | 317 | 27 | 314 | 3 | 3 | 0.98 | 0.90 | 0.90 | 0.90 | — |
| 36 | 26 | 321 | 24 | 310 | 11 | 2 | 0.96 | 0.69 | 0.92 | 0.79 | — |
| 37 | 43 | 304 | 36 | 301 | 3 | 7 | 0.97 | 0.92 | 0.84 | 0.88 | — |
| 38 | 56 | 291 | 55 | 277 | 14 | 1 | 0.96 | 0.80 | 0.98 | 0.88 | — |
| 39 | 48 | 299 | 44 | 290 | 9 | 4 | 0.96 | 0.83 | 0.92 | 0.87 | — |
| 40 | 43 | 304 | 42 | 280 | 24 | 1 | 0.93 | 0.64 | 0.98 | 0.77 | — |
| 41 | 52 | 295 | 52 | 281 | 14 | 0 | 0.96 | 0.79 | 1.00 | 0.88 | — |
| 42 | 57 | 290 | 57 | 266 | 24 | 0 | 0.93 | 0.70 | 1.00 | 0.83 | — |
| 43 | 50 | 297 | 50 | 253 | 44 | 0 | 0.87 | 0.53 | 1.00 | 0.69 | — |
| 44 | 41 | 306 | 41 | 288 | 18 | 0 | 0.95 | 0.69 | 1.00 | 0.82 | — |
| 45 | 69 | 278 | 68 | 262 | 16 | 1 | 0.95 | 0.81 | 0.99 | 0.89 | — |
| 46 | 57 | 290 | 57 | 262 | 28 | 0 | 0.92 | 0.67 | 1.00 | 0.80 | — |
| 47 | 73 | 274 | 63 | 269 | 5 | 10 | 0.96 | 0.93 | 0.86 | 0.89 | — |
| 48 | 24 | 323 | 24 | 322 | 1 | 0 | 1.00 | 0.96 | 1.00 | 0.98 | — |
| 49 | 21 | 326 | 19 | 324 | 2 | 2 | 0.99 | 0.90 | 0.90 | 0.90 | — |
| 50 | 28 | 319 | 26 | 319 | 0 | 2 | 0.99 | 1.00 | 0.93 | 0.96 | — |
| 51 | 55 | 292 | 52 | 284 | 8 | 3 | 0.97 | 0.87 | 0.95 | 0.90 | — |
| 52 | 27 | 320 | 23 | 307 | 13 | 4 | 0.95 | 0.64 | 0.85 | 0.73 | — |
| 53 | 33 | 314 | 33 | 310 | 4 | 0 | 0.99 | 0.89 | 1.00 | 0.94 | — |
| 54 | 31 | 316 | 31 | 295 | 21 | 0 | 0.94 | 0.60 | 1.00 | 0.75 | — |
| 55 | 61 | 286 | 61 | 244 | 42 | 0 | 0.88 | 0.59 | 1.00 | 0.74 | — |
| Σ | 2326 | 18774 | 2186 | 18210 | 564 | 141 | 0.97 | 0.79 | 0.94 | 0.86 | — |

Pos.: crack; Neg.: intact; TP: True-positive; TN: True-negative; FN: False-negative; Accuracy: {(iii) + (iv)}/{(i) + (ii)};
Precision: (iii)/{(iii) + (v)};
Recall: (iii)/{(iii) + (vi)};
F1: 2× (precision × recall)/(precision + recall)

TABLE 3

The detailed specifications of layers of the modified VGG-16 architecture

| Layer | Type | Depth | Filter Size | Stride |
|---|---|---|---|---|
| 1 | CONV + ReLU | 64 | 3 × 3 | 1 |
| 2 | CONV + ReLU | 64 | 3 × 3 | 1 |
| 3 | Max pooling | 64 | 2 × 2 | 2 |
| 4 | CONV + ReLU | 128 | 3 × 3 | 1 |
| 5 | CONV + ReLU | 128 | 3 × 3 | 1 |
| 6 | Max pooling | 128 | 2 × 2 | 2 |
| 7 | CONV + ReLU | 256 | 3 × 3 | 2 |
| 8 | CONV + ReLU | 256 | 3 × 3 | 2 |
| 9 | CONV + ReLU | 256 | 3 × 3 | 2 |
| 10 | Max pooling | 128 | 2 × 2 | 1 |
| 11 | CONV + ReLU | 512 | 3 × 3 | 2 |
| 12 | CONV + ReLU | 512 | 3 × 3 | 1 |
| 13 | CONV + ReLU | 512 | 3 × 3 | 1 |
| 14 | Max Pooling | 512 | 2 × 2 | 2 |
| 15 | CONV + ReLU | 512 | 3 × 3 | 1 |
| 16 | CONV + ReLU | 512 | 3 × 3 | 1 |
| 17 | CONV + ReLU | 512 | 3 × 3 | 1 |
| 18 | RoI pooling | 512 | — | — |
| 19 | FC + ReLU | 4096 | — | — |
| 20 | Dropout | — | — | — |
| 21 | FC + ReLU | 4096 | — | — |
| 22 | Dropout | — | — | — |
| 23 | FC + ReLU | 6 | — | — |
| 24 | Softmax & Regressor | | | |

TABLE 4

The proportion of training and validation sets

| | Training | | Validation | |
|---|---|---|---|---|
| Damage Class | Objects | # of images | Objects | # of images |
| Medium steel corrosion | 363 | 342 | 229 | 211 |
| Steel delamination | 300 | 273 | 145 | 139 |
| High steel corrosion | 319 | 300 | 172 | 156 |
| Concrete cracks | 309 | 297 | 215 | 203 |
| Bolt corrosion | 301 | 273 | 135 | 124 |

TABLE 5

Detailed parameters of each experimental case

| Case | k | σ | # of Proposals | Generating Time (s) | Scaling |
|---|---|---|---|---|---|
| 1 | 50 | 0.2 | 2,689 | 0.71 | 375 |
| 2 | 50 | 0.2 | 2,689 | 0.71 | 750 |
| 3 | 50 | 0.4 | 1,931 | 0.57 | 375 |
| 4 | 50 | 0.4 | 1,931 | 0.57 | 750 |
| 5 | 75 | 0.2 | 1,661 | 0.48 | 375 |
| 6 | 75 | 0.2 | 1,661 | 0.48 | 750 |
| 7 | 75 | 0.4 | 1,126 | 0.41 | 375 |
| 8 | 75 | 0.4 | 1,126 | 0.41 | 750 |
| 9 | 100 | 0.2 | 1,195 | 0.36 | 375 |
| 10 | 100 | 0.2 | 1,195 | 0.36 | 750 |
| 11 | 100 | 0.4 | 770 | 0.33 | 375 |
| 12 | 100 | 0.4 | 770 | 0.33 | 750 |

TABLE 5-continued

Detailed parameters of each experimental case

| Case | k | σ | # of Proposals | Generating Time (s) | Scaling |
|---|---|---|---|---|---|
| 13 | 125 | 0.2 | 941 | 0.33 | 375 |
| 14 | 125 | 0.2 | 941 | 0.33 | 750 |
| 15 | 125 | 0.4 | 583 | 0.30 | 375 |
| 16 | 125 | 0.4 | 583 | 0.30 | 750 |
| 17 | 150 | 0.2 | 771 | 0.32 | 375 |
| 18 | 150 | 0.2 | 771 | 0.32 | 750 |
| 19 | 150 | 0.4 | 458 | 0.27 | 375 |
| 20 | 150 | 0.4 | 458 | 0.27 | 750 |

TABLE 6

The performance of the fast R-CNN network for the validation set

| Case | Test Time (s) | mAP (%) | Average Precision (%) | | | | |
|---|---|---|---|---|---|---|---|
| | | | Concrete Cracks | Medium Steel Corrosion | High Steel Corrosion | Bolt Corrosion | Steel Delamination |
| 1 | 0.25 | 81.0 | 80.8 | 84.0 | 76.4 | 88.9 | 74.9 |
| 2 | 0.33 | 79.9 | 78.4 | 82.0 | 76.8 | 89.3 | 72.9 |
| 3 | 0.17 | 80.6 | 79.5 | 80.9 | 76.3 | 89.5 | 77.2 |
| 4 | 0.20 | 80.3 | 79.9 | 81.1 | 76.7 | 89.1 | 74.8 |
| 5 | 0.20 | 81.2 | 82.5 | 80.5 | 76.5 | 89.9 | 76.8 |
| 6 | 0.25 | 80.3 | 80.2 | 78.5 | 78.4 | 88.9 | 75.6 |
| 7 | 0.13 | 78.5 | 78.7 | 75.6 | 76.7 | 89.1 | 72.2 |
| 8 | 0.20 | 79.2 | 79.3 | 77.2 | 76.8 | 88.4 | 74.2 |
| 9 | 0.14 | 81.5 | 81.1 | 84.0 | 77.4 | 89.4 | 75.5 |
| 10 | 0.20 | 79.9 | 80.0 | 81.0 | 73.8 | 88.5 | 76.1 |
| 11 | 0.11 | 80.6 | 79.5 | 82.6 | 74.6 | 89.5 | 76.9 |
| 12 | 0.17 | 80.9 | 77.8 | 81.7 | 79.5 | 90.3 | 75.1 |
| 13 | 0.13 | 82.3 | 81.7 | 82.9 | 79.7 | 89.6 | 77.4 |
| 14 | 0.20 | 80.6 | 79.3 | 79.8 | 78.5 | 89.4 | 76.0 |
| 15 | 0.09 | 80.2 | 77.1 | 81.8 | 73.2 | 90.8 | 78.0 |
| 16 | 0.14 | 79.1 | 76.2 | 78.1 | 75.5 | 88.4 | 77.5 |
| 17 | 0.11 | 81.9 | 79.8 | 83.1 | 80.9 | 89.6 | 76.0 |
| 18 | 0.17 | 80.0 | 78.6 | 80.6 | 75.7 | 89.5 | 75.6 |
| 19 | 0.08 | 79.2 | 78.0 | 80.4 | 71.8 | 89.9 | 76.0 |
| 20 | 0.14 | 78.4 | 77.7 | 78.9 | 71.8 | 89.2 | 74.7 |
| Average | 0.17 | 80.3 | 79.3 | 80.7 | 76.4 | 89.4 | 75.7 |

TABLE 7

The detailed specifications of RPN's layers of the third embodiment

| Layer | Type | Depth | Filter Size | Stride |
|---|---|---|---|---|
| 1 | CONV + ReLU | 96 | 7 × 7 | 2 |
| 2 | LRN | — | — | — |
| 3 | Max pooling | 96 | 3 × 3 | 2 |
| 4 | CONV + ReLU | 256 | 5 × 5 | 2 |
| 5 | LRN | — | — | — |
| 6 | Max pooling | 256 | 3 × 3 | 2 |
| 7 | CONV + ReLU | 384 | 3 × 3 | 1 |
| 8 | CONV + ReLU | 384 | 3 × 3 | 1 |
| 9 | CONV + ReLU | 256 | 3 × 3 | 1 |
| 10 | Sliding CONV + ReLU | 256 | 3 × 3 | 1 |
| 11 | FC | 256 | — | — |
| 12 | Softmax & Regressor | — | — | — |

TABLE 8

The detailed specifications of Fast R-CNN layers of the third embodiment

| Layer | Type | Depth | Filter Size | Stride |
|---|---|---|---|---|
| 1 | CONV + Real | 96 | 7 × 7 | 2 |
| 2 | LRN | — | — | — |
| 3 | Max pooling | 96 | 3 × 3 | 2 |
| 4 | CONV + ReLU | 256 | 5 × 5 | 2 |
| 5 | LRN | — | — | — |
| 6 | Max pooling | 256 | 3 × 3 | 2 |
| 7 | CONV + ReLU | 384 | 3 × 3 | 1 |
| 8 | CONV + ReLU | 384 | 3 × 3 | 1 |
| 9 | CONV + ReLU | 256 | 3 × 3 | 1 |
| 10 | RoI pooling | 256 | — | — |
| 11 | FC + ReLU | 4096 | — | — |
| 12 | Dropout | — | — | — |
| 13 | FC + ReLU | 4096 | — | — |
| 14 | Dropout | — | — | — |
| 15 | FC + ReLU | 6 | — | — |
| 16 | Softmax & Regressor | — | — | — |

TABLE 9

The proportion of training, validation and testing sets

| Damage Class | Training and Validation | | Testing | |
|---|---|---|---|---|
| | Objects | # of images | Objects | # of images |
| Medium steel corrosion | 726 | 684 | 229 | 211 |
| Steel delamination | 600 | 546 | 145 | 139 |
| High steel corrosion | 638 | 600 | 172 | 156 |
| Concrete cracks | 618 | 594 | 215 | 203 |
| Bolt corrosion | 602 | 546 | 135 | 124 |

TABLE 10

The performance of the Faster R-CNN for the testing set

| Case | mAP (%) | Average Precision (%) | | | | |
|---|---|---|---|---|---|---|
| | | Concrete Cracks | Medium Steel Corrosion | High Steel Corrosion | Bolt Corrosion | Steel Delamination |
| 1 | 84.6 | 89.5 | 84.5 | 81.2 | 90.1 | 77.8 |
| 2 | 86.7 | 89.7 | 84.6 | 83.5 | 90.5 | 85.0 |
| 3 | 86.2 | 89,7 | 84.1 | 81.6 | 90.1 | 85.2 |
| 4 | 86.1 | 89.7 | 84.5 | 78.8 | 90.5 | 86.9 |
| 5 | 85.4 | 90.0 | 84.5 | 78.5 | 90.6 | 83.5 |
| 6 | 84.5 | 89.9 | 83.8 | 80.8 | 90.3 | 77.7 |
| 7 | 85.0 | 90.3 | 85.6 | 79.9 | 90.4 | 78.5 |
| 8 | 85.3 | 89.6 | 85.3 | 78.5 | 90.0 | 83.0 |
| 9 | 85.0 | 89.7 | 83.0 | 82.0 | 90.3 | 80.0 |
| 10 | 84.7 | 90.0 | 83.6 | 80.0 | 90.0 | 80.1 |
| 11 | 85.4 | 89.0 | 85.6 | 78.5 | 90.2 | 83.9 |
| 12 | 84.9 | 89.9 | 84.1 | 80.6 | 90.5 | 79.5 |
| 13 | 84.2 | 90.2 | 84.2 | 80.6 | 90.0 | 76.3 |
| 14 | 86.5 | 89.5 | 86.0 | 80.6 | 90.5 | 86.1 |
| 15 | 84.8 | 89.6 | 83.8 | 83.1 | 90.2 | 77.2 |
| 16 | 84.5 | 89.8 | 83.9 | 79.7 | 90.1 | 78.8 |
| 17 | 84.8 | 89.8 | 84.0 | 83.1 | 90.3 | 77.0 |
| 18 | 85.8 | 89.9 | 83.7 | 81.1 | 89.6 | 85.0 |
| 19 | 85.6 | 90.2 | 84.6 | 80.7 | 89.9 | 82.6 |
| 20 | 85.5 | 90.1 | 84.8 | 80.7 | 91.1 | 82.0 |
| 21 | 85.2 | 89.9 | 84.2 | 84.1 | 89.9 | 77.8 |
| 22 | 85.0 | 89.4 | 83.7 | 79.5 | 90.1 | 82.4 |
| 23 | 85.4 | 89.4 | 84.7 | 80.0 | 90.2 | 82.7 |
| 24 | 85.7 | 89.4 | 83.9 | 82.1 | 89.9 | 83.4 |
| 25 | 85.7 | 89.2 | 84.6 | 80.8 | 90.1 | 83.8 |
| 26 | 84.1 | 90.3 | 83.4 | 80.2 | 89.8 | 76.8 |
| 27 | 85.0 | 90.1 | 84.7 | 80.9 | 90.6 | 78.5 |

TABLE 10-continued

The performance of the Faster R-CNN for the testing set

| Case | mAP (%) | Average Precision (%) | | | | |
|---|---|---|---|---|---|---|
| | | Concrete Cracks | Medium Steel Corrosion | High Steel Corrosion | Bolt Corrosion | Steel Delamination |
| 28 | 84.1 | 89.8 | 83.3 | 78.3 | 91.4 | 77.7 |
| 29 | 84.8 | 90.0 | 84.3 | 81.1 | 90.6 | 78.1 |
| 30 | 85.3 | 89.6 | 84.5 | 80.0 | 89.8 | 82.4 |
| 31 | 85.7 | 89.6 | 84.2 | 80.4 | 90.4 | 83.8 |
| 32 | 85.1 | 90.0 | 83.2 | 80.0 | 90.3 | 81.9 |
| 33 | 84.9 | 90.1 | 85.1 | 81.2 | 90.4 | 77.5 |
| 34 | 84.9 | 89.7 | 83.0 | 81.3 | 90.4 | 80.1 |
| 35 | 84.9 | 89.8 | 85.2 | 80.9 | 90.3 | 78.3 |
| 36 | 85.5 | 89.4 | 83.1 | 82.1 | 90.4 | 82.6 |
| 37 | 84.2 | 89.9 | 84.2 | 79.2 | 90.4 | 77.3 |
| 38 | 86.5 | 89.4 | 85.7 | 81.4 | 90.5 | 85.6 |
| 39 | 85.3 | 89.1 | 85.7 | 79.3 | 90.0 | 82.6 |
| 40 | 85.2 | 89.6 | 83.6 | 80.9 | 90.1 | 81.7 |
| 41 | 84.6 | 90.0 | 83.5 | 82.3 | 90.4 | 76.8 |
| 42 | 85.3 | 89.4 | 83.0 | 79.9 | 90.3 | 83.8 |
| 43 | 84.7 | 90.3 | 85.0 | 79.8 | 90.5 | 77.8 |
| 44 | 85.1 | 89.7 | 84.2 | 82.0 | 90.8 | 79.0 |
| 45 | 84.5 | 90.2 | 84.5 | 78.1 | 90.7 | 79.0 |
| 46 | 84.9 | 89.0 | 83.4 | 78.1 | 90.4 | 83.4 |
| 47 | 85.4 | 89.8 | 84.0 | 79.7 | 90.5 | 83.1 |
| 48 | 85.6 | 89.5 | 84.5 | 80.4 | 90.1 | 83.3 |
| 49 | 84.6 | 89.6 | 84.7 | 80.7 | 90.5 | 77.6 |
| 50 | 85.8 | 90.0 | 85.5 | 81.6 | 90.2 | 81.5 |
| 51 | 86.5 | 89.7 | 84.2 | 83.5 | 90.3 | 84.9 |
| 52 | 84.8 | 89.2 | 82.9 | 83.3 | 90.4 | 78.2 |
| 53 | 85.3 | 89.2 | 85.2 | 82.8 | 90.5 | 79.1 |
| 54 | 85.3 | 89.8 | 84.5 | 81.0 | 90.2 | 81.0 |
| Average | 85.2 | 89.7 | 84.3 | 80.7 | 90.3 | 80.9 |

The invention claimed is:

1. A computer-implemented method of analyzing an image of a surface to detect a defect in the surface, comprising:
receiving the image of the surface;
processing the image using a machine learning algorithm configured to detect the defect, the machine learning algorithm comprising a convolutional neural network including:
at least one convolution layer; and
at least one max pooling layer;
and displaying the image with location of the defect being indicated if determined to be present by the convolutional neural network;
wherein the convolutional neural network comprises:
an input layer having a height of n pixels, a width of n pixels, and a depth of d channels;
said at least one convolution layer comprising a preliminary convolution layer, a secondary convolution layer, a tertiary convolution layer and a quaternary convolution layer;
said at least one pooling layer comprising a preliminary pooling layer and a secondary pooling layer;
the preliminary convolution layer having a height of $Hc_1$ pixels, a width of $Hc_1$ pixels, and a depth of $Dc_1$ channels formed by a first convolution operator having a height of $hc_1$ pixels, a width of $hc_1$ pixels, and a depth of $dc_1$ channels with a stride of $sc_1$ performed upon the input layer;

wherein $Hc_1=[(n-hc_1)/sc_1]+1$;

wherein $Dc_1=dc_1$;

the preliminary pooling layer having a height of $Hp_1$ pixels, a width of $Hp_1$ pixels, and a depth of $Dp_1$ channels formed by a first pooling operator having a height of $hp_1$ pixels and a width of $hp_1$ pixels with a stride of $sp_1$ performed on the preliminary convolution layer;

wherein $Hp_1=[(Hc_1-hp_1)/sp_1]+1$;

wherein $Dp_1=Dc_1$;

the secondary convolution layer having a height of $Hc_2$ pixels, a width of $Hc_2$ pixels, and a depth of $Dc_2$ channels formed by a second convolution operator having a height of $hc_2$ pixels, a width of $hc_2$ pixels, and a depth of $dc_2$ channels with a stride of $sc_2$ performed upon the preliminary pooling layer;

wherein $Hc_2=[(Hp_2-hc_2)/sc_2]+1$;

wherein $Dc_2=dc_2$;

the secondary pooling layer having a height of $Hp_2$ pixels, a width of $Hp_2$ pixels, and a depth of $Dp_2$ channels formed by a second pooling operator having a height of $hp_2$ pixels and a width of $hp_2$ pixels with a stride of $sp_2$ performed upon the secondary convolution layer;

wherein $Hp_2=[(Hc_2-hp_2)/sp_2]+1$;

wherein $Dp_2=Dc_2$;

the tertiary convolution layer having a height of $Hc_3$ pixels, a width of $Hc_3$ pixels, and a depth of $Dc_3$ channels formed by a third convolution operator having a height of $hc_3$ pixels, a width of $hc_3$ pixels, and a depth of $dc_3$ channels with a stride of $sc_3$ that is performed upon the secondary pooling layer;

wherein $Hc_3=[(Hp_2-hc_3)/sc_3]+1$;

wherein $Dc_3=dc_3$;

an activation layer having a height of $Ha_1$ pixels, a width of $Ha_1$ pixel, and a depth of $Da_1$ channels formed by a nonlinear activation function operator performed upon the tertiary convolution layer;

wherein $Ha_1=Hc_3$;

wherein $Da_1=Dc_3$;

the quaternary convolution layer having a height of $Hc_4$ pixels, a width of $Hc_4$ pixels, and a depth of $Dc_4$ channels formed by a fourth convolution operator having a height of $hc_4$ pixel, a width of $hc_4$ pixel, and a depth of $dc_4$ channels with a stride of $sc_4$ performed upon the activation layer;

wherein $Hc_4=[(Ha_1-hc_4)/sc_4]+1$;

wherein $Dc_4=dc_4$;

and a softmax layer having a height of $Sm_1$ pixels, a width of $Sm_1$ pixels, and a depth of $Dsm_1$ channels formed by a softmax operator performed upon the quaternary convolution layer such that a continuously extending line in an image can be detected;

wherein $Sm_1=Hc_4$;

wherein $Dsm_1=Dc_4$.

2. The computer-implemented method of claim 1 wherein the first convolution operator has a height of 20 pixels, a width of 20 pixels, and a depth of 3 channels with a stride of 2.

3. The computer-implemented method of claim 1 wherein the first pooling operator has a height of 7 pixels and a width of 7 pixels with a stride of 2.

4. The computer-implemented method of claim 1 wherein the second convolution operator has a height of 15 pixels, a width of 15 pixels, and a depth of 24 channels with a stride of 2.

5. The computer-implemented method of claim 1 wherein the second pooling operator has a height of 4 pixels and a width of 4 pixels with a stride of 2.

6. The computer-implemented method of claim 1 wherein the third convolution operator has a height of 10 pixels, a width of 10 pixels, and a depth of 48 channels with a stride of 2.

7. The computer-implemented method of claim 1 wherein the fourth convolution operator has height of 1 pixel, a width of 1 pixel, and a depth of 96 channels with a stride of 1.

8. The computer-implemented method of claim 1 wherein the convolutional neural network further comprises a dropout layer intermediate the tertiary convolution layer and the activation layer.

9. The computer-implemented method of claim 1 wherein the nonlinear activation function operator comprises a rectified linear unit function.

10. A computer-implemented method of analyzing an image of a surface to detect a defect in the surface, comprising:
    receiving the image of the surface;
    processing the image using a machine learning algorithm configured to detect the defect, the machine learning algorithm comprising a convolutional neural network including:
        at least one convolution layer; and
        at least one max pooling layer;
    and displaying the image with location of the defect being indicated if determined to be present by the convolutional neural network;
    wherein the convolutional neural network comprises:
        an input layer having a height of 256 pixels, a width of 256 pixels, and a depth of 3 channels;
        said at least one convolution layer comprising a preliminary convolution layer, a secondary convolution layer, a tertiary convolution layer and a quaternary convolution layer;
        said at least one pooling layer comprising a preliminary pooling layer and a secondary pooling layer;
        the preliminary convolution layer having a height of 119 pixels, a width of 119 pixels, and a depth of 24 channels formed by a first convolution operator having a height of 20 pixels, a width of 20 pixels, and a depth of 3 channels with a stride of 2 performed upon the input layer;
        the preliminary pooling layer having a height of 57 pixels, a width of 57 pixels, and a depth of 24 channels formed by a first pooling operator having a height of 7 pixels and a width of 7 pixels with a stride of 2 performed on the preliminary convolution layer;
        the secondary convolution layer having a height of 22 pixels, a width of 22 pixels, and a depth of 48 channels formed by a second convolution operator having a height of 15 pixels, a width of 15 pixels, and a depth of 24 channels with a stride of 2 performed upon the preliminary pooling layer;
        the secondary pooling layer having a height of 10 pixels, a width of 10 pixels, and a depth of 48 channels formed by a second pooling operator having a height of 4 pixels and a width of 4 pixels with a stride of 2 performed upon the secondary convolution layer;
        the tertiary convolution layer having a height of 1 pixel, a width of 1 pixel, and a depth of 96 channels formed by a third convolution operator having a height of 10 pixels, a width of 10 pixels, and a depth of 48 channels with a stride of 2 performed upon the secondary pooling layer;
        an activation layer having a height of 1 pixel, a width of 1 pixel, and a depth of 96 channels formed by a nonlinear activation function operator performed upon the tertiary convolution layer;
        the quaternary convolution layer having a height of 1 pixel, a width of 1 pixel, and a depth of 2 channels formed by a fourth convolution operator having a height of 1 pixel, a width of 1 pixel, and a depth of 96 channels with a stride of 1 performed upon the activation layer;
        and a softmax layer having a height of 1 pixel, a width of 1 pixel, and a depth of 2 channels formed by a softmax operator performed upon the quaternary convolution layer such that a continuously extending line in an image can be detected.

11. The computer-implemented method of claim 10 wherein the convolutional neural network further comprises a dropout layer intermediate the tertiary convolution layer and the activation layer.

12. The computer-implemented method of claim 10 wherein the nonlinear activation function operator comprises a rectified linear unit function.

* * * * *